(12) United States Patent
Alex et al.

(10) Patent No.: US 12,412,428 B1
(45) Date of Patent: Sep. 9, 2025

(54) AI-POWERED SPORTS TRAINING SYSTEM WITH ENHANCED MOTION SYNCHRONIZATION AND COMPARATIVE ANALYSIS CAPABILITIES

(71) Applicant: Direct Technology Holdings, Inc., New York, NY (US)

(72) Inventors: Tony Alex, New York, NY (US); Oleksii Maksymov, Odesa (UA)

(73) Assignee: Direct Technology Holdings, Inc., New York, NY (US)

( * ) Notice: Subject to any disclaimer, the term of this patent is extended or adjusted under 35 U.S.C. 154(b) by 0 days.

(21) Appl. No.: 19/169,002

(22) Filed: Apr. 3, 2025

(51) Int. Cl.
| | |
|---|---|
| *G06V 10/771* | (2022.01) |
| *A63B 24/00* | (2006.01) |
| *A63B 71/06* | (2006.01) |
| *G06V 10/62* | (2022.01) |
| *G06V 10/72* | (2022.01) |
| *G06V 10/77* | (2022.01) |
| *G06V 10/82* | (2022.01) |
| *G06V 20/40* | (2022.01) |

(Continued)

(52) U.S. Cl.
CPC .......... *G06V 40/23* (2022.01); *A63B 24/0062* (2013.01); *A63B 71/0622* (2013.01); *G06V 10/62* (2022.01); *G06V 10/72* (2022.01); *G06V 10/771* (2022.01); *G06V 10/7715* (2022.01); *G06V 10/82* (2022.01); *G06V 20/42* (2022.01); *A63B 2024/0071* (2013.01); *A63B 2071/0647* (2013.01); *A63B 2071/0694* (2013.01); *A63B 2220/05* (2013.01); *A63B 2220/806* (2013.01); *G06V 10/98* (2022.01)

(58) Field of Classification Search
CPC .. G06V 40/23; G06V 10/771; G06V 10/7715; G06V 10/82; G06V 10/72; G06V 10/62; G06V 20/42; G06V 10/98; A63B 24/0062; A63B 71/0622; A63B 2024/0071; A63B 2071/0647; A63B 2071/0694; A63B 2220/05; A63B 2220/806
See application file for complete search history.

(56) References Cited

U.S. PATENT DOCUMENTS

| | | |
|---|---|---|
| 7,103,231 B2 | 9/2006 | Cornog et al. |
| 8,314,840 B1 | 11/2012 | Funk |

(Continued)

*Primary Examiner* — David F Dunphy
(74) *Attorney, Agent, or Firm* — Kevin Paganini, Esq.

(57) ABSTRACT

This disclosure pertains to a sports training system that utilizes deep learning and computer vision technologies to analyze biomechanical sport motions. The system is equipped with AI-powered functionalities to enhance training, including those related to creating and managing motion templates that integrate video sequences with extracted motion features. These templates serve as benchmarks, accessible to trainees for improving their technique and performance. The system also can employ an advanced motion synchronization process, which combines dynamic time warping and computer vision technologies to align trainee videos with reference motions captured in motion templates. Additionally, a motion feature database can be updated with features extracted from both trainee and trainer videos, storing visual information in a structured format to facilitate various analytic functions. The system supports analysis of a wide range of sports motions.

20 Claims, 25 Drawing Sheets
(15 of 25 Drawing Sheet(s) Filed in Color)

(51) Int. Cl.
*G06V 40/20* (2022.01)
*G06V 10/98* (2022.01)

(56) References Cited

U.S. PATENT DOCUMENTS

| | | |
|---|---|---|
| 8,755,569 B2 | 6/2014 | Shen et al. |
| 9,076,041 B2 | 7/2015 | Bentley et al. |
| 9,914,018 B2 | 3/2018 | Richter et al. |
| 10,213,645 B1 | 2/2019 | Wu et al. |
| 12,257,478 B1 * | 3/2025 | Yao .................... A63B 24/0021 |
| 2003/0054327 A1 | 3/2003 | Evensen |
| 2011/0230987 A1 | 9/2011 | Anguera Miró et al. |
| 2013/0178304 A1 | 7/2013 | Chan |
| 2017/0103672 A1 * | 4/2017 | Dey ........................ G06F 3/011 |
| 2022/0012901 A1 * | 1/2022 | Sun ....................... G06V 10/454 |
| 2022/0203207 A1 * | 6/2022 | Shimada ................ A61B 5/681 |
| 2022/0379170 A1 | 12/2022 | Menaker et al. |
| 2024/0007723 A1 | 1/2024 | Guilbert et al. |

* cited by examiner

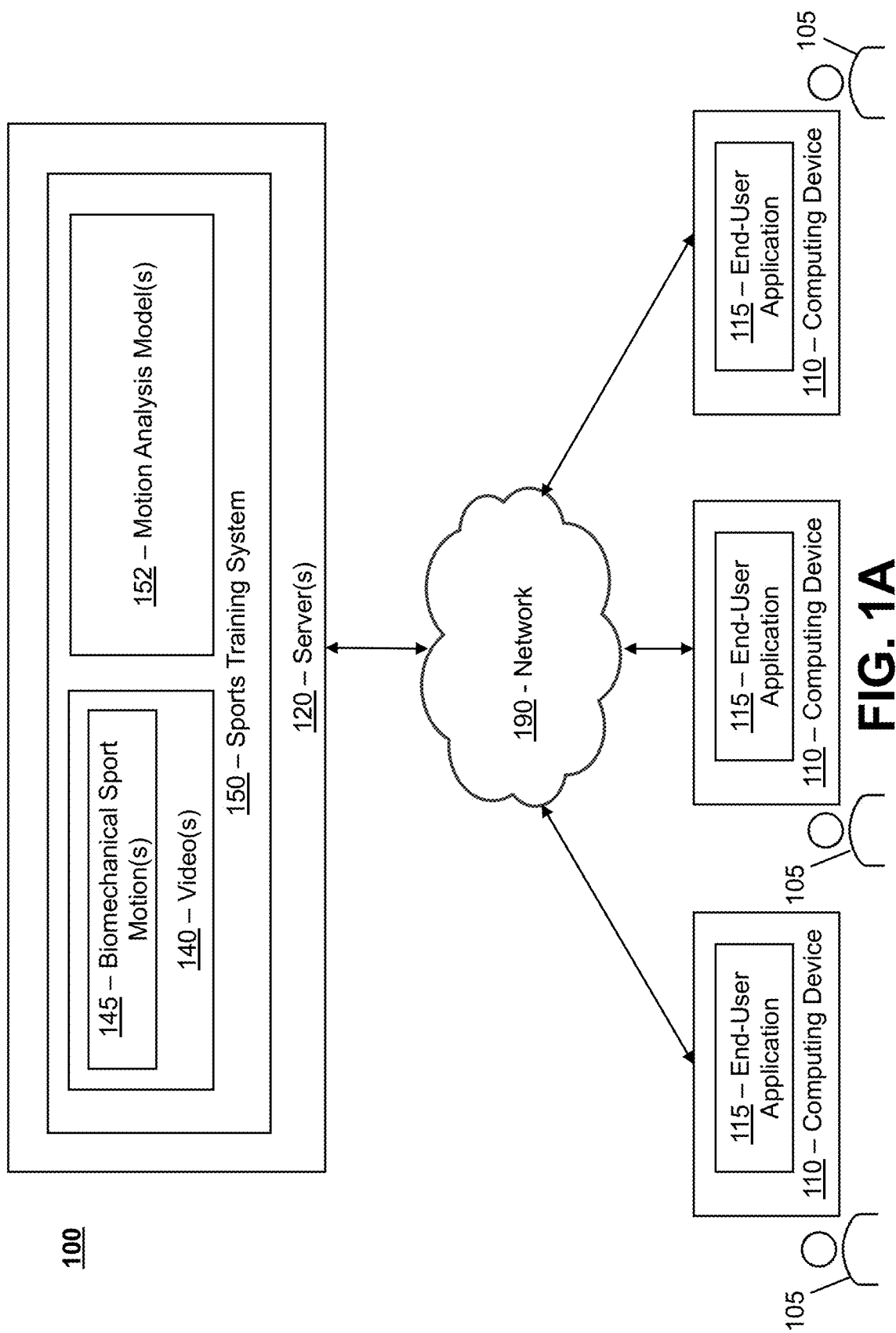

FIG. 7

145 – Biomechanic Sport Motions
- 145A – Golf Swing Motions
- 145B – Tennis Swing Motions
- 145C – Baseball Swing & Throw Motions
- 145D – Soccer Kick Motions
- 145E – Martial Arts Motion
- 145F – Football Motions
- 145G – Swimming Stroke Motions
- 145H – Track & Field Motions
- 145I – Gymnastics Motions
- 145J – Volleyball Motions
- 145K – Hockey Shot Motions
- 145L – Skiing & Snowboard Motions
- 145M – Surfing Motions
- 145N – Rowing Stroke Motions
- 145O – Weightlifting Motions
- 145P – Fencing Motions
- 145Q – Dance Motions
- 145R – Yoga Motions
- 145S – Physical Training Motions

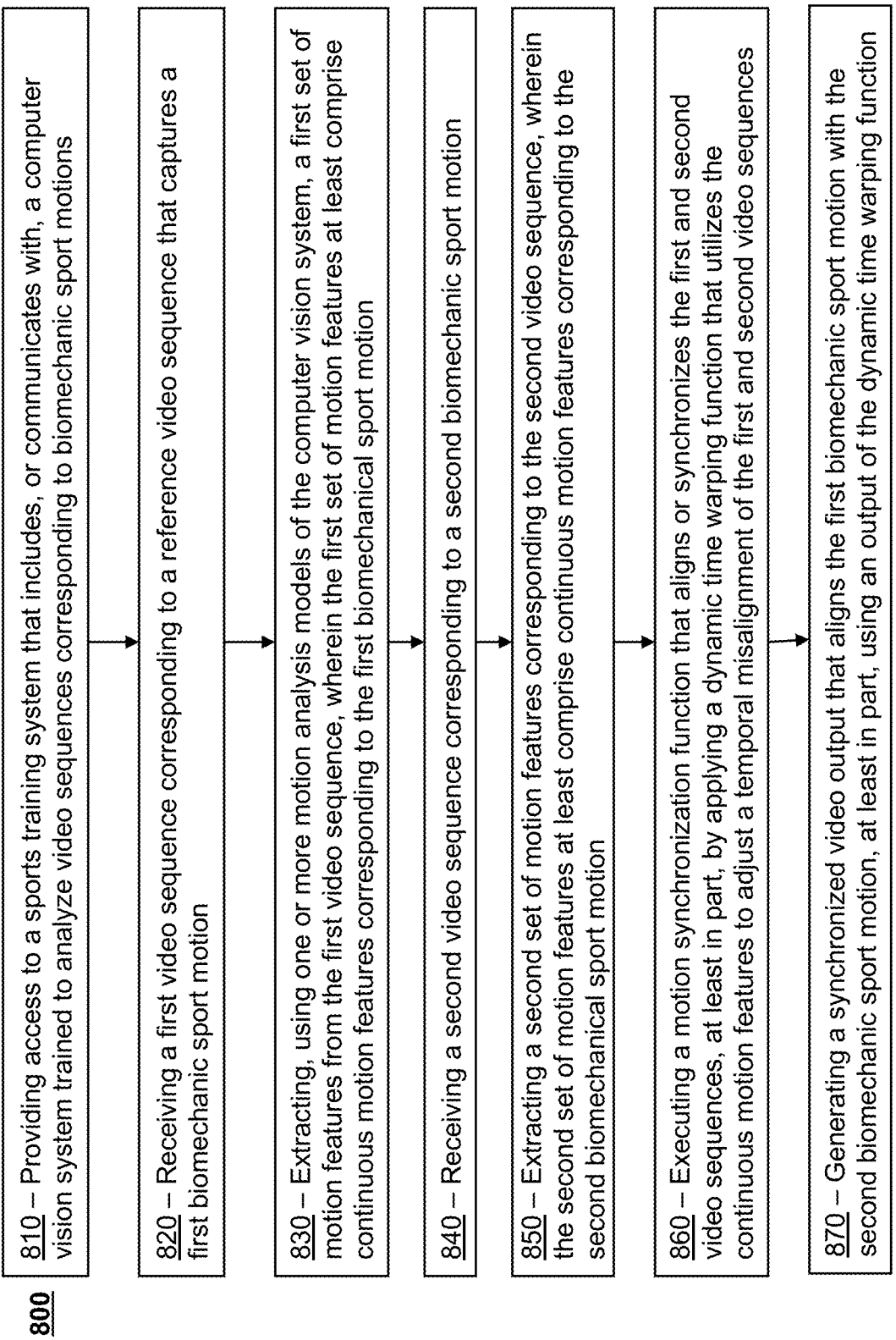

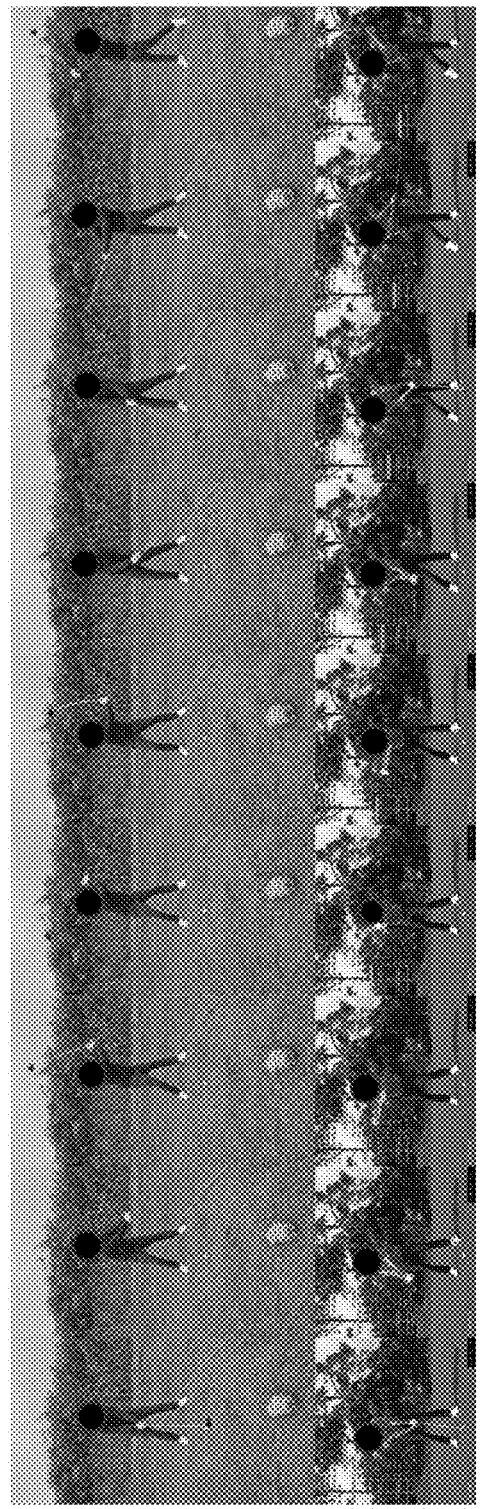
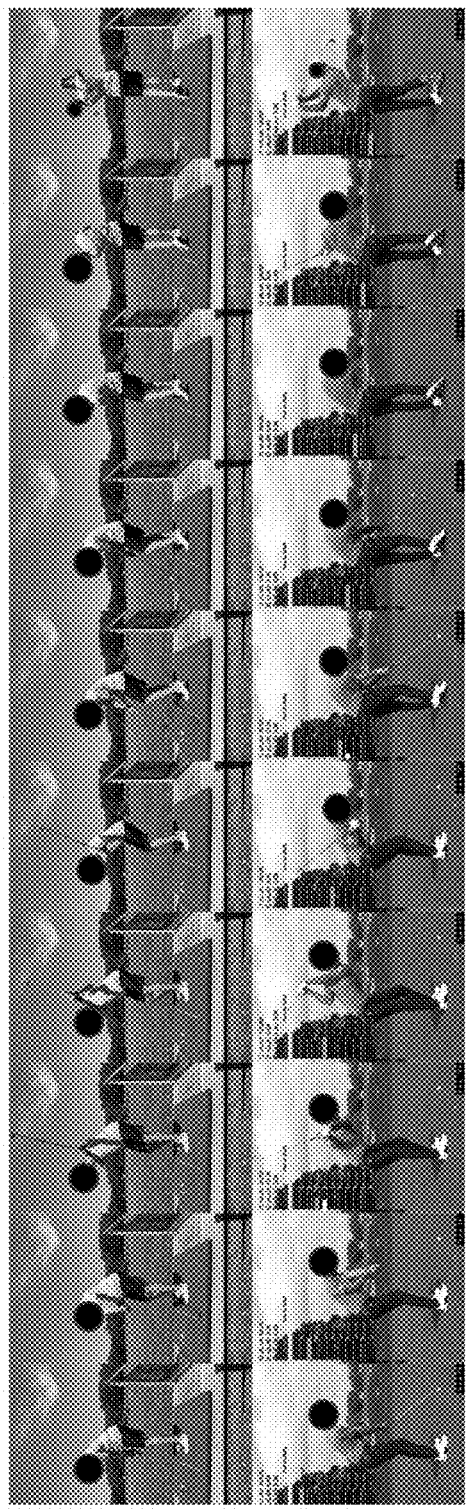
FIG. 12M
FIG. 12N

AI-POWERED SPORTS TRAINING SYSTEM WITH ENHANCED MOTION SYNCHRONIZATION AND COMPARATIVE ANALYSIS CAPABILITIES

TECHNICAL FIELD

This disclosure is related to improved systems, methods, and techniques that leverage neural network architectures for performing video synchronization across video sequences capturing biomechanical sport motions. This disclosure also is related to improved systems, methods, and techniques for generating and disseminating trainer-based motion templates for usage in performing video synchronization and/or comparative motion analysis functions. This disclosure also is related to improved systems, methods, and techniques for creating and querying motion feature databases that aggregate motion features and information extracted from video sequences that capture biomechanical sport motions.

BACKGROUND

The field of sports analytics and training often involves a trainer (e.g., a coach, professional, expert, or other individual with sports domain knowledge) teaching a trainee to correctly execute or perform certain types of repetitive sports motions. For golf trainees, this can include analyzing the golf swing of a trainee and providing feedback to improve their technique. In baseball, trainers often analyze the bat swing motions, throwing motions, and/or pitching motions of trainees to offer targeted feedback for performance enhancement. Similarly, in martial arts, trainers may focus on refining offensive striking motions and defensive blocking motions. Along similar lines, tennis trainees receive analysis and feedback on their racket swing and serve motion to refine their skills, and basketball trainees benefit from analysis and feedback on their shot or pass motions. Comparable motion-based training techniques are applicable to a wide range of other sports including, but not limited to, football, soccer, hockey, volleyball, swimming, track and field, gymnastics, rugby, cricket, lacrosse, badminton, wrestling, boxing, cycling, skiing, snowboarding, surfing, rowing, weightlifting, fencing, yoga, dancing, and/or physical training.

Traditional training techniques typically involve in-person training sessions where a trainer provides direct guidance and feedback to trainees. This approach requires both the trainer and trainee to be physically present at the same location, which can limit the flexibility and convenience of scheduling sessions. Additionally, the need for physical presence restricts the trainer's ability to provide training on a large scale, as they can only work with a limited number of trainees at any given time. Moreover, this approach often incurs higher costs related to travel and facility usage, and it may not be feasible for trainees who are located in remote areas or have busy schedules. Furthermore, the effectiveness of training can be inconsistent, as it heavily relies on the trainer's availability and ability to provide personalized attention to each trainee.

With the recent emergence of artificial intelligence (AI) and machine learning, these technologies are expected to have a major impact on sports training in the coming years and are capable of being applied across a diverse range of sports training activities. Computer vision technologies, which utilize neural network processing and/or deep learning techniques to interpret and understand image or video content, are particularly well-suited for motion-based training because they can be trained to accurately recognize and understand various types of motions. However, many technical challenges should be addressed to effectively integrate these technologies into training systems and processes.

Some of the technical challenges involve determining the optimal balance between using AI and computer vision functionalities to facilitate training versus reliance on human-based training, as well as identifying the best methods for integrating these technologies into systems or applications that reflect this balance. There are countless options for potentially incorporating these technologies into training processes.

For example, one potential approach to applying computer vision technologies to enhance motion-based training would be to train the system to analyze the performance of a trainee's motion (e.g., a golf swing motion or baseball pitch motion) and automatically provide feedback to the trainee for improving performance or execution of the sports motion. While useful to some extent, relying solely on an AI-based evaluation for training has several disadvantages.

Firstly, the aforementioned approach is a "one size fits all" approach that may not be beneficial for all trainees, due to variations in sizes, body types, and motion styles. Additionally, this approach completely removes a trainer from the process, eliminating useful feedback that a human trainer may be able to provide. Moreover, the effectiveness of a purely AI-based feedback approach is limited by the quality and diversity of the data it has been trained on, which may not be optimal and/or may not address unique or unforeseen issues that may arise during training. This rigidity can hinder the ability to tailor training to the specific needs and progress of individual trainees.

For at least the reasons explained above, a hybrid training approach may be preferable, which permits a trainer to remain involved in the training process and provides both the trainer and the trainee with access to AI and computer vision technologies to enhance training efforts.

Other technical challenges can be attributed to implementing systems that enable trainers to quickly and easily provide feedback and training services to trainees. Because the trainer may be remotely located with respect to the trainees, it can be beneficial to provide AI and computer vision capabilities that allow trainers to quickly analyze and provide feedback on videos capturing sports motions, while identifying areas of potential improvements and demonstrating proper execution of the sports motions.

Traditional approaches to analyzing biomechanical sport motions are fraught with several technical challenges that hinder effective training and feedback. One significant challenge is the sheer volume of data generated during practice sessions. A single session can produce hours of video footage, making it exceedingly time-consuming for trainers to manually review and analyze each segment. This is compounded by the difficulty in rapidly identifying key motion positions, such as P1-P10 positions in a golf swing, which are often buried within thousands of frames. Manually identifying or extracting these frames is not only labor-intensive but also prone to errors, leading to potential oversight of important motion details.

One useful technique to facilitate motion training can involve comparing a video of a trainee performing a sports motion with a video of a trainer or professional athlete to demonstrate inconsistencies and identify areas of improvement. However, effectively making this comparison can involve aligning motions at key positions or frames in the videos being compared, which presents additional layers of complexity. Firstly, manual efforts typically require the trainer to separately open and play two independent video files simultaneously and to precisely stop each video at a specific frame corresponding to a key position. Consequently, these manual techniques for aligning the motions and key positions often result in a cumbersome, time-consuming process that can lead to inconsistencies. Also, trainers often face the challenge of needing to customize the key positions to accommodate varying swing styles, injuries, or strategic approaches. Additionally, camera perspective issues further complicate the analysis, as the key positions or frames may be dependent on specific angles. Moreover, differences in video frame rates and/or resolutions can lead to misalignment and inaccurate assessments, complicating direct comparisons. Furthermore, the subjective nature of traditional evaluation methods introduces variability and inconsistency across different coaches and training programs, undermining the objectivity and reliability of the feedback provided. For these and other reasons, effectively aligning or synchronizing the sport motions across separate video sequences to facilitate training can be challenging.

Other technical challenges are presented when one considers the integration of AI and computer vision technologies to facilitate long-term training or analysis. For example, if a trainee desires to analyze their progress over some time period, assess their improvement across multiple sessions, or otherwise run an analysis that involves analyzing multiple video segments, this will typically involve separate processing of each individual video sequence for specific information, which can be very computationally expensive and time-consuming. This is because the visual information needed to conduct these analyses is embedded into the video sequences themselves, and is not readily available for querying or examination without separately processing each video sequence.

For instance, if a trainee wishes to analyze their progress over an extended time period or assess improvements over multiple golf training sessions, this potentially could be performed by individually processing every golf swing motion included in each video sequence to extract specific features or information and subsequently performing an analysis or comparison on the extracted information. However, because the information needed to perform the analysis is embedded in the video content and is not stored in a format that allows for easy querying or examination, performing such an analysis using the aforementioned technique would be computationally expensive and time-consuming due, at least in part, to the fact that extracting the relevant information from each video segment using a neural network architecture is resource-intensive, time-consuming, and demands significant computational power.

The following disclosure offers technological solutions to the previously mentioned challenges, as well as other technical issues described herein.

The background description provided herein is for the purpose of generally presenting the context of the disclosure. The materials described in this section are not prior art to the claims in this application and are not admitted to be prior art, or suggestions of the prior art, by inclusion in this section.

BRIEF DESCRIPTION OF DRAWINGS

The patent or application file contains at least one drawing executed in color. Copies of this patent or patent application publication with color drawing(s) will be provided by the Office, upon request and payment of the necessary fee.

To facilitate further description of the embodiments, the following drawings are provided, in which like references are intended to refer to like or corresponding parts, and in which:

FIG. 1A is a network diagram of an exemplary system in accordance with certain embodiments;

FIG. 7 is a block diagram illustrating exemplary categories of biomechanical sport motions according to certain embodiments;

FIG. 8 is a flowchart illustrating an exemplary motion synchronization process in accordance with certain embodiments;

FIG. 12M illustrates another output generated during testing of the motion synchronization function; and FIG. 12N illustrates another output generated during testing of the motion synchronization function.

Figure 1B:
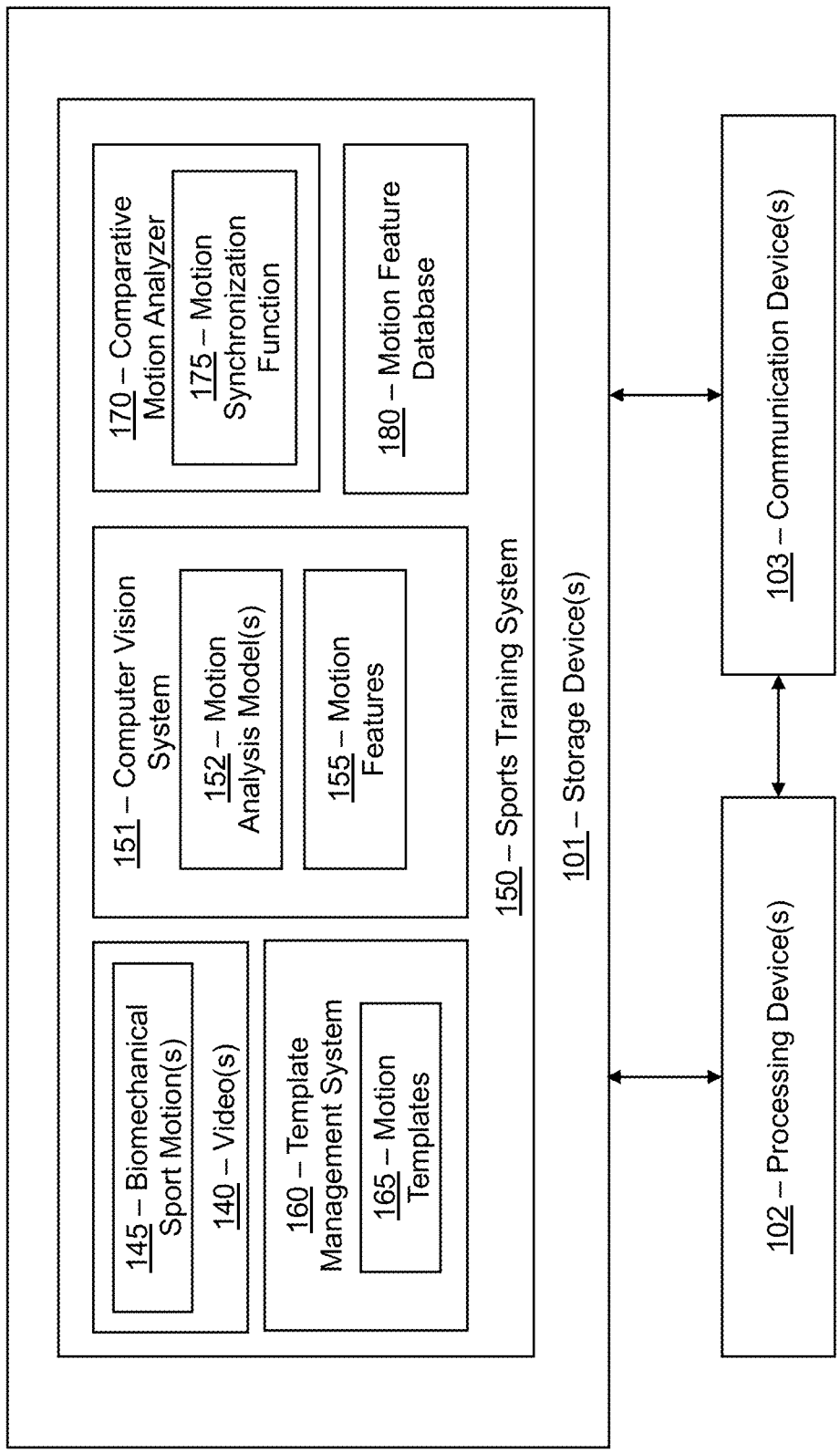
FIG. 1B is a block diagram demonstrating exemplary components, features, and/or functionalities of a sports training system in accordance with certain embodiments.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

The terms "left," "right," "front," "rear," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

As used herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Certain data or functions may be described as "real-time," "near real-time," or "substantially real-time" within this disclosure. Any of these terms can refer to data or functions that are processed with a humanly imperceptible delay or minimal humanly perceptible delay. Alternatively, these terms can refer to data or functions that are processed within a specific time interval (e.g., in the order of milliseconds).

DETAILED DESCRIPTION

The present disclosure relates to systems, methods, apparatuses, computer program products, and techniques for enhancing sports training. In certain embodiments, a sports training system or platform leverages neural network architectures configured with various computer vision capabilities to enhance training abilities in a network environment. The sports training system can provide a framework for connecting trainer end-users (e.g., such as athletic trainers, coaches, professionals, or the like) and trainee end-users (e.g., individuals seeking training services, instruction, and/or guidance). As explained throughout this disclosure, the sports training system can be configured with various AI-powered functionalities that are adapted to enhance training efforts for performing or executing various types of biomechanical sport motions, such as golf swing motions, tennis swing motions, baseball pitching motions, and/or many other types of repetitive sport motions.

In certain embodiments, the sports training system can enable trainer end-users to generate, customize, and/or distribute motion templates to trainee end-users to enhance training abilities. Each motion template may incorporate one or more reference video sequences, each of which captures the performance of a biomechanical sport motion that can serve as a benchmark or reference model for the trainee to emulate. Additionally, as explained below, each motion template can be integrated with various motion features extracted, generated, and/or derived from the benchmark video sequence(s) using a computer vision system, including motion features corresponding to object feature data, motion path analysis data, motion checkpoint data, three-dimensional (3D) modeling data, and/or annotation data. The motion templates also may be integrated with various types of automated training feedback mechanisms.

In certain embodiments, trainee end-users can access and utilize motion templates through a template management system integrated into the sports training system. In some examples, the template management system functions as a marketplace where trainee end-users can browse, purchase, and/or download motion templates created by trainer end-users, as well as access profiles corresponding to the trainer end-users.

The sports training system permits trainee end-users to provide videos capturing their own execution of biomechanical sport motions, which can then be analyzed using motion templates and/or other platform functionalities to deliver various types of feedback. In some examples, these feedback mechanisms may apply automated computer vision analyses to provide quantitative assessments of biometric sport motions captured in videos provided by trainee end-users. Additionally, these feedback mechanisms also may conduct comparative analyses (e.g., such as to identify deviations in trainee motions from the benchmark motions included in reference videos associated with the motion templates), and may further include annotations inserted into the video content by trainee end-users. For example, the trainee-provided videos can be processed by the computer vision system to extract motion features corresponding to the trainee-provided videos, and various types of comparative motion analyses can be executed to evaluate the trainee's performance relative to the benchmark motion associated with the motion template.

In some embodiments, feedback mechanisms associated with the motion templates also can provide real-time training advice to trainee end-users. For example, while a trainee end-user is capturing the performance of a biometric sport motion in a video sequence being recorded, the system may generate one or more annotations for insertion into the one or more video sequences in real-time or near real-time (e.g., while the biometric sport motions is being performed or immediately after the video sequence is captured). The annotations may be inserted as overlays on top of the trainee's video based on a benchmark motion included in a motion template (e.g., such as by incorporating annotations that identify aspects of the trainee's motion that deviate from the benchmark motion beyond a certain threshold, annotations indicating that aspects of the trainee's motion that are properly performed, etc.).

Additionally, a motion synchronization function provided via the sports training system, or integrated directly into the motion templates themselves, can be utilized to precisely align biomechanical sport motions captured in the trainee video sequences with benchmark motions integrated into the motion templates. In some examples, the motions can be precisely aligned across checkpoint positions (e.g., such as the P1-P10 positions of a golf swing motion) to facilitate rapid comparison of the motions at each of these positions. The motion synchronization function can output a synchronized video output that enables a trainee motion and a benchmark motion to be viewed directly adjacent to one another for purposes of comparing the two motions across checkpoint positions and/or identifying areas of improvement in the trainee motions. In some examples, the synchronized video output can arrange or display a trainee motion and a benchmark motion side-by-side and/or vertically above or below each other to facilitate a rapid comparison.

The motion synchronization function can be implemented using various techniques described herein. In some embodiments, the motion synchronization function may utilize a combination of object detection, neural ODE, and/or dynamic time warping technologies to precisely synchronize two video sequences.

For example, the motion synchronization function can utilize one or more object detection models to track specific motion-relevant objects captured in the trainee and benchmark video sequences (e.g., such as moving objects corresponding to sporting equipment and/or human body parts). The one or more object detection models can identify and/or track the trajectory of these objects across the frames of the video sequences. A neural ODE model also can be employed, which applies a differential motion function to generate or extract smooth, continuous motion functions for each video sequence, which can aid in precisely aligning the sequences. A dynamic time warping function also can be applied which utilizes the continuous motion functions to compute an optimal warping path that minimizes temporal misalignment between the videos. This process permits the motions to be accurately and precisely synchronized, even if the original videos have asynchronous frame rates, tempos, or viewpoints, allowing for a direct and meaningful comparison of the motions captured in both videos.

In other examples, the aforementioned motion synchronization function also may apply dimensionality reduction functions to enhance processing speeds and/or reduce computational resources. After the continuous motion features are derived using the object detection and/or neural ODE models, a dimensionality reduction function can be applied to convert the high-dimensional feature data to a low-dimension feature space which encodes key motion data, while removing noise and/or redundant information from the motion features. The dynamic time warping function can be executed more rapidly and efficiently in the low-dimensional feature space, thereby reducing the time and resource constraints for synchronizing the video sequences.

Other techniques also can be applied to implement the motion synchronization function. In other examples, the motion synchronization function employs one or more convolutional 3D (C3D) models to extract spatiotemporal features from the video sequences. These models can analyze the video data to capture the motion dynamics over time, providing a detailed representation of the biomechanical sport motions included in the trainee and benchmark video sequences. Again, a neural ODE can provide continuity by fitting a smooth motion trajectory to the extracted features, and a dynamic time warping function can be applied to these continuous motion trajectories to determine an optimal alignment path and minimize temporal discrepancies. Additionally, a dimensionality reduction function can optionally be applied to enhance processing efficiency by reducing the complexity of the motion data before applying dynamic time warping.

In addition to providing trainers and trainees with access to motion templates and motion synchronization functions to enhance training capabilities, the sports training platform also may store, and continuously update, a motion feature database, which enables various types of analytic functions to be executed for training purposes. As mentioned above, the visual information needed to conduct analyses of repetitive sport motions and/or other training aspects often is embedded directly into video sequences provided by trainee and/or trainer end-users, and is not easily accessible for analysis without extracting that visual information using resource-intensive and time-consuming processing by a neural network architecture.

The motion feature database addresses this problem by aggregating the extracted motion features across video sequences in a structured format that is stored externally to the video sequences themselves. This approach eliminates the need to repeatedly process each video with a neural network to extract the necessary information for analysis. By having the motion feature data readily available in the database, the system can execute various types of analyses and generate insights quickly and efficiently, without the computational burden of reprocessing video data each time the data is needed. This not only reduces the time and resources required for analysis, but also enables real-time or near real-time feedback to end-users in many cases. In some examples described in this disclosure, the motion feature database allows for rapid querying, retrieval, and/or analysis of motion features to facilitate multi-video analyses, long-term performance tracking, trend analysis, and personalized training recommendations.

The technologies described in this disclosure can be applied to enhance training across a wide range of biomechanical sport motions for different sports. In one example, these technologies can be applied to enhance golf training, including training to enhance trainees' golf swing motions (e.g., drive swing motions, iron swing motions, putting swing motions, etc.). In another example, these technologies can be applied to enhance tennis training, including training to enhance trainees' tennis swing motions (e.g., serve motions, backhand motions, etc.). In a further example, these technologies can be applied to enhance baseball training, including training to improve batting techniques and pitching motions (e.g., fastball pitch motions, curveball pitch motions, swing mechanics, etc.). Additionally, these technologies can be applied to enhance basketball training, focusing on shooting form and dribbling skills (e.g., free throw shooting motions, jump shot motions, crossover dribbling motions, etc.). In another example, these technologies can be applied to enhance soccer training, including training to refine kicking techniques and dribbling skills (e.g., penalty kick motions, free kick motions, dribbling maneuver motions, etc.). Furthermore, these technologies can be applied to enhance martial arts training, focusing on both offensive and defensive techniques (e.g., punch strike motions, kick strike motions, blocking motions, etc.). These technologies can also be applied to enhance swimming training, including training to improve stroke efficiency and speed (e.g., freestyle stroke motions, backstroke motions, butterfly stroke motions, etc.). In addition, these technologies can be applied to enhance track and field training, focusing on running form and jumping techniques (e.g., sprinting form motions, long jump motions, high jump motions, etc.). These technologies can be applied to numerous other sports and/or sports motions.

The technologies described herein provide a variety of benefits and advantages. The motion template technologies described herein offer several notable advantages. Amongst other things, they enhance precision and accuracy by allowing for precise benchmarking of biomechanical sport motions, enabling trainees to compare their performance against a model or reference motion that is specified by a trainer. This precision helps in identifying subtle deviations and areas for improvement, leading to more accurate and effective training. Additionally, by pre-processing and embedding motion features into the templates, the system can provide real-time or near real-time feedback to trainees by reducing the latency typically associated with analyzing the video sequences and allowing for immediate corrective guidance. The motion templates also offer scalability and accessibility, as they can be distributed digitally, making them accessible to a wide audience regardless of geographical location. This scalability allows trainer end-users to reach more trainees and provide consistent training experiences across different regions. Moreover, by automating certain portions of the analysis and feedback process, the motion templates reduce the need for extensive manual intervention by trainer end-users, leading to time savings for both trainers and trainees while enabling the trainer end-users to interject feedback, review, or analysis when such is appropriate. Furthermore, the motion templates can be tailored to accommodate different skill levels, body types, and training goals, ensuring that each trainee receives a personalized training experience that aligns with their unique needs and objectives.

Numerous advantages also can be attributed to the motion synchronization functions described herein. These functions can provide enhanced training accuracy and precision and permit alignment of asynchronous videos with varying frame rates, tempos, and views, allowing for a seamless comparison of biomechanical sport motions. This capability provides trainees with consistent and reliable feedback, regardless of the original recording conditions. Additionally, in some embodiments, the motion synchronization technologies reduce computational demands by utilizing dimensionality reduction techniques, which streamline the synchronization process and enable rapid processing of video features. This efficiency allows for real-time or near real-time feedback, enhancing the training experience by providing immediate insights and corrective guidance. Furthermore, the synchronization functions are user-friendly, offering an intuitive interface that simplifies the process of comparing trainee and benchmark videos, making it accessible to users with varying levels of technical expertise. By minimizing the need for manual adjustments and interventions, these technologies also reduce the time and effort associated with training, as they allow trainers to focus on providing targeted feedback rather than spending time on video alignment. In this manner, the motion synchronization technologies facilitate a more effective and efficient training process, empowering both trainers and trainees to achieve their performance goals.

Additional advantages also can be attributed to the motion feature database technologies described herein. The database allows for the efficient storage and retrieval of motion features that are initially embedded into video sequences, enabling rapid querying and analysis without the need to repeatedly process video data. This capability significantly reduces the computational burden and time required for analysis, facilitating real-time or near real-time feedback to end-users. Furthermore, the structured format of the database supports complex analyses, such as trend analysis and performance benchmarking, by providing seamless access to aggregated data over extended periods. This enables trainers and trainees to track progress, identify patterns, and make data-driven decisions to enhance training outcomes. The motion feature database also enhances scalability, as it can accommodate a large volume of data from multiple users and sessions, supporting a wide range of sports and training activities. Additionally, by storing motion features externally from the video sequences, the database can reduce storage requirements and costs, making it an effective solution for long-term data management. The motion feature database technologies provide a robust foundation for advanced analytics and personalized training recommendations, contributing to more effective and efficient sports training.

Numerous additional advantages will become evident from the details provided in this disclosure.

The embodiments described in this disclosure can be combined in various ways. Any aspect or feature that is described for one embodiment can be incorporated into any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature, and/or component referenced in this disclosure can be implemented in hardware and/or software.

Exemplary System and Network Configurations

FIG. 1A is a network diagram of an exemplary system 100 in accordance with certain embodiments. FIG. 1B is a block diagram illustrating exemplary components, features, and/or functions associated with a sports training system 150 according to certain embodiments. FIGS. 1A and 1B are discussed jointly below.

The system 100 comprises one or more computing devices 110 and one or more servers 120 that are in communication over a network 190. A sports training system 150 is stored on, and executed by, the one or more servers 120. End-user applications 115 are installed on the computing devices 110 operated by end-users 105, including trainer end-users and trainee end-users. The network 190 may represent any type of communication network, e.g., such as one that comprises a local area network (e.g., a Wi-Fi network), a personal area network (e.g., a Bluetooth network), a wide area network, an intranet, the Internet, a cellular network, a television network, a satellite communication network, and/or other types of networks.

As explained throughout this disclosure, the sports training system 150 can store and execute various functionalities to facilitate sports training, teaching, and learning. In some exemplary embodiments, end-users 105 corresponding to trainees (e.g., novice athletes, students, and/or other individuals seeking to enhance their athletic skills) can utilize the end-user applications 115 installed on the computing devices 110 to access the training functionalities provided via the sports training system 150, and end-users 105 corresponding to trainers (e.g., coaches, experts, professional athletes, and/or individuals with sports domain knowledge) can utilize the end-user applications 115 installed on the computing devices 110 to provide training services to the trainee end-users.

All of the components illustrated in FIG. 1A, including the computing devices 110, servers 120, end-user applications 115, and sports training system 150 can be configured to communicate directly with each other and/or over the network 190 via wired or wireless communication links, or a combination of the two. Each of the computing devices 110, servers 120, end-user applications 115, and sports training system 150 can include one or more storage devices 101, one or more processing devices 102, and/or one or more communication devices 103.

The one or more storage devices 101 may include (i) non-volatile memory, such as, for example, read only memory (ROM) and/or (ii) volatile memory, such as, for example, random access memory (RAM). The non-volatile memory may be removable and/or non-removable non-volatile memory. RAM may include dynamic RAM (DRAM), static RAM (SRAM), etc. Further, ROM may include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the one or more storage devices 101 include physical, non-transitory mediums. The one or more computer storage 101 devices can store instructions for implementing any of the functionalities described in this disclosure, including the functionalities associated with the sports training system 150 and/or end-user applications 115.

The one or more processing devices 102 may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions. The one or more processing devices 102 can be configured to execute any computer program instructions that are stored or included on the one or more storage devices 101 including, but not limited to, instructions associated with executing the functionalities of the sports training system 150 and/or end-user applications 115.

Each of the one or more communication devices 103 can include wired and wireless communication devices and/or interfaces that enable communications using wired and/or wireless communication techniques. Wired and/or wireless communication can be implemented using any one or combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise the Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware can depend on the network topologies and/or protocols implemented. In certain embodiments, exemplary communication hardware can comprise wired communication hardware including, but not limited to, one or more data buses, one or more universal serial buses (USBs), one or more networking cables (e.g., one or more coaxial cables, optical fiber cables, twisted pair cables, and/or other cables). Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.). In certain embodiments, the one or more communication devices can include one or more transceiver devices, each of which includes a transmitter and a receiver for communicating wirelessly. The one or more communication devices 103 also can include one or more wired ports (e.g., Ethernet ports, USB ports, auxiliary ports, etc.) and related cables and wires (e.g., Ethernet cables, USB cables, auxiliary wires, etc.).

In certain embodiments, the one or more communication devices 103 additionally, or alternatively, can include one or more modem devices, one or more router devices, one or more access points, and/or one or more mobile hot spots. For example, modem devices may enable the computing devices 110, server(s) 120, end-user applications 115, and/or sports training system 150 to be connected to the Internet and/or other network. The modem devices can permit bi-directional communication between the Internet (and/or other network) and the computing devices 110, server(s) 120, end-user applications 115, and/or sports training system 150. In certain embodiments, one or more router devices and/or access points may enable the computing devices 110, server(s) 120, end-user applications 115, and/or sports training system 150 to be connected to a LAN and/or other more other networks. In certain embodiments, one or more mobile hot spots may be configured to establish a LAN (e.g., a Wi-Fi network) that is linked to another network (e.g., a cellular network). The mobile hot spot may enable the computing devices 110, server(s) 120, end-user applications 115, and/or sports training system 150 to access the Internet and/or other networks.

In certain embodiments, the computing devices 110 may represent mobile devices (e.g., smartphones, personal digital assistants, tablet devices, wearable devices, and/or any other device that is mobile in nature), desktop computers, laptop computers, gaming consoles, training simulators, and/or other types of devices. The one or more servers 120 may generally represent any type of computing device, including any of the computing devices 110 mentioned above. The one or more servers 120 also can comprise one or more mainframe computing devices, one or more virtual servers, one or more application servers, and/or one or more cloud-based servers. In some embodiments, the one or more servers 120 can be configured to execute web servers and can communicate with the computing devices 110, end-user applications 115, and/or other applications, systems, or devices over the network 190 (e.g., over the Internet).

As mentioned above, some or all of the computing devices 110 may represent mobile electronic devices in certain embodiments. Generally speaking, the mobile electronic devices can include any type of electronic device that is portable and/or transportable in nature. In some cases, a mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a cellular telephone (e.g., a smartphone), a personal digital assistant, a handheld digital computer device (e.g., a tablet personal computer device), a digital media player, a wearable device, and/or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For example, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, and/or similar products offered by Apple Inc. of Cupertino, California, United States of America; (ii) a Blackberry® or similar product by Research in Motion (RIM) of Waterloo, Ontario, Canada; (iii) a Lumia® or similar product by the Nokia Corporation of Keilaniemi, Espoo, Finland, and/or (iv) a Galaxy® or similar product by the Samsung Group of Samsung Town, Seoul, South Korea. Further, in the same or different embodiments, a mobile electronic device can comprise an electronic device configured to implement one or more of (i) the iOS® or iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android® operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

The mobile electronic devices can additionally, or alternatively, include wearable devices (e.g., wearable user computer devices) as mentioned above. Generally speaking, wearable devices can generally include any type of electronic device that is capable of being mounted to, worn by, and/or fixed to an individual or sporting equipment associated with the individual. For example, in some cases, the wearable devices sometimes can be worn under or over clothing, and/or integrated with the clothing and/or other accessories (e.g., hats, eyeglasses, wristbands, watches, shoes, gloves, etc.). In some cases, wearable devices can be directly mounted or attached to individuals (e.g., the individuals' head, wrist, arms, legs, or neck regions). The wearable devices can comprise attachments to sporting equipment (e.g., golf clubs, tennis rackets, balls, etc.). The wearable devices can comprise a head-mountable wearable user computer device (e.g., one or more head-mountable displays, one or more eyeglasses, one or more contact lenses, one or more retinal displays, etc.) and/or a limb-mountable wearable user computer device (e.g., a smartwatch). In some configurations, the wearable devices can be configured to present audio and/or visual data (e.g., text, images, videos, audio, music, etc.) and/or to receive inputs from individuals (e.g., via one or more input devices such as touchscreens, switches, buttons, etc.). The mobile electronic devices can include additional types of devices other than those explicitly mentioned herein.

In certain embodiments, the sports training system 150 can be stored on, and executed by, the one or more servers 120. Additionally, or alternatively, the sports training system 150 can be stored on, and executed by, the one or more computing devices 110. Thus, in some embodiments, the sports training system 150 can be stored as a server application on one or more servers 120 and, in other embodiments, can be stored as a local application on a computing device 110, or integrated with a local application stored on a computing device 110.

Additionally, in some embodiments, the sports training system 150 can be implemented as a combination of a front-end application (e.g., such as end-user application 115 stored on a computing device 110) and a back-end application (e.g., which is stored on one or more servers 120). All functionalities of the sports training system 150 described herein can be executed by the front-end application, the back-end application, or a combination of both.

In certain embodiments, the end-user applications 115 installed on the one or more computing devices 110 can enable individuals to access the sports training system 150 over the network 190. (e.g., over the Internet via a mobile app or a web browser application). For example, in scenarios where a computing device corresponds to a mobile electronic device, the end-user application 115 may correspond to a mobile app installed on the mobile electronic device that is configured to communicate with, and access the functionalities of, the sports training system 150. Similarly, in scenarios where a computing device 110 corresponds to a desktop or laptop computing device, the end-user application 115 may correspond to a web browser or local application installed on the device that is configured to communicate with, and access the functionalities, of the sports training system 150.

The sports training system 150 can be configured to facilitate sports training, teaching, and/or learning for any type of sport-related activity. In some examples, the sports training system 150 can facilitate training, teaching, and/or learning for sports including, but not limited, to golf, tennis, baseball, football, soccer, basketball, martial arts, hockey, volleyball, swimming, track and field, gymnastics, rugby, cricket, lacrosse, badminton, wrestling, boxing, cycling, skiing, snowboarding, surfing, rowing, weightlifting, and/or fencing. In other examples, the sports training system 150 also can provide training, teaching, and/or learning services associated with rehabilitation and/or injury treatment (e.g., for sports-related injuries and/or other types of injuries). As explained throughout this disclosure, the sports training system 150 can provide various functionalities and services to facilitate training, teaching, and/or learning of sport activities and biomechanical motions corresponding to these and other sports-related activities.

Both trainer end-users and trainee end-users may provide videos 140 (also referred to herein as video sequences 140) to the sports training system 150 for analysis. In certain embodiments, the videos 140 can include one or more two-dimensional (2D) videos, each comprising a plurality of frames corresponding to images. Additionally, or alternatively, the videos 140 may include one or more three-dimensional (3D) videos. The videos 140 may be captured in any digital or analog format, and using any color space or color model. Exemplary video formats can include, but are not limited to, MPEG (Moving Picture Experts Group), AVI (Audio Video Interleave), MP4 (MPEG-4 Part 14), MOV (QuickTime File Format), WMV (Windows Media Video), FLV (Flash Video), MKV (Matroska Video), etc. Exemplary color spaces or models can include, but are not limited to, sRGB (standard Red-Green-Blue), Adobe RGB, gray-scale, etc.

The videos 140 can be captured by any type of camera device. The camera devices can include one or more imaging sensors and/or one or more optical devices that are capable of capturing images and/or videos. The camera devices can include dedicated camera equipment, such as hand-held cameras and/or floor-mounted cameras. The camera devices also can correspond to mobile devices (e.g., smartphones or cell phones), tablet devices, computing devices, desktop computers, and/or other electronic devices that are equipped with cameras, imaging sensors, and/or optical devices. The camera devices can be equipped with analog-to-digital (A/D) converters and/or digital-to-analog (D/A) converters based on the configuration or design of the camera devices. In certain embodiments, the computing devices 110 shown in FIG. 1A can include any of the aforementioned camera devices, and other types of camera devices.

Some or all of the videos 140 provided to the sports training system 150 by the trainer end-users and trainee end-users can include videos 140 that capture one or more biomechanical sport motions 145. A biomechanical sport motion 145 can correspond to a motion (e.g., swinging a golf club, tennis racket, or baseball bat, throwing a punch or kick, tossing a baseball, etc.) of an individual captured in the video 140. Additionally, or alternatively, a biomechanical sport motion 145 can correspond to a motion of equipment itself (e.g., a golf club, basketball, baseball, baseball glove, tennis racket, etc.) captured in the video 140. Additionally, or alternatively, a biomechanical sport motion 145 can correspond to the motion, movements, positioning, and/or pose of an individual's body (or specific body parts) while performing a sports motion or manipulating sporting equipment.

As explained throughout this disclosure, the sports training system 150 can provide various functionalities that can enhance the training of trainee end-users with respect to executing or performing the biomechanical sport motions 145, and which enable trainer end-users to provide analysis, instruction, and feedback to trainee end-users. In some embodiments, separate sets of functionalities may be accessed by trainer end-users and trainee end-users. For example, when trainer end-users access the sports training system 150, they may be provided with functionalities for creating and providing access to motion templates 165, analyzing and/or annotating trainee videos 140, and/or communicating with trainee end-users. On the other hand, when trainee end-users access the sports training system 150, they may be provided with functionalities for selecting, hiring, and/or subscribing to desired trainer end-users, selecting or purchasing motion templates 165, uploading their own videos 140 for analysis and feedback, and/or communicating with the trainer end-users.

Each of the trainer end-users can be provided with electronic tools for creating and customizing various motion templates 165. In general, motion templates 165 can correspond to structured digital constructs designed to capture and convey the execution of specific biomechanical sport motions 145 according to the preferences of trainer end-users, serving as benchmarks for trainee end-users to emulate. In some examples, these templates can include recorded motion data, such as high-resolution videos that illustrate proper execution. Additionally, as explained in further detail below, the motion templates 165 can be combined or integrated with other types of useful data, such as AI-extracted motion features, annotations identifying key biomechanical markers like joint angles and body positions, motion path analysis data, and motion checkpoint data that identifies notable positions within the motion sequence.

The motion templates 165 facilitate training by providing a reference model against which trainees can compare their own performance. Amongst other things, they enable detailed analysis and feedback by allowing the sports training system 150 to synchronize trainee videos with the templates, highlighting deviations and offering corrective guidance. This process not only aids in refining technique but also supports personalized training by accommodating different skill levels and styles, ultimately enhancing the effectiveness of sports training programs.

In some embodiments, the sports training system 150 can be configured with artificial intelligence, neural networking, machine learning, and/or deep learning technologies that are integrated into various electronic tools to aid with training or instructing the trainee end-users. In some examples, the sports training system 150 comprises a neural network architecture having a computer vision system 151 trained to understand and extract visual content and features from the videos 140 provided by the trainer end-users and trainee end-users.

Amongst other things, the computer vision system 151 can be trained to perform functions associated with detecting, extracting, and/or analyzing biomechanical sport motions 145 captured in videos 140. In certain embodiments, this AI-based architecture can facilitate the extraction of biomechanical sport motions 145 and/or corresponding motion features from videos 140 across a wide range of sports (e.g., golf, tennis, baseball, etc.), and the extracted information can be utilized to implement a variety of functions aimed at enhancing the training of trainee end-users. In some examples described below, the AI-based architecture performs functions that enable synchronization of trainee-provided videos 140 with the motion templates 165 created by trainer end-users to help identify discrepancies and areas for improvement, which provides targeted feedback to trainees to assist them in refining their biomechanical sport motions and techniques. The extracted visual features also can be utilized to perform a detailed comparative analysis of trainee videos 140 with motion templates 165 created by the trainer end-users and/or other functions described herein.

In some embodiments, the sports training system 150 and/or computer vision system 151 can be configured with specialized functionalities to facilitate training on biomechanical motions corresponding to golf swings and golf-related activities. The motion templates 165 permit trainers to create detailed models of ideal golf swings, which can be used by trainees to compare their own swings against these benchmarks. The computer vision analyses enable the system to automatically detect and highlight deviations in a trainee's swing, providing targeted feedback to improve specific aspects such as hip rotation, shoulder alignment, and swing plane.

While various portions of this disclosure describe examples related to the analysis of golf swing motions, it should be understood that the principles equally apply to biomechanical sport motions 145 for other sports. In some examples, the functionalities of the sports training system 150, including those relating to motion template usage and computer vision analyses, can be applied to analyze and provide feedback on biomechanics in tennis, analyzing serving motions or tennis swing motions to provide detailed feedback and enhance performance. In further examples, the motion template and computer vision functionalities can be applied to analyze and provide feedback on biomechanics in baseball, analyzing bat swing motions, pitching motions, and/or throwing motions to provide detailed feedback and enhance performance. In further examples, the motion template and computer vision functionalities can be applied to analyze and provide feedback on biomechanics in basketball, analyzing shooting motions and/or passing motions to provide detailed feedback and enhance performance. In further examples, the motion template and computer vision functionalities can be applied to analyze and provide feedback on biomechanics in martial arts, analyzing offensive motions and/or defensive motions to provide detailed feedback and enhance performance. These functionalities can be extended to many other types of biomechanical sport motions 145 in other sports as well (e.g., football, soccer, hockey, volleyball, swimming, track and field, gymnastics, rugby, cricket, lacrosse, badminton, wrestling, boxing, cycling, skiing, snowboarding, surfing, rowing, weightlifting, and/or fencing).

In certain embodiments, the sports training system 150 also may store a motion feature database 180 that is continuously updated with motion features 155 that are extracted from videos 140. The motion feature database 180 allows the visual information embedded into the videos 140 to be stored in a structured format external to the videos 140 themselves. Amongst other things, the motion feature database 180 can store the motion features 155 that are extracted by the computer vision system 151 described herein throughout various points in time, such as when end-users utilize the sports training system 150 to synchronize video sequences 140, analyze biomechanical sports motions 145 of trainees and trainers, etc. Each time motion features 155 and/or other information is ascertained, this data may be stored in a structured format within the motion feature database 180.

Compiling motion features 155 and/or data corresponding to the videos 140 permits the sports training system 150 to execute various types of analytic functions 550 on the stored data. In some examples, the analytic functions can query the motion feature database 180 for efficient retrieval and analysis of motion data, enabling the system to perform complex evaluations such as trend analysis, performance benchmarking, and/or personalized feedback generation. By having a structured repository of motion features, the system can quickly access and process the data to deliver insights that enhance training effectiveness and support the continuous improvement of trainee performance.

Further details of the motion feature database 180 and analytic functions are described in other portions of this disclosure.

The computer vision system 151 described herein can be configured to perform any and all of the video or image analysis operations described in this disclosure including, but not limited to, those which involve motion feature extraction, object identification and classification, object segmentation, motion comparison, and/or three-dimensional (3D) modeling.

The structure and/or configuration of the computer vision system 151 can vary. In certain embodiments, the computer vision system 151 may include a neural network architecture comprising a convolutional neural network (CNN), or a plurality of convolutional neural networks. Each CNN may represent an artificial neural network, and may be configured to analyze images and to execute deep learning functions and/or machine learning functions on the images. Each CNN may include a plurality of layers including, but not limited to, one or more input layers, one or more output layers, one or more convolutional layers (e.g., that include learnable filters), one or more ReLU (rectifier linear unit) layers, one or more pooling layers, one or more fully connected layers, one or more normalization layers, etc. The configuration of the CNNs and their corresponding layers can be configured to enable the CNNs to learn and execute various functions for analyzing, interpreting, and understanding the image and video content, including any of the functions described in this disclosure.

In certain embodiments, the computer vision system 151 can include one or more motion analysis models 152, each of which can be trained or configured to analyze a video sequence 140 for features relevant to the performance of a biomechanical sport motion 145. In some examples, the motion analysis models 152 can include one or more object detection models including, but not limited to, YOLO (You Only Look Once), Faster R-CNN (Region-based Convolutional Neural Network), and/or DETR (Detection Transformer) models. Additionally, or alternatively, the motion analysis models 152 can include one or more convolutional 3D (C3D) models, one or more neural ordinary differential equation (Neural ODE) models, and/or other types of models capable of analyzing image or video content. Additionally, the motion analysis models 152 can comprise one or more pose estimation models configured to extract skeletal joint positions from the video sequences 140 provided by end-users.

Regardless of its configuration, the computer vision system 151 and/or its corresponding models can be trained to execute various computer vision functions. For example, in some cases, the computer vision system 151 can execute object detection functions, which may include predicting or identifying locations of biomechanical motion objects (e.g., parts of an individual's body, sporting equipment, etc.) associated with one or more target classes included in the images and/or videos. Additionally, or alternatively, the computer vision system 151 can execute object classification functions, which may include predicting or determining whether objects captured in the images and/or videos belong to one or more target semantic classes (e.g. corresponding an individual's head, feet, arms, body, or other body parts and/or corresponding to golf clubs, golf balls, tennis rackets, baseball bats, and/or other types of sporting equipment) and/or predicting or determining labels for the objects in the images or videos. Additionally, or alternatively, the computer vision system 151 can execute instance segmentation functions (e.g., which may include predicting or identifying precise locations of objects in the images and/or videos with pixel-level accuracy). The computer vision system 151 can be trained to perform other types of computer vision functions as well.

In some scenarios, the computer vision system 151 can be configured to extract feature representations from input images and/or videos. The feature representations may represent embeddings, encodings, vectors, features, and/or the like, and each feature representation may include encoded data that represents and/or identifies one or more objects included in an image or video. In some embodiments, the computer vision system 151 also can be trained to leverage or utilize the object representations in executing one or more computer vision functions (e.g., object detection, object classification, and/or instance segmentation functions) which relates to analyzing biomechanical sport motions 145.

The computer vision system 151 can be configured to generate and output analysis information based on an analysis of the images and/or videos. The analysis information for an image can generally include any information or data associated with analyzing, interpreting, understanding, and/or classifying the images or videos and/or the objects included in the images or videos. In certain embodiments, the analysis information can include information or data representing the feature representations that are extracted from the input images or videos. Additionally, or alternatively, the analysis information can include information or data that indicates the results of the computer vision functions performed by the computer vision system 151. For example, the analysis information may include the predictions and/or results associated with performing object detection, object classification, and/or other computer vision functions described herein.

In certain embodiments, one or more training procedures may be executed to train the computer vision system 151 to perform the computer vision functions described in this disclosure. In some examples, the training procedures can enable the computer vision system 151 to learn and/or detect various types of biomechanical sport motions 145 (e.g., golf swings, tennis swings, baseball pitches, etc.), sporting equipment (e.g., golf clubs, tennis rackets, balls, etc.), and/or human bodies or body parts. The specific procedures that are utilized to train the computer vision system 151 can vary. In some cases, one or more supervised training procedures, one or more unsupervised training procedures, and/or one or more semi-supervised training procedures may be applied to train the computer vision system 151, or certain components of the computer vision system 151. In some embodiments, one or more supervised learning procedures may be applied to facilitate the computer vision functionalities described herein, including those corresponding to motion feature extraction, motion analysis, and/or 3D modeling capabilities of the computer vision system 151.

In certain embodiments, one or more motion analysis models 152 included in the computer vision system 151 are implemented using a deep learning architecture that is trained in a supervised fashion using labeled biomechanical sport motion data, and the deep learning architecture comprises a convolutional neural network (CNN), a recurrent neural network (RNN), a transformer-based model, or a combination thereof.

Further details regarding exemplary training techniques that can be applied to the computer vision system 151, or its components, are described in other portions of this disclosure.

For simplicity purposes, certain portions of this disclosure may describe the computer vision system 151 as a single learning model that executes the image and/or video analysis functions described herein. However, it should be understood that the computer vision system 151 can include a plurality of separate learning models, each of which is trained to perform certain tasks or functions, and these models can be combined in various ways to achieve the image or video analysis functions described herein. Thus, any portion of this disclosure that describes communications with a single learning model can be interpreted as communicating with one or more learning models.

For simplicity purposes, certain portions of this disclosure also may describe the sports training system 150 as hosting the computer vision system 151 and/or the learning models corresponding to the computer vision system 151. However, it should be understood that the computer vision system 151, or one or more models associated with computer vision system 151, can be hosted on a separate platform that is accessed by the sports training system 150, and the sports training system 150 can communicate with the separate hosting platform (e.g., using an application programming interface (API) and/or other communication means to perform the image and/or video analysis functionalities described herein. Thus, any portion of this disclosure that describes accessing or utilizing the computer vision system 151 and/or the learning models described herein can be interpreted as accessing models hosted on the sports training system 150, accessing models stored on a separate platform, or a combination thereof.

The system configurations described herein are provided as examples to demonstrate environments in which embodiments described herein can be deployed. Numerous modifications and variations to the disclosed embodiments are possible, and the techniques described herein can be implemented in many other contexts and environments.

With reference primarily to FIG. 1B and FIG. 2-10, the discussion below provides additional details regarding the exemplary components, features, and/or functions associated with the sports training system 150.

Exemplary Techniques for Generating & Utilizing Motion Templates

Upon accessing the sports training system 150, a trainer end-user can be provided with functions for generating and customizing one or more motion templates 165. The trainer end-user also can be provided with functions for editing, modifying, refining, and/or supplementing previously created motion templates 165. As mentioned above, each motion template 165 can comprise a structured digital framework that captures and conveys the execution of a specific biomechanical sport motion 145, such as a golf swing motion or tennis serve motion, as specified or desired by a trainer end-user. These motion templates 165 can operate as benchmarks for training or instructing the trainee end-users, and they provide the trainee end-users with a tangible reference motion to emulate.

Trainer end-users can create motion templates 165 for various objectives or purposes. For example, golf trainers may create separate motion templates 165 for different types of golf swings, such as driver swing motions, iron swing motions, and/or putting motions. They also can create and customize motion templates 165 based on the experience level of the trainee end-users (e.g., beginner, intermediate, or advanced). Motion templates can similarly be customized and tailored for biomechanical sport motions 145 for other types of sports (e.g., for tennis trainers, motion templates 165 can be created for serve motions, backhand motions, and front hand motions, and these templates can be customized according to the experience level of target trainee end-users).

The contents of a motion template 165 can vary. In certain embodiments, each motion template 165 can comprise recorded motion data corresponding to a biomechanical sport motion 145 captured in a reference video 140A provided by a trainer end-user. The motion template 165 also may comprise various data, such as motion features, checkpoint data, and/or three-dimensional (3D) modeling data, that is generated by processing the reference video 140A with the neural network architecture associated with the sports training system 150 and/or generated by the trainer end-user using functionalities presented via the sports training system 150.

Figure 2:
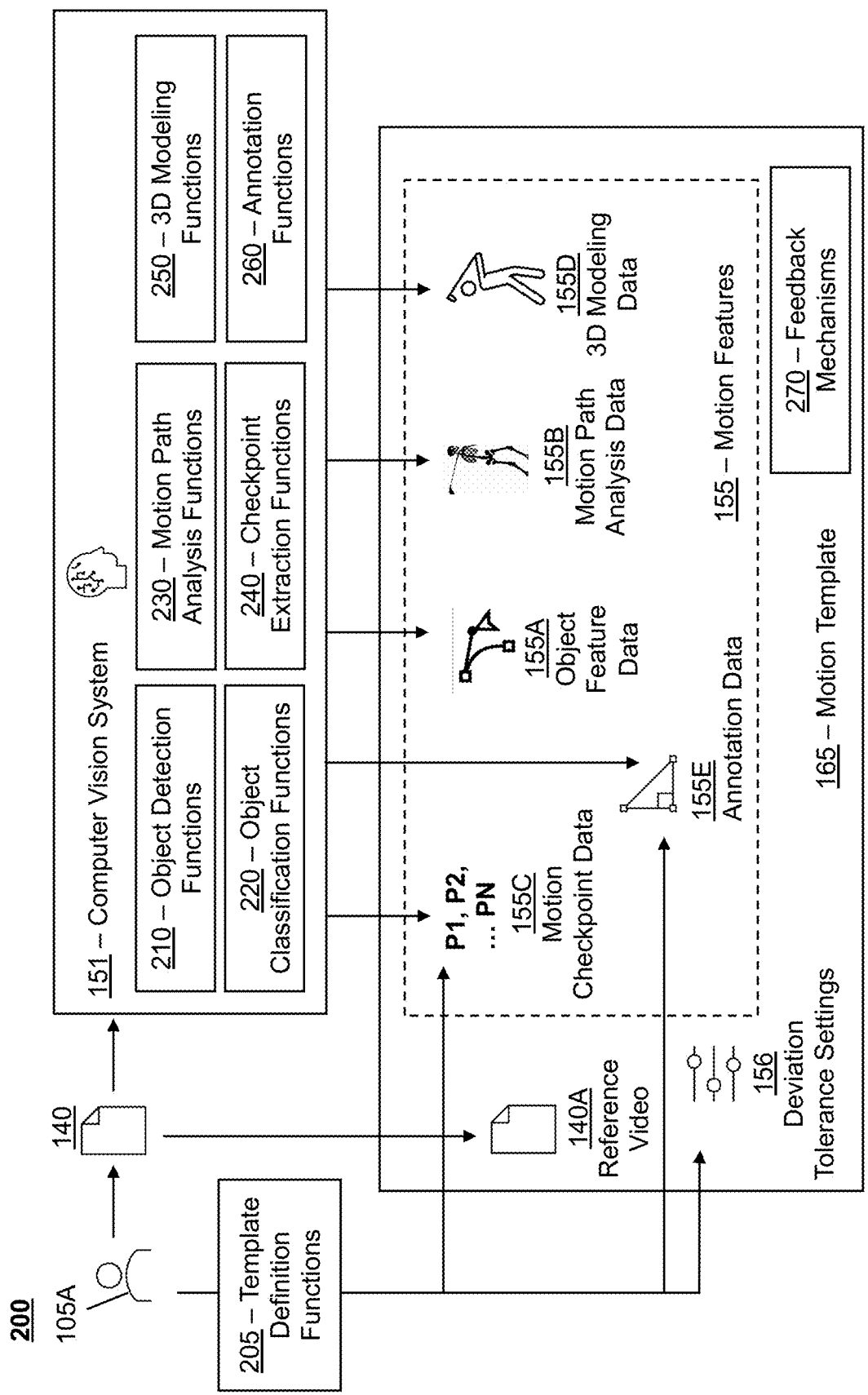
FIG. 2 is a flow diagram illustrating an exemplary technique for generating a motion template according to certain embodiments.

FIG. 2 is a flow diagram illustrating an exemplary process flow 200 for generating a motion template 165 according to certain embodiments. Amongst other things, this process flow 200 demonstrates exemplary content that may be embedded or incorporated into a motion template 165 created via the sports training system 150 and/or template management system 160.

Initially, a trainer end-user 105A provides a reference video 140A that depicts or captures a biomechanical sport motion 145. The reference video 140A may capture the biomechanical sport motion 145 from any view (e.g., front view, top view, side view, perspective view, etc.). In certain embodiments, the reference video 140A may correspond to a high-resolution video selected by a trainer as illustrating proper execution of the biomechanical sport motion 145.

In examples where the trainer end-user 105A corresponds to a golf trainer, the reference video 140A may capture a particular type of golf swing motion, such as a motion for swinging a driver, iron, or putter. The reference video 140A may depict the golf trainer or another individual executing a golf swing with proper technique (or a technique deemed acceptable by the trainer). Similar types of reference videos 140A can be provided to demonstrate biomechanical sport motions 145 for other types of sports.

As explained below, in addition to storing the reference video 140A with the motion template 165, the motion template 165 can incorporate valuable information produced by the AI analysis capabilities of the computer vision system 151, along with information that is generated using electronic template definition functions 205 that permit the trainer end-user to annotate, customize, and/or supplement the content of the motion template 165. Thus, some of the content incorporated into the motion template 165 can be generated by the automated visual analysis functionalities of the computer vision system 151, while other content can be defined. customized, or modified by the trainer end-user's 105A usage of the template definition functions 205.

The computer vision system 151 may execute analysis functions to supplement the motion template 165 with various types of motion features 155 corresponding to the reference video 140A and/or the biomechanical sport motion 145 captured in the reference video 140A. In some examples, the motion features 155 derived using the computer vision system 151 may comprise object feature data 155A, motion path analysis data 155B, motion checkpoint data 155C, 3D modeling data 155D, and/or annotation data 155E.

The object feature data 155A can correspond to objects that are extracted from the reference video 140A by the computer vision system 151, such as objects corresponding to an individual's body and/or sporting equipment. For example, in a reference video 140A that captures a golf swing, the object feature data 155A may include the position and movement of objects corresponding to the golfer's arms, legs, and torso, as well as the position and movement of objects corresponding to a golf club and/or golf club head.

In some implementations, the computer vision system 151 can be trained to execute object detection functions 210 and/or object classification functions 220 to extract the object feature data 155A corresponding to a biomechanical sport motion 145 captured in the reference video 140A. For example, in a golf swing motion, these functions may be used to identify and track the golfer's body parts, such as the arms, legs, and torso, as well as the golf club and ball. The object detection function 210 can locate these objects within each frame of the video, while the object classification function 220 can categorize them into specific classes, such as "arm," "leg," "club," or "ball," enabling detailed analysis of the swing mechanics. Similar types of bodily and sport equipment objects may be extracted for other types of biomechanical sport motions 145, and some or all of the extracted object feature data 155A may be stored and associated with the motion template 165 being created for the reference video 140A.

In certain embodiments, the motion template 165 also can be integrated with motion path analysis data 155B extracted from the reference video 140A. The motion path analysis data 155B can capture or indicate the trajectory or motion of a biomechanical sport motion 145 in the reference video 140A. In some examples, the motion path analysis data 155B can indicate the angles, speed, and form during the execution of the biomechanical sport motion 145 across the frames of the reference video. Additionally, in some embodiments, the motion path analysis data 155B can include skeletal mapping data that maps the individual's motion in the reference video to a computer-generated skeletal structure (e.g., using a pose estimation model that extracts skeletal joint positions from the video). This skeletal mapping data allows for precise tracking of joint angles and limb movements, providing a detailed framework for analyzing the biomechanics of the motion and identifying areas for improvement in technique.

In the example of a golf swing motion, the motion path analysis data 155B can provide a comprehensive view of the swing's trajectory and dynamics as captured in the reference video 140A. For instance, this data can detail the angles at which the golfer's arms and club move, the speed of the swing at various phases, and the overall form maintained throughout the motion. Additionally, by incorporating skeletal mapping data, the system can create a computer-generated skeletal structure that mirrors the golfer's movements, allowing for precise tracking of joint angles, such as the rotation of the shoulders and hips, and limb movements, like the extension of the arms during the backswing and follow-through.

In some embodiments, the computer vision system 151 may execute motion path analysis functions 230 to extract the motion path analysis data 155B. The motion path analysis functions 230 may leverage the objection detection functions 210 and/or object classification functions 220 to extract some or all of the motion path analysis data 155B. Additionally, the motion path analysis functions 230 may execute generative AI and mapping functions to facilitate the mapping of the motion to the computer-generated skeletal structure.

In certain embodiments, the motion template 165 also can be integrated with motion checkpoint data 155C extracted from the reference video 140A. The motion checkpoint data 155C can capture or indicate specific data points within a video sequence that correspond to predefined positions or key moments in a biomechanical sport motion 145. The content of motion checkpoint data 155C can include information about the timing and positioning of these key moments within the video sequence and/or the positioning of objects (e.g., the individual's body parts and/or sporting equipment) at each checkpoint. The motion checkpoint data 155C can be automatically identified by the computer vision system 151, manually marked by a trainer end-user using template definition functions 205, or a combination thereof.

In an example involving a biomechanical sport motion 145 corresponding to a golf swing, the golf swing motion may be segmented into a plurality of different checkpoints. For instance, a golf swing motion could be segmented into a plurality of checkpoints (P1-P10), which include some or all of the following:

P1—Address: The starting position before the swing begins, with proper posture, grip, and alignment.

P2—Club Parallel to the Ground (Takeaway): The club reaches parallel to the ground in the takeaway, with neutral wrists and a clubface matching the spine angle.

P3—Lead Arm Parallel to the Ground (Early Backswing): The lead arm is parallel to the ground, the club shaft is angled upward, and the body begins significant rotation.

P4—Top of the Backswing: The highest point of the backswing, with the club fully loaded, wrists hinged, and body coiled.

P5—Lead Arm Parallel to the Ground in the Downswing: The transition begins with the lead arm parallel to the ground on the downswing, the club shallows, and the body starts uncoiling.

P6—Club Parallel to the Ground in the Downswing: The club reaches parallel again, approaching impact, with hands leading and a dynamic body.

P7—Impact: The moment of truth, with hands ahead of the ball, a square clubface, and a fully rotated body toward the target.

P8—Club Parallel to the Ground Post-Impact: The club extends through the ball, parallel to the ground again in the follow-through.

P9—Lead Arm Parallel to the Ground (Late Follow-Through): The lead arm is parallel post-impact, with full extension toward the target.

P10—Finish Position: The end of the swing, with a fully rotated body, weight on the lead leg, and the club resting over the back shoulder.

Other types of biomechanical sport motions 145 can be segmented into checkpoints in a similar manner to the example provided above with respect to the golf swing motion. Whether it's a tennis serve, a baseball pitch, or a basketball shot, each motion can be broken down into key phases that highlight the movement of the body and/or equipment captured in a video sequence and the extracted information can be stored in the motion checkpoint data 155C.

In some embodiments, the computer vision system 151 can be trained to execute checkpoint extraction functions 240 that automatically detect each of the checkpoint positions in the video sequence, and extract the data corresponding to each of the checkpoints. According to some exemplary training techniques, the checkpoint extraction functions 240 can be trained in a supervised fashion using a collection of videos corresponding to each target biomechanical sport motion 145 (e.g., golf swing, tennis swing, etc.), and each of the videos can be annotated or labeled with ground-truth information identifying the relevant video frames and/or objects corresponding to checkpoint positions. Additionally, or alternatively, the trainer end-user can use template definition functions 205 to manually identify the checkpoints and/or refine the checkpoints identified by the computer vision system 151.

As explained below, motion checkpoint data 155C also may be detected and extracted from videos 140 provided by trainee end-users, and the comparative motion analyzer 170 may utilize the motion checkpoint data 155C to synchronize trainee videos 140 with the videos included in the motion templates 165 to demonstrate a comparison of benchmark motions with trainee-performed motions.

In certain embodiments, the motion template 165 also can be integrated with 3D modeling data 155D corresponding to the reference video 140A. The 3D modeling data 155D may include a digital representation of the biomechanical sport motion 145 captured in the video. For example, the digital representation can encompass a three-dimensional model of the individual and/or sporting equipment depicted in the reference video 140A, which emulates the biomechanical sport motion 145 in the reference video 140A. Additionally, in some embodiments, the 3D modeling data may incorporate detailed skeletal mapping, joint angles, and/or motion trajectories, providing a detailed framework for analyzing the biomechanics of the motion. This allows for enhanced visualization and understanding of the motion dynamics corresponding to biomechanical sport motions 145 and facilitates more accurate assessments and feedback.

The computer vision system 151 can be trained to execute 3D modeling functions 250 to generate the 3D modeling data 155D corresponding to the reference video 140A. In some embodiments, the 3D modeling functions 250 can construct the digital representation and/or 3D model using a monocular or single view captured in the reference video 140A, rather than requiring a biomechanical sport motion 145 to be captured by two or more separate camera devices from varying views. Additionally, or alternatively, the 3D modeling functions 250 can construct the digital representation and/or 3D model using multi-view video data captured by two or more separate camera devices.

In certain embodiments, in generating the digital representation and/or 3D model, the 3D modeling functions 250 may employ or leverage temporal smoothing techniques to enhance the continuity and accuracy of 3D motion trajectories generated from video sequences. These techniques operate by minimizing frame-to-frame noise or jitter in pose estimations, which can be particularly important in monocular or low-resolution inputs where key point detection can be inconsistent due to motion blur, occlusion, and/or lighting changes. By applying temporal filters or learning-based smoothing models (e.g., Kalman filters, recurrent neural networks, or spline fitting), the system produces coherent and fluid motion paths that better reflect actual biomechanical dynamics. This improves downstream synchronization, motion comparison, and feedback accuracy.

Additionally, in some embodiments, the system supports multi-view calibration-free estimation, allowing 3D motion reconstructions to be generated from videos captured from different perspectives without requiring hardware synchronization or explicit geometric calibration between the cameras. This is achieved by leveraging temporal correspondences, epipolar geometry, and/or learned cross-view priors to align multiple unsynchronized views. The ability to reconstruct accurate 3D representations without specialized camera rigs significantly lowers barriers to entry for end-users, enabling coaches, trainers, and athletes to upload standard mobile phone recordings from different angles and still benefit from high-fidelity 3D feedback.

These techniques provide competitive advantages over traditional motion capture systems, which often rely on marker-based setups, synchronized multi-camera arrays, or pre-calibrated environments. By removing the need for manual calibration and by introducing temporal coherence into pose estimation, the sports training system 150 democratizes access to advanced motion analysis while improving the accuracy and usability of 3D motion outputs for real-world sports training.

In an exemplary scenario, the reference video 140A provided by the trainer end-user 105A may capture a golf swing motion, and the 3D modeling functions 250 may process the reference video to generate a 3D modeled video which includes an avatar or skeletal illustration swinging a golf club according to the same or similar motion that was captured in the reference video 140A.

As explained in other portions of this disclosure, the videos 140 provided by trainees can also be processed by the 3D modeling functions 250 in a manner similar to the reference videos 140A. For example, when a trainee submits a video capturing their golf swing, the 3D modeling functions 250 can be applied to extract key motion features and skeletal data from the video frames, and this information can be used to generate a 3D model of the trainee's swing, mirroring the process used for the reference video 140A. The resulting 3D model can permit a detailed comparison between the trainee's swing and the benchmark model derived from the reference video 140A, enabling precise analysis of biomechanical differences and providing targeted feedback to enhance the trainee's performance.

FIGS. 11A-11G illustrate outputs that were generated during testing of the 3D modeling techniques described herein.

Figure 11A:
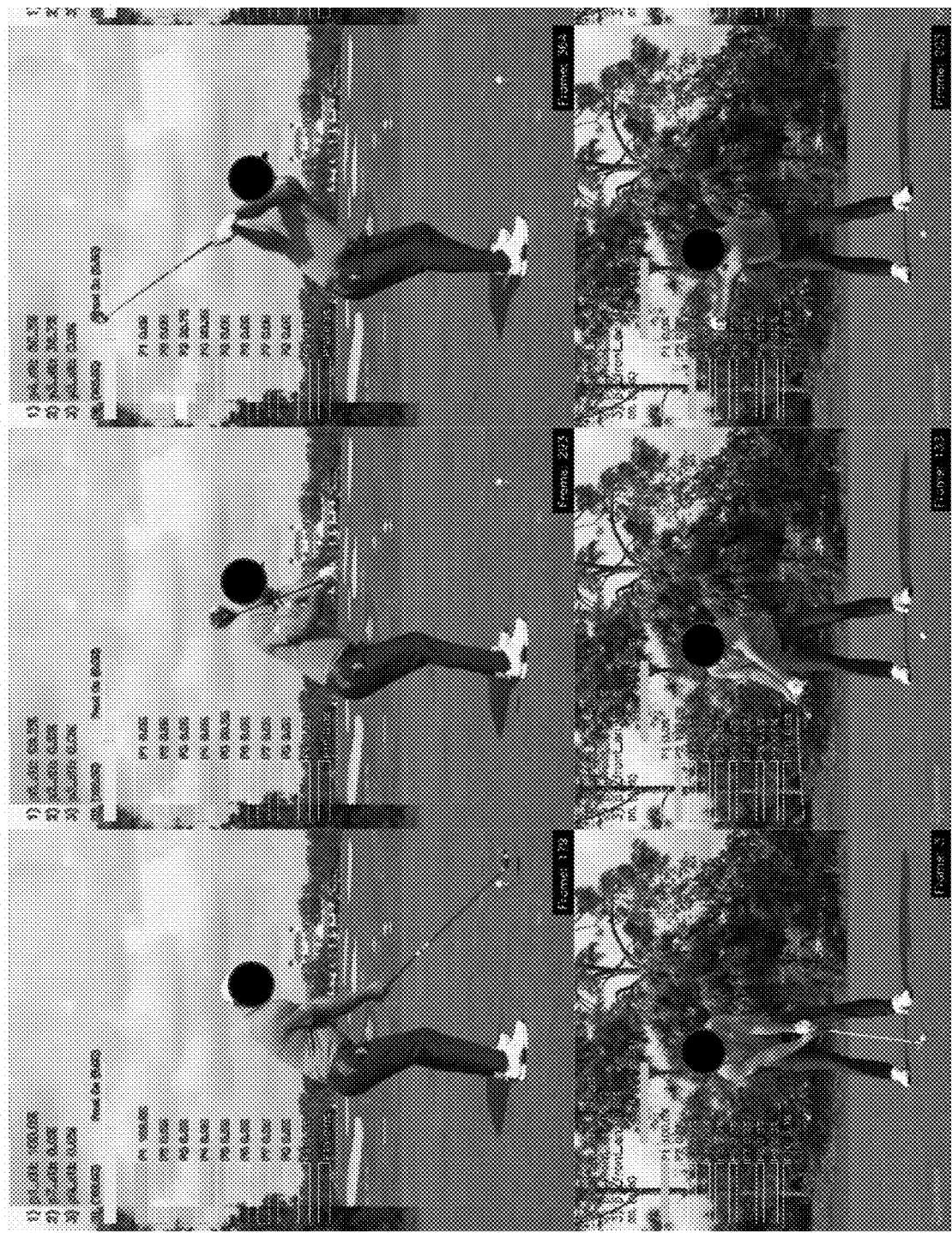
FIG. 11A illustrates an output generated in connection with testing of a 3D modeling function.

FIG. 11A shows clips from two different videos of the same golfer, including a first video that captures a down-the-line view (shown on the top portion) and a second video that captures a side or front-facing view (shown on the bottom portion). These videos are not synchronized and were captured at different times for different golf swing motions. Using the techniques described herein, the two video feeds were able to be synched, and pose estimation and/or pose detection functions were applied to extract 2D poses from both viewpoints. Additionally, triangulation of the joints was performed by adjusting for camera parameters and generating 3D coordinates. These triangulated points were then filtered for temporal smoothing and a 3D model was generated.

Figure 11B:
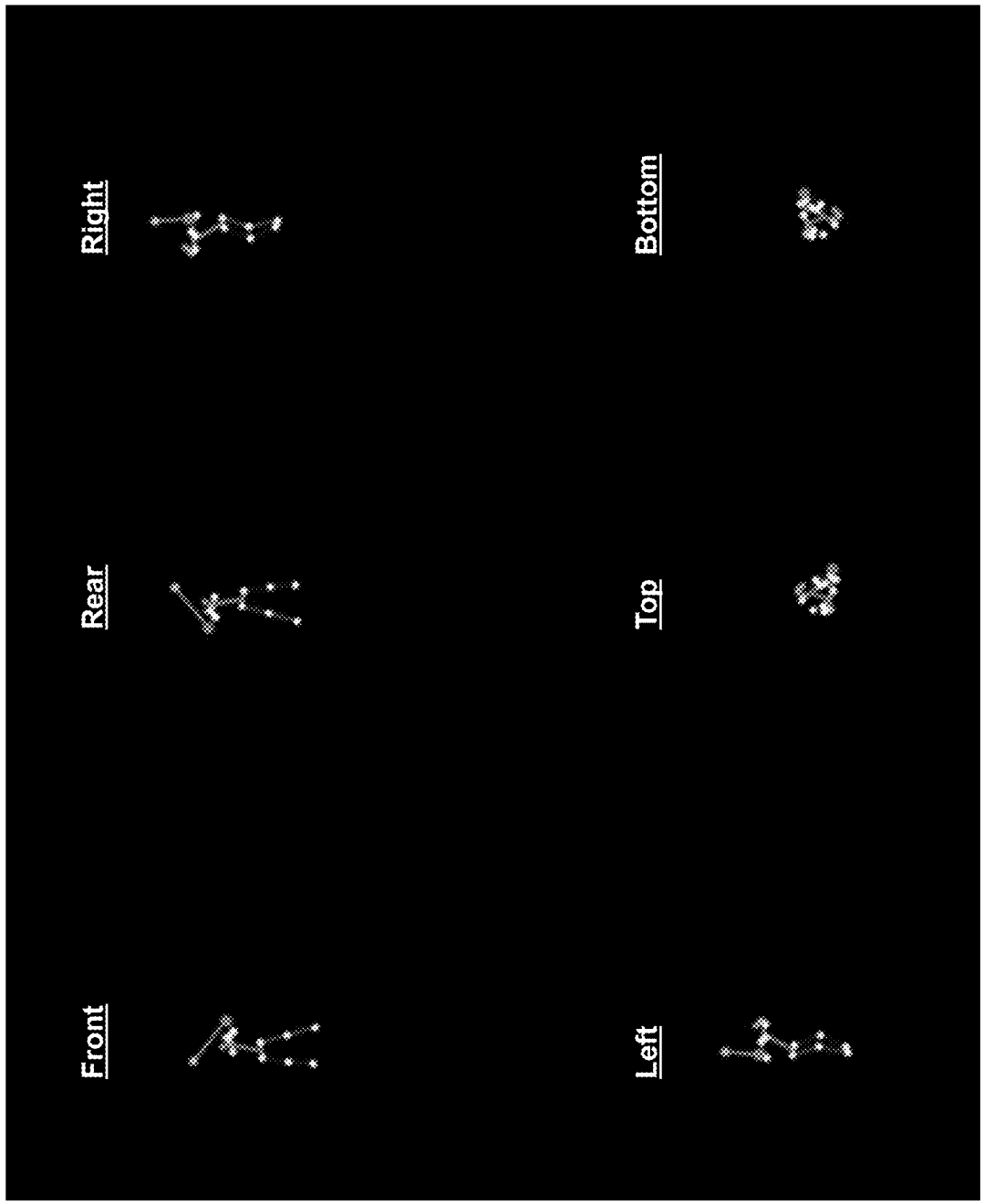
FIG. 11B illustrates another output generated during testing of the 3D modeling function.
Figure 11C:
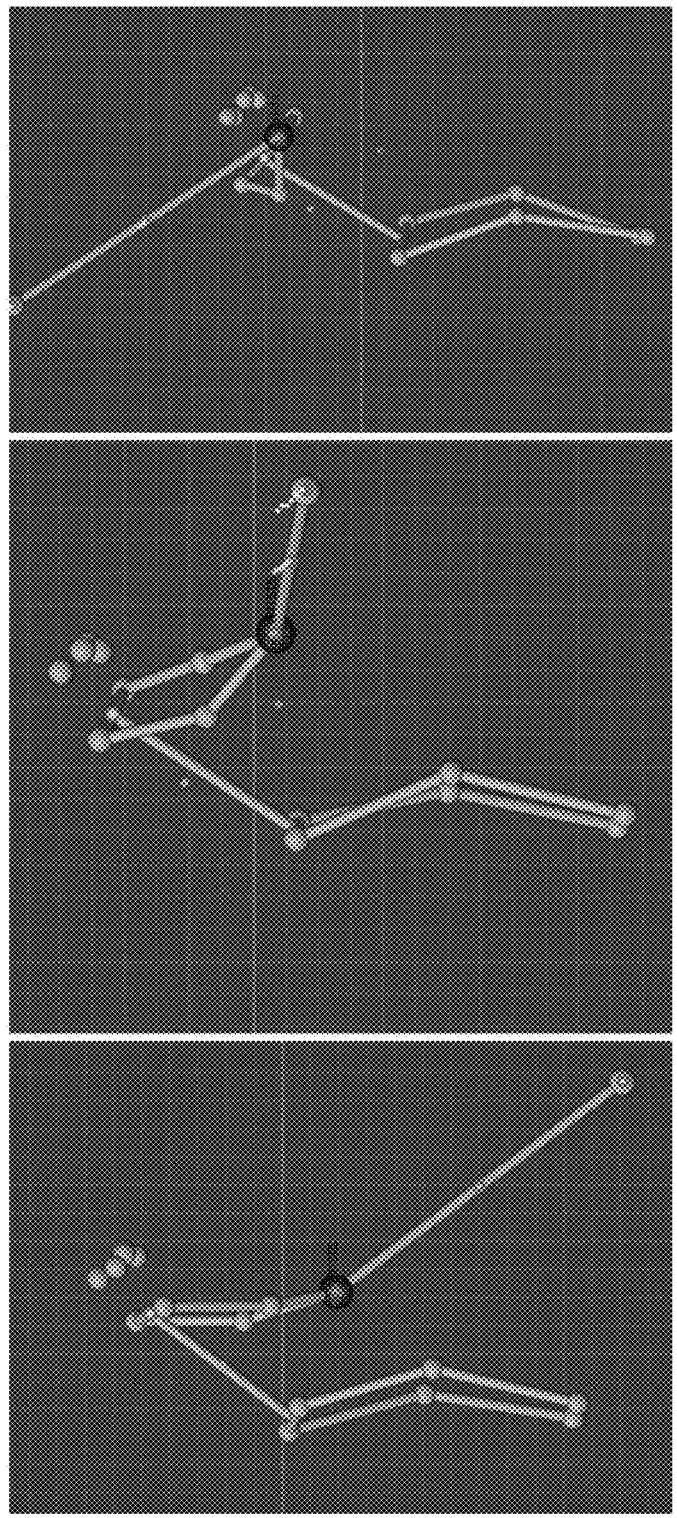
FIG. 11C illustrates another output generated during testing of the 3D modeling function.

FIG. 11B illustrates various viewpoints of the aforementioned 3D model that was generated. FIG. 11C shows closeups of three of the viewpoints for the 3D model. The 3D model was generated by a 3D modeling function using the synched motions from the videos capturing the down-the-line and front-facing views. The motions from the videos were extracted and a dynamic time warping function was applied to synch the motion paths, while generating the minimum data needed to generate the 3D model.

Figure 11E:
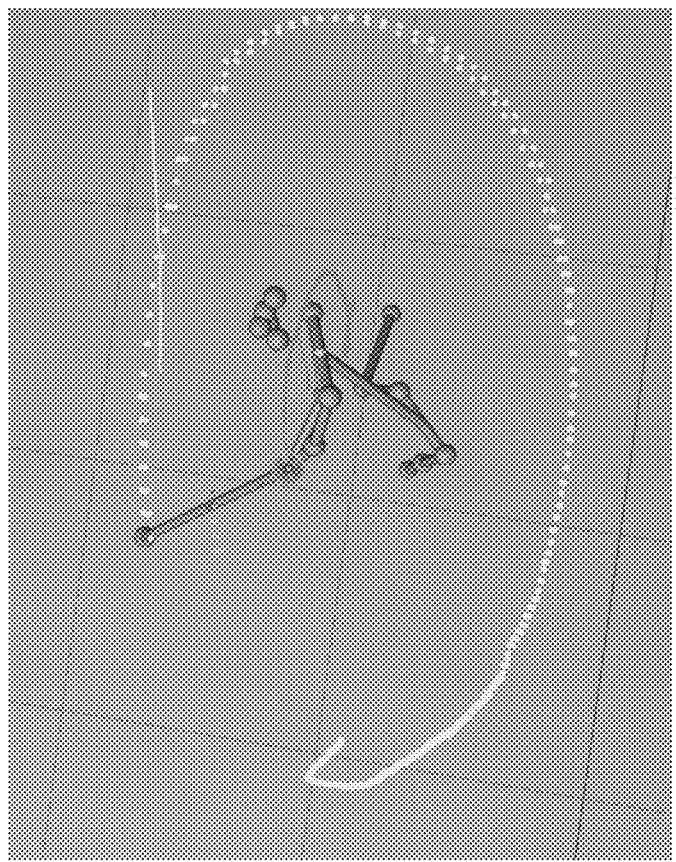
FIG. 11E illustrates another output generated during testing of the 3D modeling function.
Figure 11D:
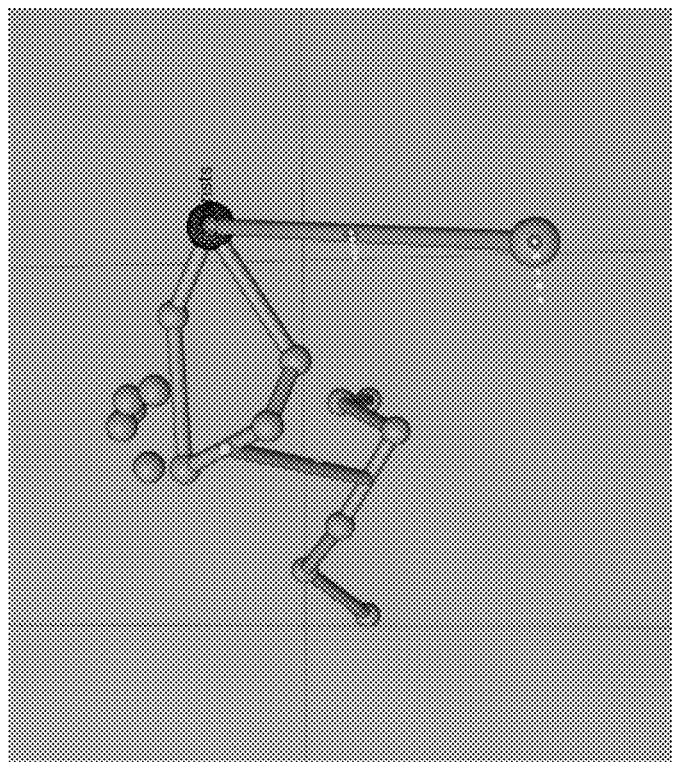
FIG. 11D illustrates another output generated during testing of the 3D modeling function.

The 3D modeling allows for different views to be generated, including views that were not included in the original, monocular video content. FIGS. 11D and 11E are both views that are made available by the generation of the 3D model, but which were not shown in the original, monocular video content. FIG. 11D is an overhead view showing the golfer's hip and shoulder rotation in detail, while FIG. 11E is a different overhead view with clubhead tracking that allows for assessing the club path and plane.

Figure 11F:
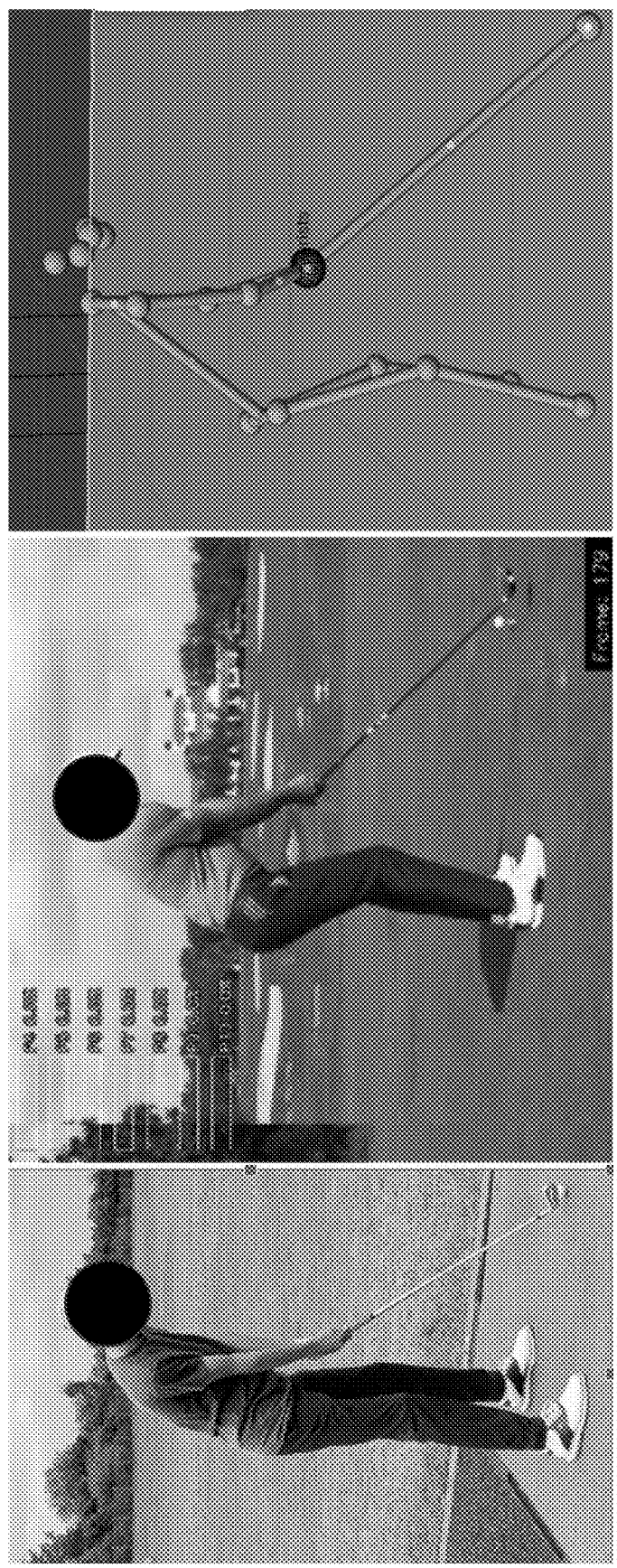
FIG. 11F illustrates another output generated during testing of the 3D modeling function.
Figure 11G:
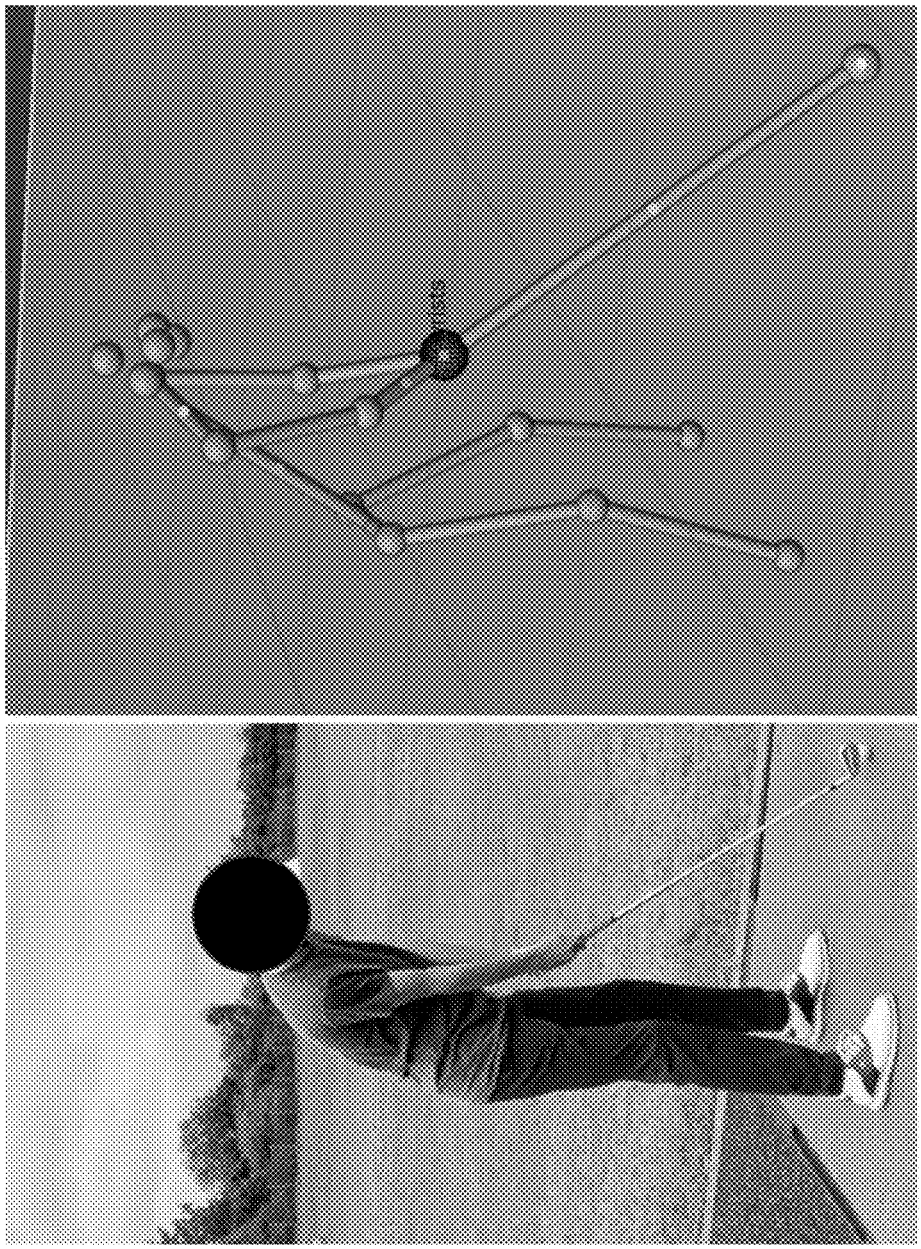
FIG. 11G illustrates another output generated during testing of the 3D modeling function.

A motion template was created that included the videos capturing the two views of the golfer (i.e., the down-the-line and front-facing views) and the 3D model that was generated, and a comparative motion analysis was performed using a video of a student golfer (see FIG. 11F). It was observed that the student's video was misaligned in the P1 position and, therefore, a comparison with the original down-the-line view may lead to inaccurate results. However, the 3D model was able to be leveraged to obtain accurate results. Specifically, by rotating the 3D model to match the student's camera angle (see FIG. 11G), it became possible to make further comparisons, resulting in accurate results.

Returning to FIG. 2, in certain embodiments, the motion template 165 also can be integrated with various types of annotation data 155E. In some examples, the annotation data 155E can include annotations appended to one or more frames of the reference video 140A, such as arrow markers, alphanumeric annotations, or other insertions identifying joint angles, body positions, and motion paths. These annotations serve to highlight notable aspects of the motion, providing visual cues that can assist in understanding and analyzing the biomechanical elements of the motion.

Additionally, or alternatively, the annotation data 155E may include instructional data, such as step-by-step guidance describing or highlighting aspects of performing the motion included in the motion template 165. This instructional data can be incorporated as audio-based annotations (e.g., audio clips integrated with the reference video 140A) and/or visual annotations (e.g., by inserting text, numbers, and/or visual indicators into the video sequence).

For a motion template corresponding to a golf swing motion, annotation data 155E may include detailed visual and textual elements that enhance the understanding of the swing mechanics. For instance, arrow markers could be used to indicate the direction of the swing path or body part positioning, while alphanumeric annotations might specify the optimal angles for the golfer's arms and legs at various stages of the swing. Additional annotations could highlight the position of the golfer's hips and shoulders, providing insights into body alignment and rotation. Motion paths could be traced to illustrate the trajectory of the club head throughout the swing. Furthermore, instructional data might be integrated, offering step-by-step guidance on achieving the ideal swing form, such as maintaining a consistent grip or ensuring proper weight transfer. This instructional content could be delivered through audio clips that play alongside the video or through visual indicators that appear at key moments in the swing sequence, offering feedback and suggestions for properly emulating the swing motion.

Similar types of annotation data 155E can be integrated with motion templates for biomechanical sport motions 145 (e.g., for tennis swings, baseball pitches, etc.).

In some embodiments, the annotation data 155E inserted into the videos 140 can be generated by one or more annotation functions 260 that leverage generative AI and/or feature analysis capabilities of the computer vision system 151. Additionally, or alternatively, the annotation data 155E may be inserted by a trainer end-user 105A into the videos using the template definition functions 205.

In certain embodiments, the motion template 165 also can be integrated with various types of deviation tolerance settings 156. The deviation tolerance settings 156 can define customizable thresholds indicating acceptable variations in the execution of a biomechanical sport motion 145 that is the subject of a motion template 165. In certain embodiments, the deviation tolerance settings 156 can permit the system to determine the extent to which a trainee's performance can deviate from the motion captured in the template before corrective feedback is triggered or highlighted. By setting these thresholds, trainers can tailor the level of precision required for different skill levels or training objectives, ensuring that feedback is appropriately aligned with the trainee's progress and capabilities. This flexibility enables a more personalized training experience, accommodating the unique needs and goals of each individual.

After a trainee end-user provides one or more videos 140 capturing the trainee's performance of the biomechanical sport motion 145, the computer vision system 151 may extract various motion features 155 from each of the videos 140 to enable analysis of the biomechanical sport motion 145. Any or all of the motion features 155 described in this disclosure (including object feature data 155A, motion path analysis data 155B, motion checkpoint data 155C, 3D modeling data 155D, and/or annotation data 155E) can be extracted or derived for the trainee videos 140.

The comparative motion analyzer 170 may utilize the extracted motion features 155 to compare the trainee's biomechanical sport motion 145 with the biomechanical sport motion 145 captured in the motion template 165. The deviation tolerance settings 156 can serve as thresholds for determining the acceptable range of variation in a trainee's performance compared to the motion captured in the motion template 165, thereby triggering corrective feedback when deviations exceed these predefined limits.

In some examples, the deviation tolerance settings 156 can be utilized to analyze a golf swing motion by establishing specific thresholds that define acceptable variations in the execution of the swing. These settings allow the system to assess a trainee's performance against a benchmark motion template, which captures proper execution of the golf swing. For instance, the settings can specify permissible deviations in key aspects such as hip rotation, shoulder alignment, and club angle at various checkpoints throughout the swing, such as the top of the backswing or the point of impact. When a trainee's swing deviates beyond these thresholds, the system can automatically generate corrective feedback, highlighting areas that require improvement. This approach facilitates feedback that is precise and tailored to the trainee's unique swing characteristics, facilitating targeted coaching and enhancing the overall effectiveness of the training process. By utilizing deviation tolerance settings 156, the sports training system 150 and/or trainers can provide personalized guidance that helps trainees refine their technique and achieve a more consistent and effective golf swing.

In certain embodiments, the deviation tolerance settings 156 and/or comparative motion analyzer functionalities can be stored directly with the data defining the motion template 165. Additionally, or alternatively, the deviation tolerance settings 156 and/or comparative motion analyzer 170 can be stored by the sports training platform 150 and associated with the corresponding motion template 165. In either configuration, the deviation tolerance settings 156 may be accessed by the comparative motion analyzer 170 when a comparison is being performed between a trainee-provided video and the motion template 165.

As demonstrated above, the sports training system 150 provides trainer end-users with automated functionalities, including AI computer vision functionalities, for rapidly generating motion templates 165. The sports training system 150 also can provide the trainer end-users with access to various template definition functions 205, which permit the trainer end-users to further refine the motion templates.

The template definition functions 205 can enable trainer end-users to further supplement, modify, edit, refine, and/or customize the motion templates 165. In general, the template definition functions 205 can enable a trainer end-user to modify any parameter associated with a motion template 165. In some embodiments, the template definition functions 205 can enable a trainer end-user to modify aspects of the motion features 155 that were extracted or generated by the computer vision system 151. In one example, the template definition functions 205 may include electronic controls for inserting or identifying motion checkpoint data 155C for a reference video 140A and/or modifying the motion checkpoint data 155C that was extracted by the computer vision system 151. In another example, the template definition functions 205 may include electronic controls for inserting annotation data 155E into the reference video (e.g., such as by inserting arrows or angle information and/or inserting verbal or textual instructions at various checkpoints) and/or modifying the motion checkpoint data 155C that was extracted by the computer vision system 151. The template definition functions 205 also may include electronic controls that enable the trainer end-user to modify the deviation tolerance settings 156 associated with motion template 165.

The sports training system 150, template management system 160, and/or motion templates 165 may store code and/or instructions that facilitate various types of analysis and generation of feedback information when the motion templates 165 are applied to assess or analyze biomechanical sport motions 145 captured in videos 140 provided by trainee end-users. In some examples, an AI-driven algorithm or other feedback mechanism may provide instant corrective guidance to a trainee end-user based on a comparison of the biomechanical sport motion 145 captured in the motion template 165 with a biomechanical sport motion 145 captured in the trainee-provided video. In other examples, the comparative motion analyzer 170 may be configured to compare the trainee's videos 140 with a motion template 165 and provide automated feedback based on the comparison (e.g., feedback indicating that certain portions of the motion were properly performed and/or feedback indicating that certain portions of the motion were not properly performed based on the deviation tolerance settings 156).

The motion templates 165 created by the trainer end-users can be integrated with various types of feedback mechanisms 270 that are designed to provide guidance, analytics, advice, and/or other feedback to enhance the training of the trainee end-users. In some examples mentioned above, a feedback mechanism 270 can generate data associated with the comparative analyses performed between trainee video sequences 140 and reference video sequences 140A (e.g., visually demonstrating when the trainee's motion deviates from the benchmark motion and/or is performed correctly according to the benchmark motion). In other examples, a feedback mechanism 270 can leverage computer vision analyses to dissect and evaluate the biomechanical sport motions captured in trainee-provided videos, such as to provide automated quantitative feedback to the trainee end-users. In further examples, a feedback mechanism 270 can automatically generate and insert annotations directly into the video content, providing visual cues, metrics, and/or instructions that highlight aspects of the trainee's motion, such as joint angles or body alignment, which are useful for refining technique. Additionally, or alternatively, the trainer end-users can generate and/or insert these annotations into the video content.

In certain embodiments, a feedback mechanism 270 also may offer real-time training advice to trainee end-users. For example, as trainees perform their sport motions (and those motions are captured by a camera), a feedback mechanism 280 can be configured to generate and insert annotations into the video sequences in real-time or near real-time. For instance, if a trainee's swing deviates from the benchmark motion beyond a certain threshold (e.g., as specified by the deviation tolerance settings 156), the system can overlay annotations indicating the necessary adjustments and/or highlighting portions of the motion that deviate. These annotations serve as immediate corrective guidance, helping trainees adjust their movements on the spot.

In certain embodiments, the feedback mechanisms 270 described throughout this disclosure can be integrated into the motion templates 165 themselves. Additionally, or alternatively, the feedback mechanisms 270 can be integrated into functions or components of the sports training platform 150 which are external to the motion templates 165.

The creation of motion templates introduces several technical and technological advancements that significantly enhance training processes. One key improvement is the use of an AI-powered computer vision system 151 to extract and analyze motion features from reference videos 140A, enabling the generation of highly detailed and accurate motion templates that provide benchmarks for trainee end-users. The computer vision system 151 can identify key biomechanical markers and motion checkpoints, providing a comprehensive framework for evaluating and improving athletic performance. Additionally, embedding the templates with motion data streamlines downstream operations by eliminating the need for repeated motion extraction during comparisons with trainee videos. This approach reduces computational demands, as the resource-intensive functions for motion extraction are executed during the initial creation of the templates, allowing for faster and more efficient analysis for downstream processing. These technological improvements not only streamline the training process, but also enhance the quality and precision of the feedback provided, leading to more effective and efficient skill development.

While the preceding description provides examples of techniques for constructing motion templates 165, these examples are not exhaustive, and various modifications are possible. For instance, in certain embodiments, a motion template 165 might exclude some of the features, parameters, or information mentioned above, or it might incorporate additional features, parameters, or information. Furthermore, while the description outlines certain features, parameters, and information as being generated by a computer vision system 151 with AI capabilities, similar features, parameters, and information can also be derived using alternative methods or sourced from different origins.

Exemplary Techniques for Motion Template Access & Dissemination

In certain embodiments, the sports training system 150 facilitates the distribution of motion templates 165 to trainee end-users through a template management system 160, which can include a marketplace where motion templates 165 can be accessed, purchased, and/or downloaded. The template management system 160 permits trainees to easily download and/or access desired motion templates 165 via their respective end-user applications 115, integrating the templates into their training regimen for immediate usage.

In certain embodiments, the template management system 160, or other components of the sports training system 150, can permit trainer end-users to create profiles that showcase their professional credentials and expertise. These profiles can include a variety of information, such as the trainer's name, physical location, and detailed descriptions of their areas of expertise. Additionally, trainer end-users can associate the motion templates 165 they have developed with their profiles. These profiles permit trainers to highlight their unique training methodologies and the specific motion templates they offer, thereby enhancing their visibility and appeal to potential trainee end-users seeking specialized training.

In certain embodiments, the template management system 160, or other components of the sports training system 150, can permit trainee end-users to search for trainer end-users and view the profile information corresponding to the trainer end-users. If desired, the trainee end-users also can provided with functionalities for subscribing to and/or hiring desired trainer end-users, as well as functionalities for accessing and/or purchasing desired motion templates 165.

Figure 3:
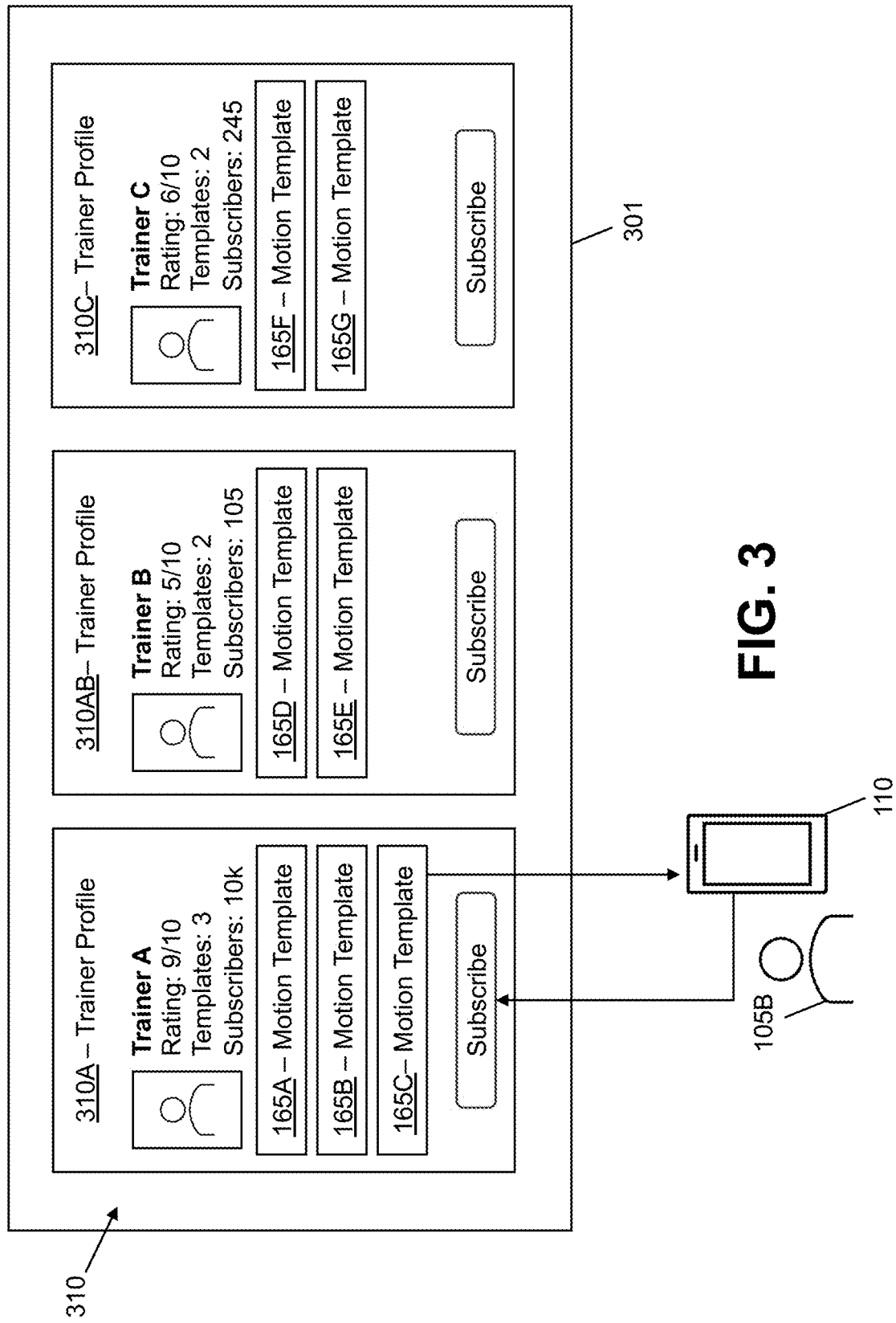
FIG. 3 illustrates an exemplary graphical user interface that may be utilized by trainee end-users to access motion templates according to certain embodiments.

FIG. 3 illustrates an exemplary graphical user interface (GUI) 301 that may be accessed by trainee end-users 105B to select trainer end-users and/or motion templates 165 created by trainer end-users according to certain embodiments. In certain embodiments, the GUI 301 may be accessed via an end-user application 115, such as a mobile app or web browser, installed on a computing device 110 operated by a trainee end-user 105B. In certain embodiments, the GUI 301 may be generated and/or presented by the template management system 160 of the sports training system 150.

In this example, three trainer profiles 310 are displayed on the GUI 301, including a first trainer profile 310A corresponding to Trainer A, a second trainer profile 310B corresponding to Trainer B, and a third trainer profile 310C corresponding to Trainer C. As mentioned above, each of the trainer profiles 310 can include various information about a corresponding trainer end-user, such as the trainer's name, physical location, expertise description, etc. In some embodiments, each trainer profile 310 may also include feedback from trainees, such as ratings and reviews, provided by those who have utilized the services of the corresponding trainer. Additionally, in some embodiments, each trainer profile 310 may also indicate how many trainee end-users (or "Subscribers") have utilized the trainer's services in the past and/or how many trainer end-users are currently using the trainer's services.

Each of the trainer profile 310 also may include a listing of motion templates 165 that have been created by the corresponding trainer end-user. In this example, the first trainer profile 310A displays three motion templates (motion template 165A, motion template 165B, and motion template 165C) created by Trainer A, the second trainer profile 310B displays two motion templates (motion template 165D and motion template 165E) created by Trainer B, and the third trainer profile 310C displays two motion templates (motion template 165F and motion template 165G) created by Trainer C.

A trainee end-user 105B may evaluate the trainer profiles 310 and/or motion templates 165 offered by the trainer end-users 105A in deciding which trainer to select and/or hire for training services. In some embodiments, the sports training system 150 may enable the trainee end-user 105B to hire or subscribe to services provided by desired trainer end-users 105A. Additionally, or alternatively, the sports training system 150 may enable the trainee end-user 105B to access and/or purchase desired motion templates 165 offered by the trainer end-users 105.

Once a trainee end-user selects or purchases training services and/or motion templates 165 from a desired trainer end-user, the sports training system 150 can establish a private connection between the two parties. This connection facilitates the delivery of personalized training services from the trainer end-user 105A to the trainee end-user 105B. For instance, the trainee end-user 105B can share videos 140 capturing their biomechanical sport motions 145 with the trainer end-user 105A, who can then review these videos and provide detailed feedback. The sports training system 150 equips the trainer with tools to annotate the videos, highlighting areas for improvement or adjustment. Additionally, both the trainer and the trainee can utilize the motion templates 165 to compare the trainee's performance against the benchmark set in the motion templates, thereby enhancing the training process.

In one example involving golf training, a golf trainee searches for and selects a desired golf trainer through the sports training system 150. The trainee can access one or more motion templates 165 created by the trainer to compare their golf swings against these benchmarks. The trainee also has the option to supply videos of their golf swings to the trainer via the sports training system 150. The golf trainer can then review these videos and provide feedback to the trainee. As described in other portions of this disclosure, the trainer and/or trainee can synchronize the trainee's videos with the golf motion captured in the template to facilitate a detailed comparison. The trainer can further enhance this process by annotating the synchronized videos, and offering targeted insights and guidance to improve the trainee's technique.

The ability for trainers to create and disseminate motion templates offers several significant advantages. Firstly, it allows trainers to extend their reach beyond geographical limitations, enabling them to provide expert guidance to trainees worldwide. This scalability enhances the trainer's visibility and reputation. Additionally, motion templates serve as structured training tools that provide trainees with clear benchmarks to emulate, facilitating consistent and effective learning. The integration of automated feedback mechanisms within these templates enables trainees to receive immediate, data-driven insights into their performance, promoting faster skill development. Overall, the creation and dissemination of motion templates empower trainers to deliver high-quality, personalized training experiences efficiently and effectively.

The creation and dissemination of motion templates also bring about notable technical and technological improvements. By incorporating advanced AI-driven analysis and computer vision technologies, these templates allow for precise motion capture and detailed biomechanical analysis. This technological integration enables trainers to provide highly accurate and personalized feedback, which can be important for refining techniques and improving performance.

Furthermore, the pre-processing of motion data within the templates 165 also provides technical advantages that permit comparisons of trainee motions with template motions more rapidly. Because the templates are embedded with the motion data prior to their dissemination to trainee end-users, this reduces computational demands during subsequent analyses (e.g., comparative motion analyses), allowing for rapid synchronization and/or comparison with trainee videos. This efficiency not only saves time, but also enhances the overall user experience by providing real-time, or near real-time, feedback to the trainee end-users. These technological advancements collectively enhance the effectiveness and accessibility of sports training.

Exemplary Synchronization & Comparative Motion Techniques

The sports training system 150 and/or motion templates 165 can include a comparative motion analyzer 170 that can be configured to execute various types of analyses associated with comparing trainee-provided videos 140 with motion templates 165.

As mentioned above, in some embodiments, the comparative motion analyzer 170 can be configured to compare trainee-provided videos 140 with motion templates 165 by leveraging functionalities of the computer vision system 151. For example, the computer vision system 151 may extract motion features 155 from the trainee-provided videos 140, which can include any of the motion features described herein, such as object feature data 155A, motion path analysis data 155B, motion checkpoint data 155C, 3D modeling data 155D, and/or annotation data 155E. These extracted features can be utilized for analyzing the biomechanical sport motions 145 captured in the trainee-provided videos 140 and/or comparing the biomechanical sport motions 145 of the trainee with benchmark motions established by the motion templates 165.

In certain embodiments, the comparative motion analyzer 170 utilizes these extracted motion features 155 to perform a detailed comparison with the motion features embedded in the motion templates 165. By doing so, it can detect discrepancies between the trainee's performance and the benchmark motion captured in the template. This process allows for the identification of areas where the trainee's motion deviates from the benchmark, providing targeted feedback to enhance performance. In some embodiments, the deviation tolerance settings 156 associated with the motion template are employed to determine acceptable ranges of variation. These settings help in detecting discrepancies and generating feedback, ensuring that the feedback is aligned with the trainee's skill level and training objectives.

In certain embodiments, the comparison process executed by the comparative motion analyzer 170 can compute distance metrics to quantify the differences between the two sets of motion data (between trainee videos and motion templates). These distance metrics may indicate the deviation between the trainee's performance and the benchmark motion captured in the template. In some examples, Euclidean distance and/or cosine similarity can be used to measure the distance between corresponding key points in the trainee's motion and the template within a multi-dimensional feature space. By calculating these metrics, the system can generate precise feedback on specific areas where the trainee's motion diverges from the benchmark motion, enabling targeted corrections and enhancing the overall training effectiveness.

In some exemplary scenarios involving the analysis of a trainee's golf swing motion, the comparative motion analyzer 170 can utilize the computer vision system 151 to extract various motion features 155 from the trainee's video. For instance, these features might include the trajectory of the golf club, the angles of the trainee's joints at key positions, and the overall motion path of the swing. The system can then compare these extracted features with those incorporated into a motion template 165, which represents a benchmark golf swing. By examining the differences in joint angles at critical checkpoints, such as the top of the backswing or the point of impact, the system can identify specific areas where the trainee's swing deviates from the benchmark. For instance, if the trainee's hip rotation is less pronounced than the template's, the system might highlight this as an area for improvement. Additionally, the system can provide visual feedback, such as overlaying the trainee's swing with the benchmark swing, to help the trainee understand the discrepancies and make necessary adjustments. This detailed analysis not only aids in refining the trainee's technique, but also supports personalized training by accommodating the trainee's unique biomechanics and skill level.

In certain embodiments, the comparative motion analyzer 170 also may be configured to execute a motion synchronization function 175 that is adapted to generate a synchronized video output that aligns or synchronizes a biomechanical sport motion 145 captured in a trainee-provided video 140 with a benchmark biomechanical sport motion 145 captured in a motion template 165. In some examples, the motion synchronization function 175 aligns checkpoints in the two motions, allowing for precise comparison at each checkpoint. By synchronizing key positions, such as the top of a backswing or the point of impact in a golf swing, the motion synchronization function 175 can permit evaluation of both the trainee's and the trainer's motions at identical stages, facilitating a detailed analysis of technique and form.

In some examples, the synchronized video output may comprise both the trainee-provided video 140 and the reference video 140A included in the motion template 165. The trainee video and trainer video can be presented in a vertical alignment (e.g., displaying the trainer video directly above the trainee video) or side-by-side (e.g., displaying the trainer video horizontally adjacent to the trainee video), depending on the user's preference.

Aligning the two motions is beneficial for training purposes as it highlights discrepancies and areas for improvement in the trainee's technique. By providing a direct comparison with a benchmark motion, trainees can easily identify deviations in their form, such as incorrect angles or timing issues, and receive targeted feedback to correct these errors. This process not only enhances the trainee's understanding of the ideal motion but also accelerates skill development by offering a clear visual reference for improvement.

Traditionally, the primary means for visually comparing a trainee video with a trainer video required an individual to open two separate videos and manually play each video independently. This traditional technique is ineffective if the tempos or motion speeds of the videos are different, as it becomes challenging to accurately compare the motions when they are not synchronized. Additionally, to rewatch a segment of a motion, the individual needs to rewind both videos and attempt to play them again at the same time, which can be cumbersome and time-consuming. This manual process not only requires significant manual effort but also lacks precision, making it difficult to identify subtle differences in technique or form between the trainee and the trainer.

The motion synchronization function 175 overcomes these problems by executing a process with automatically aligns trainee videos with the reference videos 140A included in the motion templates 165.

To effectively synchronize a trainee-provided video 140 with a trainer-provided reference video 140A, several technical challenges can be attributed to the potential asynchronous nature of the videos including:

1. the trainee-provided video 140 and the trainer-provided reference video 140A may have asynchronous frame rates;
2. the trainee-provided video 140 with a trainer-provided reference video 140A may capture biomechanical sport motions 145 having asynchronous tempos (e.g., the speed or rate at which the biomechanical sport motion 145, or segments of the biomechanical sport motion 145, are performed in each video may vary);
3. the trainee-provided video 140 with a trainer-provided reference video 140A may capture biomechanical sport motions 145 from asynchronous views (e.g., reference video 140A may capture the motion from a side or profile view, and trainee-provided video 140 may capture the motion from a front, rear, or perspective view); and/or
4. the biomechanical sport motions 145 in the trainee-provided video 140 and the trainer-provided reference video 140A may be performed by individuals with different dominant hands, legs, or stances (e.g., the trainee may be right-handed while the trainer may be left-handed).

Additional technical challenges may be presented by performing the synchronization process in a time-efficient manner that does not require the trainee end-user to wait for extended periods of time, thereby inhibiting the trainee from rapidly obtaining corrective feedback.

As explained throughout this disclosure, the motion synchronization function 175 can overcome the aforementioned technical challenges as well as other technical challenges. Amongst other things, the motion synchronization function 175 permits synchronization of asynchronous videos having different frame rates, tempos, and/or views, as well as videos that capture individuals with opposite dominant hands, legs, or stances. Additionally, the motion synchronization function 175 can be designed to execute a process that minimizes resource intensity, allowing it to be rapidly executed in real-time or near real-time to provide immediate corrective feedback to trainee end-users.

In certain embodiments, the full processing pipeline—including feature extraction, dimensionality reduction, dynamic time warping, and synchronized video output generation—can be executed in real-time or near real-time on consumer-grade devices, such as smartphones, tablets, or laptops. This real-time capability enables immediate feedback to users during live motion capture or near-instantaneous review of recorded sequences. By optimizing the motion analysis and synchronization processes for performance efficiency, the system provides a responsive and interactive training experience without the need for specialized hardware or cloud-based computing resources.

Figure 4:
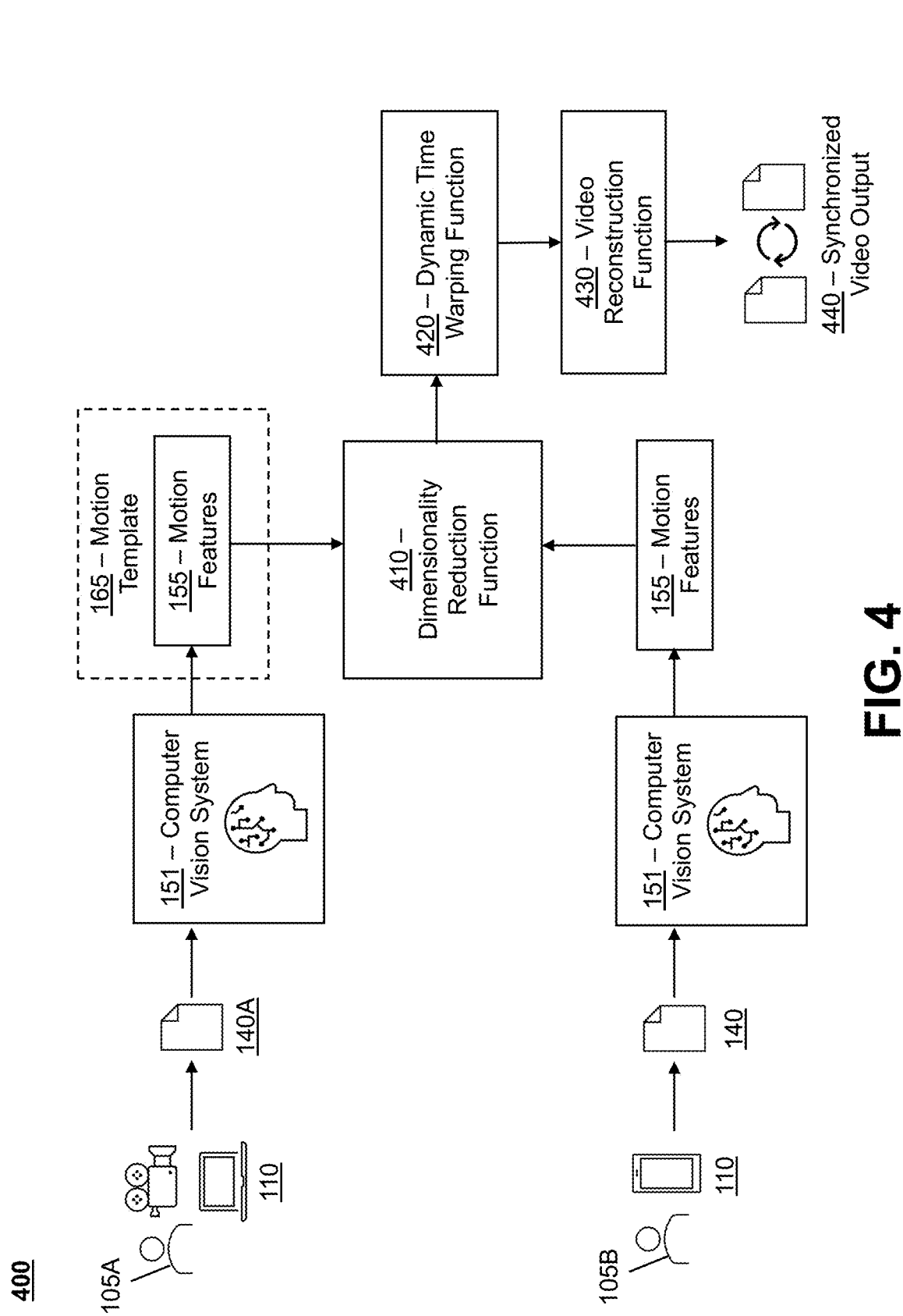
FIG. 4 is a flow diagram illustrating an exemplary motion synchronization technique according to certain embodiments.

FIG. 4 is a flow diagram illustrating an exemplary process flow 400 implementing the motion synchronization function 175 according to certain embodiments. The process flow 400 may be applied to synchronize trainee-provided videos 140 and trainer-provided references videos 140A, including in scenarios where the videos are asynchronous.

The top portion of the figure illustrates a portion of the process flow 400 that can be applied to process a reference video 140A supplied by a trainer end-user 105A, while the bottom portion of the figure illustrates a portion of the process flow 400 that can be applied to process a video 140 supplied by a trainee end-user 105B.

The trainer end-user 105A may capture the reference video 140A using a computing device 110 (e.g., such as a mobile electronic device, smartphone, and/or video camera). The reference video 140A can be analyzed by the computer vision system 151, which operates to extract motion features 155 corresponding to the reference video 140A. In some embodiments, the motion features 155 may be integrated with a motion template 165 as described above (although such is not necessary). Along similar lines, the trainee end-user 105B may capture a video 140 using a computing device 110, and motion features 155 may be extracted from the video 140A by the computer vision system 151.

The specific motion features 155 that are extracted, as well as the manner in which they are extracted may vary. In some embodiments, the motion features 155 may include features corresponding to human poses corresponding to checkpoints in the videos. Additionally, or alternatively, the motion features 155 may include detailed motion trajectories of key objects involved in the biomechanical sport motions (e.g., the individual's hands, hips, feet, arms, head, sporting equipment, etc.).

In certain embodiments, one or more object detection models associated with the computer vision system 151 can be employed to track and identify specific motion-relevant objects within the videos. Any appropriate object detection model can be utilized including, but not limited to, YOLO (You Only Look Once), Faster R-CNN (Region-based Convolutional Neural Network), or DETR (Detection Transformer). In some examples, one or more object detection models extract objects and/or motions of objects from the videos (e.g., such as pose trajectory vectors across a defined sequence of frames), and a neural ordinary differential equation (neural ODE) model can be applied to generate smooth, as continuous motion functions (f1(t) and f2(t) for each video. The neural ODE model can be trained to approximate a differential motion function that represents the dynamics governing the movement of key points extracted from each video. During inference, a numerical ODE solver may be applied to the trained model to generate continuous motion trajectories that smoothly interpolate the positions of these key points over time. Training the neural ODE to learn such a differential motion function provides a more precise and temporally consistent understanding of motion dynamics, enabling improved analysis and synchronization of the motions captured in both the trainee and reference videos.

By applying these techniques, the system can generate smooth, continuous motion functions $f_1(t)$ and $f_2(t)$ for each video. These functions provide a detailed representation of the motions, capturing the fluidity and nuances of the movements. This approach not only enhances the accuracy of motion analysis, but also facilitates the synchronization and comparison of motions between the trainee and trainer videos, enabling more effective feedback and training outcomes.

Various types of training procedures can be utilized. In some embodiments, a training procedure can be applied which initially involves collecting, compiling, and/or accessing a dataset of motion trajectories from multiple videos. Preferably, the dataset may include motion trajectories that vary in motion tempo (e.g., golf swing tempo) and/or motion style (e.g., golf swing style). The dataset can be utilized to train a neural ODE model to predict object motion using a learning function. An exemplary learning function is provided below for such training.

$$\frac{dx}{dt} = f_\theta(x, t)$$

wherein:
x(t)=object position at time t; and
$f_\theta$ corresponds to a neural network that learns the velocity field.

A loss function, such as one that uses mean squared error (MSE), can be applied between predicted and actual motion paths. The training procedure also may validate the model by comparing its predictions to actual swing data. Once trained, the neural ODE model can generalize to new videos without retraining.

Given a sequence of video frames V={$I_1, I_2, \ldots, I_N$}, an object detection model can output bounding boxes $B_t=[x_t, y_t, w_t, h_t]$ where:

$x_t, y_t$ =center coordinates of the detected object at frame t;
$w_t, h_t$=width and height of the detected bounding box; and
t=frame index or timestamp.
The discrete object motion trajectory can represented as follows:

$$\mathcal{M} = \{(x_t, y_t)\}_{t=1}^N.$$

The discrete object motion trajectory can then be converted into a continuous function using the neural ODE:

$$\frac{dX}{dt} = f_\theta(X, t)$$

where:
X(t)=[x(t), y(t)] is the detected object's position; and
$f_\theta$ corresponds to a neural network that models the velocity field.
The solution to this ODE can be formulated as follows:

$$X(t) = X_0 + \int_0^t f_\theta(X, s)ds$$

where $X_0$ is the initial position.

The above process is one potential technique that can be used for extracting the continuous motion features from the videos 140.

In other implementations, the computer vision system 151 may additionally, or alternatively, utilize a C3D (Convolutional 3D) model, or other similar deep learning model, designed for spatiotemporal feature extraction from video data to extract the motion features 155 from the trainer reference video 140A and/or trainee-provided video 140. In some examples, the C3D model can be used to extract spatiotemporal motion features from video sequences, which may then be compared or synchronized using downstream alignment functions such as dynamic time warping. In other examples, a hybrid approach could be employed that utilizes the C3D model to extract the motion features 155, and then it fits a neural ODE to enable continuity, generating smooth and continuous motion trajectories for further analysis and synchronization.

In the context of analyzing a golf swing motion in both trainer and trainee videos, the computer vision system 151 can employ one or more object detection models to track and identify key motion-relevant objects, e.g., which may include the golf club head, the golfer's hands, arms, torso, and legs. The system can extract motion features 155 corresponding to the trajectory of the golf club, joint angles at various stages of the swing, and the overall motion path. These features can provide insights into the golfer's technique, such as shoulder and hip alignment, torso rotation, and hand positioning throughout the swing. By utilizing a neural ordinary differential equation (neural ODE), the system can map or fit these golf swing motions to continuous functions, generating smooth motion functions $f_1(t)$ and $f_2(t)$ for each video. Alternatively, or in combination, the computer vision system 151 may utilize a C3D (Convolutional 3D) model for spatiotemporal feature extraction, which can extract golf swing motion features from the videos, and then fit a neural ODE to provide continuity, producing smooth and continuous motion trajectories.

Regardless of how the motion features 155 are extracted from the trainer-provided reference video 140A and the trainee-provided video 140, a dimensionality reduction function 410 can be applied to both sets of motion features 155 in some embodiments. The dimensionality reduction function 410 can operate to reduce the high-dimensionality of the motion features 155 for efficient representation.

Any appropriate dimension-reducing algorithm or technique can be utilized to implement the dimensionality reduction function 410. In some examples, a Principal Component Analysis (PCA) technique may be applied to reduce the dimensionality of the motion features 155. Additionally, or alternatively, the dimensionality of the motion features 155 can be reduced using one or more autoencoders and/or one or more manifold learning techniques, such as t-SNE (t-Distributed Stochastic Neighbor Embedding) or UMAP (Uniform Manifold Approximation and Projection). Other techniques also may be used.

After the dimensionality of the motion features 155 is reduced, a dynamic time warping function 420 can be executed in the low-dimensional feature space to compute an optimal warping path that minimizes the temporal misalignment between the trainer reference video 140A and the trainee-provided video 140, and which operates to synchronize the videos 140.

In some examples, the dynamic time warping function 420 can apply a technique used to align the two video sequences, which may have asynchronous timing, tempos, and/or speeds. In the context of synchronizing the videos, the dynamic time warping function 420 is applied to the motion data extracted from both the trainer reference video and the trainee-provided video. By transforming the high-dimensional motion data into a low-dimensional space, the computational complexity is reduced, making it more efficient to process. The dynamic time warping function 420 can operate in this reduced space to calculate an optimal warping path, represented by the function T(t). This function effectively maps the time indices of the two video sequences to each other, ensuring that similar motion events are aligned despite differences in their temporal progression. The goal is to minimize the temporal misalignment, allowing for a direct and meaningful comparison of the motions captured in both videos. As explained throughout this disclosure, aligning the trainer and trainee videos in this fashion allows for accurately assessing the trainee's performance against the benchmark set by the trainer's video, facilitating precise feedback and improvement in technique.

In the context of synchronizing a golf swing, the dynamic time warping function 420 can be applied to align the golf swing motion data extracted from both a trainer's reference video and a trainee's video. Initially, the high-dimensional motion features of the golf swing can be reduced to a low-dimensional space to decrease computational complexity. The dynamic time warping function 420 then calculates an optimal warping path, represented by the function T(t), which maps the time indices of the two video sequences to each other. This enables similar motion events, such as the backswing, downswing, and follow-through, to be aligned despite differences in timing, tempo, or speed between the videos. By minimizing temporal misalignment, the function allows for a direct and meaningful comparison of the golf swings, enabling precise feedback and facilitating improvement in the trainee's technique.

In certain embodiments, after the continuous motion features and/or corresponding motion functions are obtained for two videos 140 being synchronized, the dynamic time warping function 420 can minimize the following function for temporal synchronization:

$$D(i,j)=\min(D(i-1,j),D(i,j-1)D(i-1,j-1))+d(f_1(t_i),f_2(t_j))$$

where $d(f_1(t_i), f_2(t_j))$ represents the Euclidean distance between object positions.

While applying the dynamic time warping function 420 in the reduced-dimensional space can be beneficial to reduce the time and complexity associated with the dynamic time warping function 420, doing so is optional. In other embodiments, the motion synchronization function 175 may not apply the dimensionality reduction function 410 on the motion features 155 and the dynamic time warping function 420 can be performed directly on the motion features 155 in a higher-dimensional space.

After the dynamic time warping function 420 is applied, a video reconstruction function 430 may be applied to reconstruct the warped videos and combine them into a synchronized video output 440. In some cases, the transformation function T(t) can be utilized to realign the video sequences, effectively adjusting the timing of frames in each video to enable corresponding motion events to occur simultaneously. This realignment creates a coherent comparison between the two videos, as it compensates for any differences in speed or timing that may exist between the sequences.

The final synchronized video output 440 may include two synchronized video sequences with matched motion trajectories, allowing viewers to observe the trainee's performance directly adjacent to the benchmark motion captured in the trainer's video. The two videos may be aligned vertically on top of each other and/or side-by-side to allow for a rapid visual comparison, and to provide a clear visual reference for identifying discrepancies and areas for improvement.

The motion synchronization function 175 introduces several technical improvements that significantly enhance the process of aligning video sequences. One straightforward advancement is its ability to synchronize asynchronous videos having varying frame rates and/or motion tempos using a dynamic time warping (DTW) technique. The above can align sequences with differing frame rates by operating on time-normalized continuous motion functions rather than raw frame indices and permits tempo-invariant motion synchronization. Another technical improvement can be attributed to the application of this dynamic time warping technique in a reduced-dimensional space. By employing dimensionality reduction methods (e.g., such as such as principal component analysis or manifold learning techniques), the motion synchronization function 175 efficiently compresses high-dimensional motion data into a low-dimensional latent space. This reduction not only minimizes computational complexity, but also preserves the essential structure of the motion, allowing for a more efficient and accurate application of the dynamic time warping function. This technique for alignment of video sequences overcomes limitations of traditional techniques, such as those that require manually playing two separate videos simultaneously and attempting to align checkpoints despite varying tempos or speeds of the biomechanical sport motions.

Additional technical improvements can be attributed to embodiments of the motion synchronization function 175 that leverage neural ODEs and/or other continuous motion functions to extract smooth, continuous motion from video data. This approach provides a robust framework for capturing the fluidity and nuances of motion, enabling precise synchronization even when videos are captured from different perspectives or involve individuals with varying dominant hands, legs, or stances. By generating continuous motion trajectories, the function can accurately align checkpoint motion events, facilitating direct and meaningful comparisons between trainee and benchmark videos throughout the progression of those events. This capability not only enhances the accuracy of motion analysis, but also accelerates the feedback process, providing real-time or near real-time insights that facilitate effective training and performance improvement.

FIGS. 6A-6J illustrates frames of a synchronized video output 440 generated during testing of the motion synchronization function 175. The motion synchronization function 175 was configured according to the process flow 400 illustrated in FIG. 4 and applied to a trainer reference video 140A and a trainee-provided video 140 capturing golf swing motions. The left portion of these figures corresponds to the trainer reference video 140A and the right portion corresponds to the trainee-provided video 140.

As explained above, a golf swing motion can be segmented into a plurality of checkpoints, such as the P1-P10 positions described above. Each of FIGS. 6A-6J correspond to a checkpoint position that was detected by the computer vision system 151. Specifically, FIG. 6A corresponds to the P1 checkpoint position which is located at Frame 0 of the synchronized video output 440, FIG. 6B corresponds to the P2 checkpoint position which is located at Frame 108 of the synchronized video output 440, FIG. 6C corresponds to the P3 checkpoint position which is located at Frame 216 of the synchronized video output 440, FIG. 6D corresponds to the P4 checkpoint position which is located at Frame 324 of the synchronized video output 440, FIG. 6E corresponds to the P5 checkpoint position which is located at Frame 432 of the synchronized video output 440, FIG. 6F corresponds to the P6 checkpoint position which is located at Frame 540 of the synchronized video output 440, FIG. 6G corresponds to the P7 checkpoint position which is located at Frame 648 of the synchronized video output 440, FIG. 6H corresponds to the P8 checkpoint position which is located at Frame 756 of the synchronized video output 440, FIG. 6I corresponds to the P9 checkpoint position which is located at Frame 864 of the synchronized video output 440, and FIG. 6J corresponds to the P10 checkpoint position which is located at Frame 972 of the synchronized video output 440.

The trainer reference video 140A and trainee-provided video 140 that were utilized to create the synchronized video output 440 were asynchronous videos having different framerates, speeds, and tempos. As shown across FIGS. 6A-6J, the motion synchronization function 175 was able to precisely align the golf swing of the trainee video 140 with the golf swing of the reference video 140A, including at each of the checkpoints.

In this test example, annotation data (shown in green lines) was integrated into both the trainee video 140 and the reference video 140A to illustrate the spinal angle of the individual in each video. This annotation data was generated using the techniques described above, and was precisely aligned or positioned according to skeletal mapping data that was extracted by the computer vision system 151.

The motion synchronization and comparative motion techniques described in this disclosure are provided as non-limited examples, and numerous variations can be incorporated to accommodate different applications and contexts. For instance, while certain portions of this disclosure describe examples where trainee motions are aligned with motions of videos included in motion templates, such is not a requirement. The synchronization techniques described herein can be applied to align any two videos regardless of their content, and the comparative analysis techniques can be utilized for comparing motion in any two videos. Thus, these techniques can be adapted or extended to a wide range of uses beyond the specific examples provided, such as synchronizing or comparing videos having other types of content and/or for other types of industries beyond sports training (e.g., such as for film production, surveillance footage from different cameras, etc.). The adaptability of these techniques allows them to be applied or tailored to meet the unique needs of diverse applications.

Figure 12A:
FIG. 12A illustrates an output generated during testing of a motion synchronization function.

FIGS. 12A-12N include additional outputs that were generated during testing of the motion synchronization function 175, which further demonstrate the robustness and effectiveness of the function.

Figure 12B:
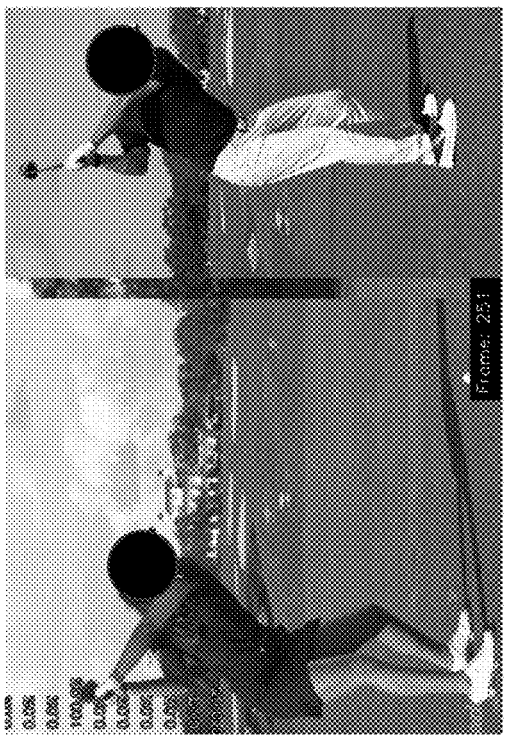
FIG. 12B illustrates another output generated during testing of the motion synchronization function.
Figure 12C:
FIG. 12C illustrates another output generated during testing of the motion synchronization function.
Figure 12D:
FIG. 12D illustrates another output generated during testing of the motion synchronization function.
Figure 12E:
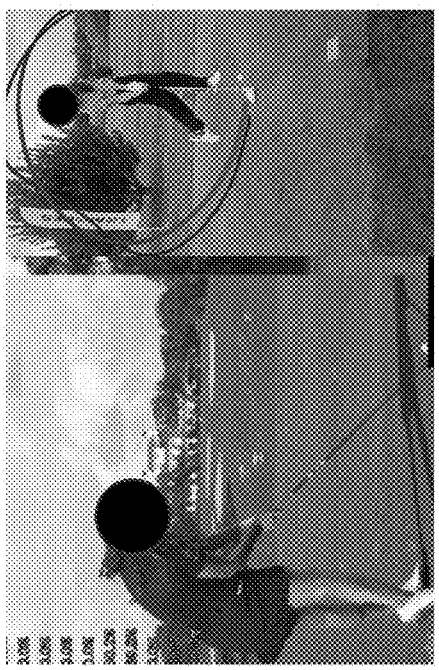
FIG. 12E illustrates another output generated during testing of the motion synchronization function.
Figure 12F:
FIG. 12F illustrates another output generated during testing of the motion synchronization function.
Figure 12G:
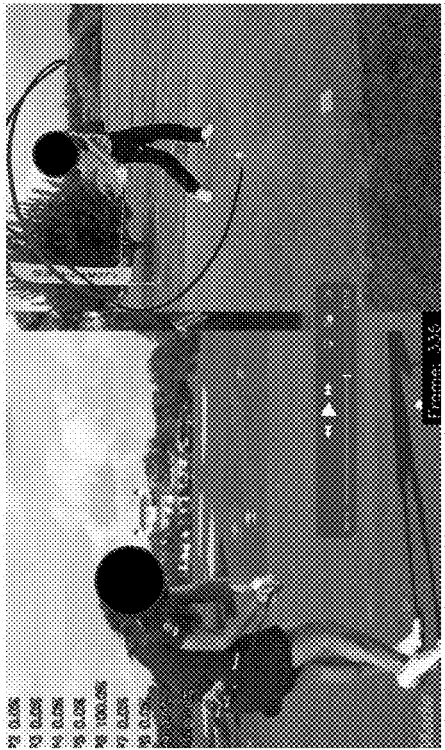
FIG. 12G illustrates another output generated during testing of the motion synchronization function.
Figure 12H:
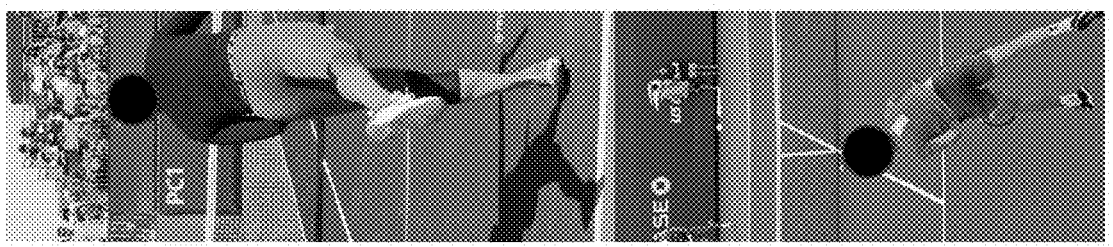
FIG. 12H illustrates another output generated during testing of the motion synchronization function.
Figure 12I:
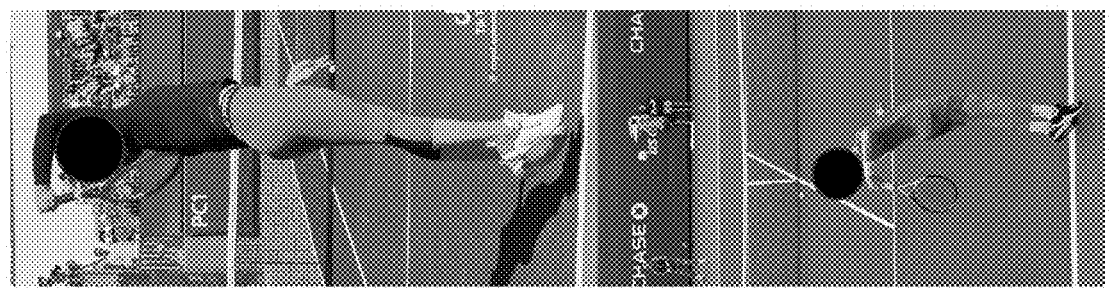
FIG. 12I illustrates another output generated during testing of the motion synchronization function.
Figure 12J:
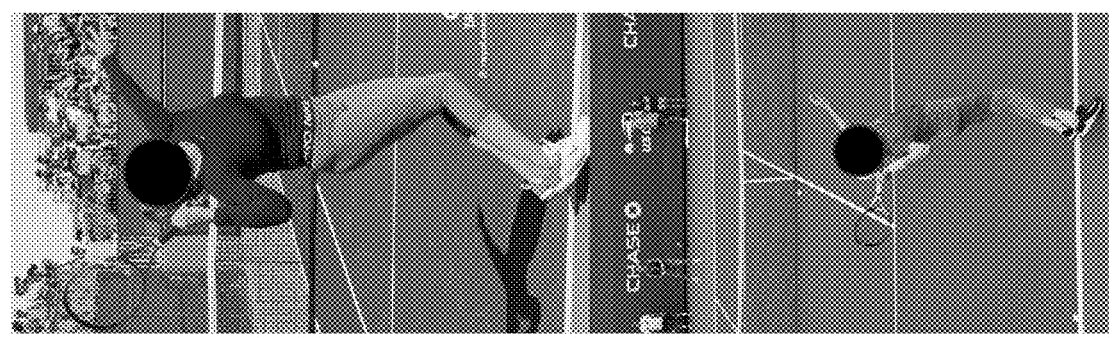
FIG. 12J illustrates another output generated during testing of the motion synchronization function.
Figure 12K:
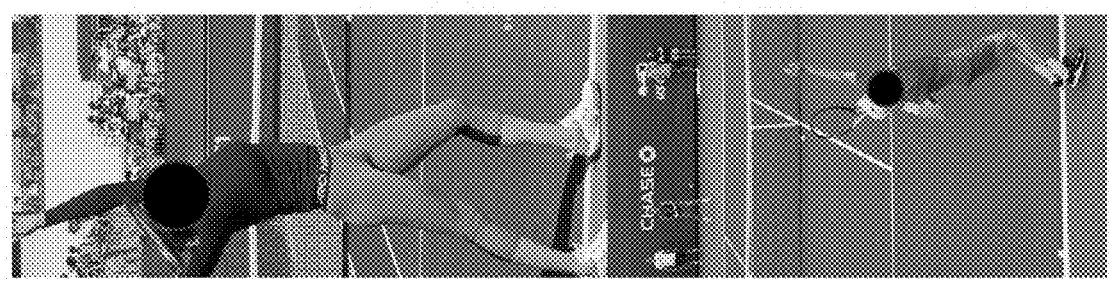
FIG. 12K illustrates another output generated during testing of the motion synchronization function.
Figure 12L:
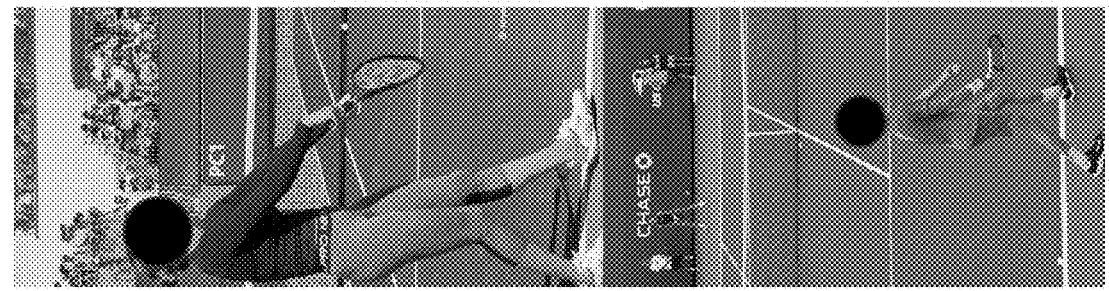
FIG. 12L illustrates another output generated during testing of the motion synchronization function.

FIGS. 12A-12C illustrate that the motion synchronization function 175 was able to accurately sync motions in a first video capturing a female performing a golf swing motion (shown on the left side) with a second video capturing a male performing a golf swing motion (shown on the right).

FIGS. 12D-12G illustrate that the motion synchronization function 175 was able to accurately sync motions captured from starkly different viewpoints, specifically, a first video captured from a rear view or down-the-line view as (shown on the left side) and a second video captured from a side view or front-facing view (shown on the right side).

FIGS. 12H-12L illustrate that the motion synchronization function 175 was able to accurately sync a tennis swing motion performed by a female in a first video (shown on the top portion) and a tennis swing motion performed by a male in a second video (shown on the bottom portion).

FIG. 12M illustrates that the motion synchronization function 175 was able to accurately sync a golf swing motion performed by a left-handed golfer in a first video (shown on the top portion) with a golf swing motion performed by a right-handed golfer in a first video (shown on the bottom portion).

Exemplary Techniques for Compiling & Querying Motion Feature Databases

In certain embodiments, the sports training system 150 can maintain and continuously update a motion feature database 180. This motion feature database 180 can enable the sports training system 150 to execute a wide range of complex analyses, including those that involve the analysis of visual content collected over long time periods and/or those that involve the analysis of multiple video sequences 140. In some examples, these analyses allow end-users to evaluate performance or improvement over time, conduct comparative evaluations over video sequences 140 corresponding to multiple end-users, identify training trends, and/or generate long-term analytics.

As described in the background section of this disclosure, one potential approach for performing the aforementioned analyses involves processing each video sequence 140 individually to extract specific features or information, and subsequently analyzing the extracted information to determine desired metrics (e.g., indicating improvements over time, training trends, and/or other analytics involving analysis of multiple video sequences). However, extracting relevant features for each video segment using a neural network architecture is time-consuming, resource-intensive, and not suitable to provide real-time or near real-time feedback to end-users. This is because the visual information needed for these analyses is embedded directly into video content and needs to be extracted from each video sequence 140 to perform the analyses.

To overcome the aforementioned and/or other technical challenges, the motion feature database 180 can store and/or aggregate visual information from the video sequences 140 processed by the sports training system 150 in a structured format, allowing for rapid querying and analysis to support more complex analyses and evaluations conducted over longer time periods and/or greater numbers of videos 140.

In some examples, the motion feature database 180 can store and aggregate the motion features 155 described above, such as object feature data 155A, motion path analysis data 155B, motion checkpoint data 155C, 3D modeling data 155D, and/or annotation data 155E. Instead of discarding these features after they are used for specific purposes, such as synchronization or providing immediate trainee feedback, they can be retained in the database for future analysis and retrieval. This approach enables the sports training system 150 to efficiently conduct long-term analyses, assess performance improvements over time, detect training trends, and/or perform other complex analyses without the need to reprocess each video segment individually.

Figure 5:
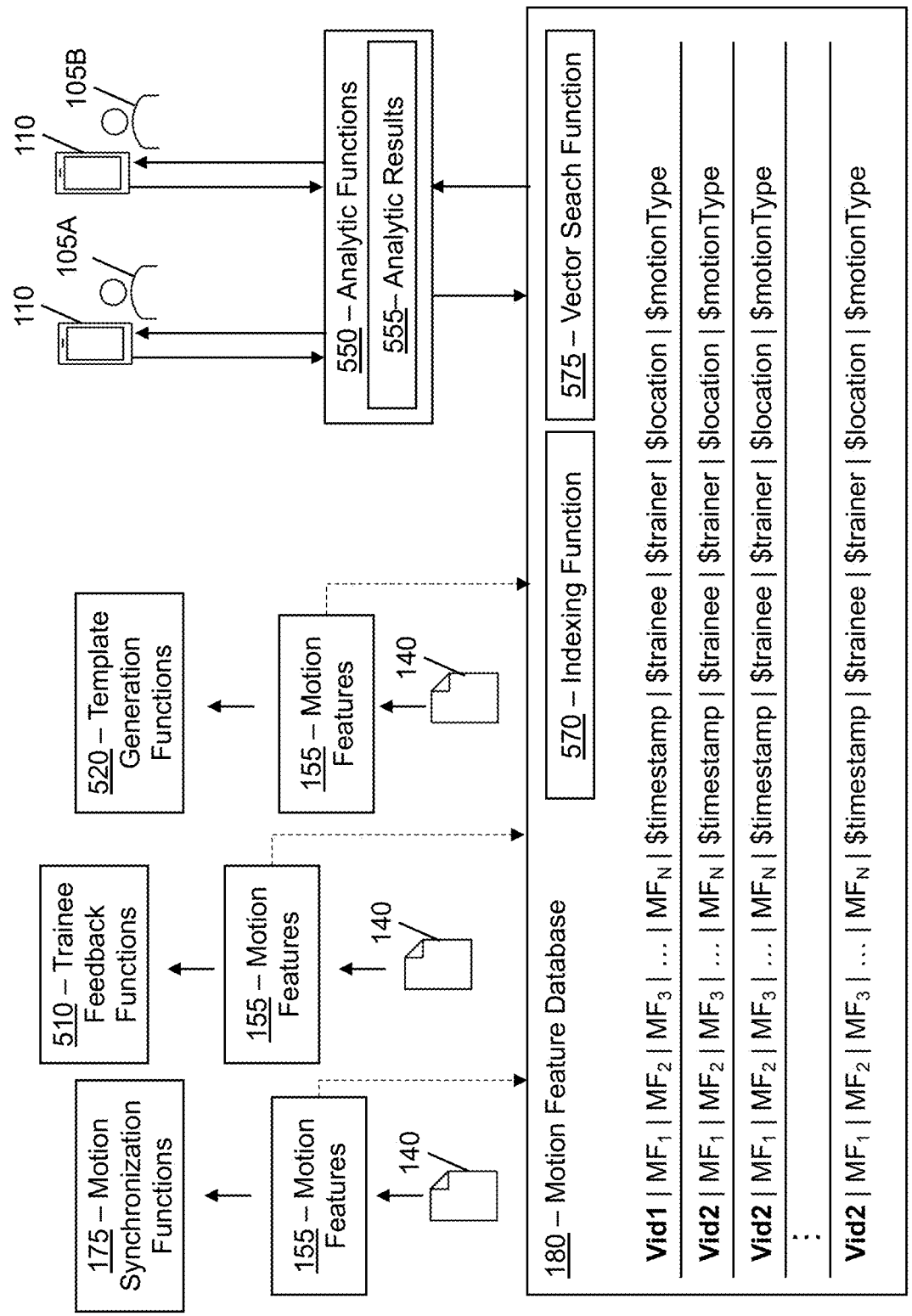
FIG. 5 is a flow diagram illustrating an exemplary technique for generating and querying a motion feature database according to certain embodiments.
Figure 6B:
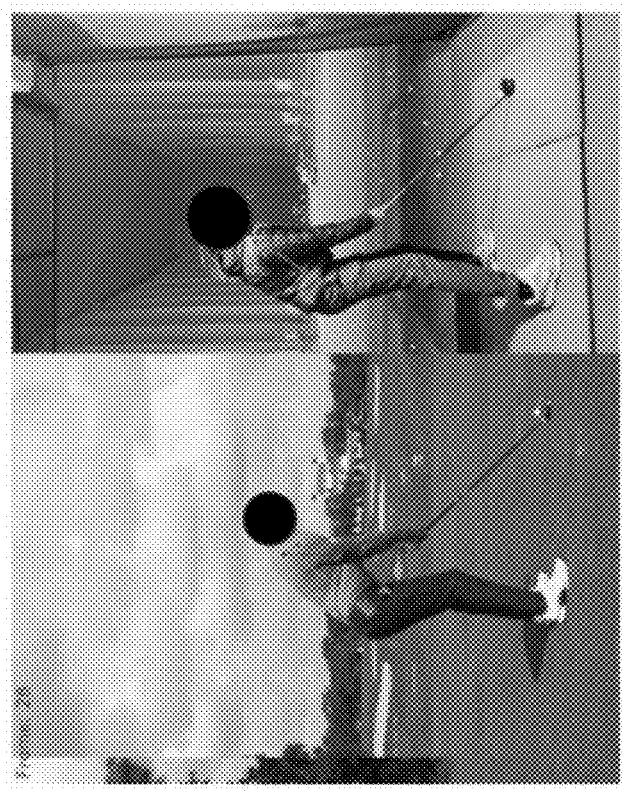
FIG. 6B depicts another frame of the synchronized video output according to certain embodiments.
Figure 6A:
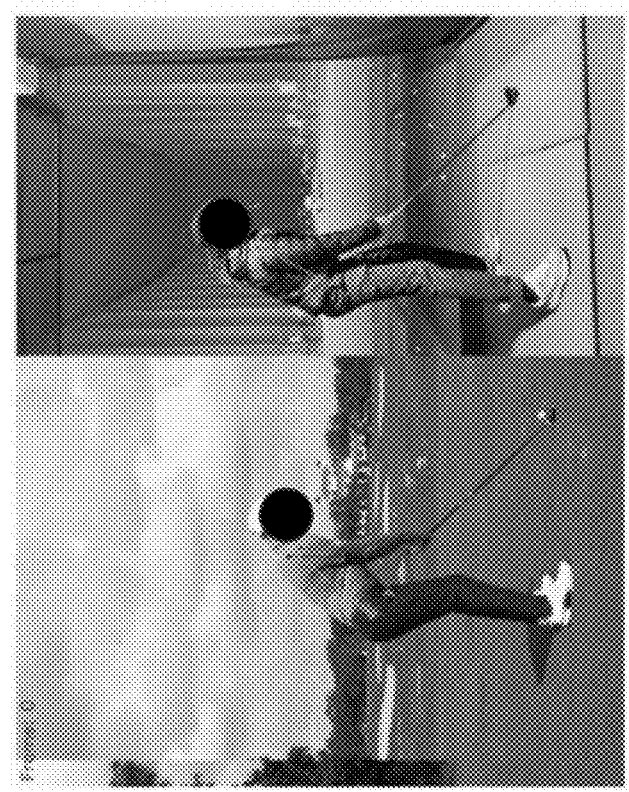
FIG. 6A depicts a frame of a synchronized video output according to certain embodiments.
Figure 6D:
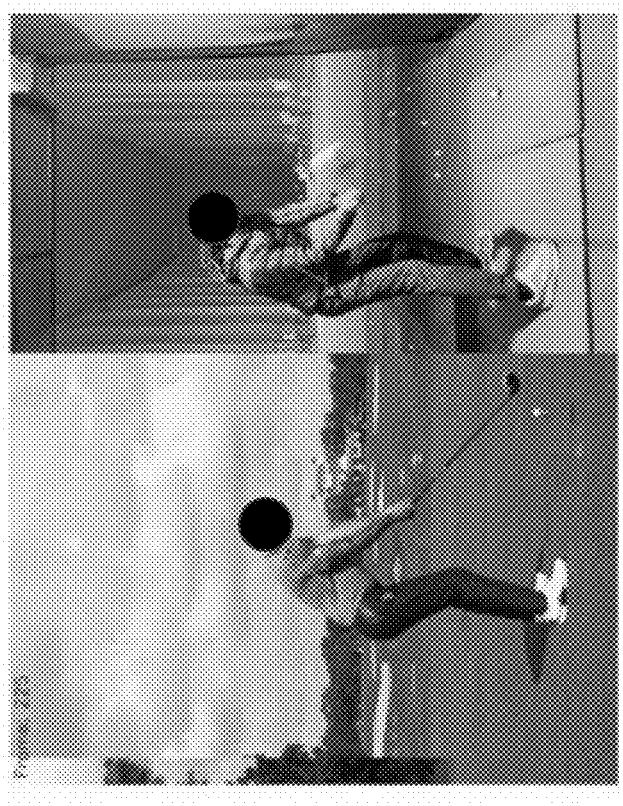
FIG. 6D depicts another frame of the synchronized video output according to certain embodiments.
Figure 6C:
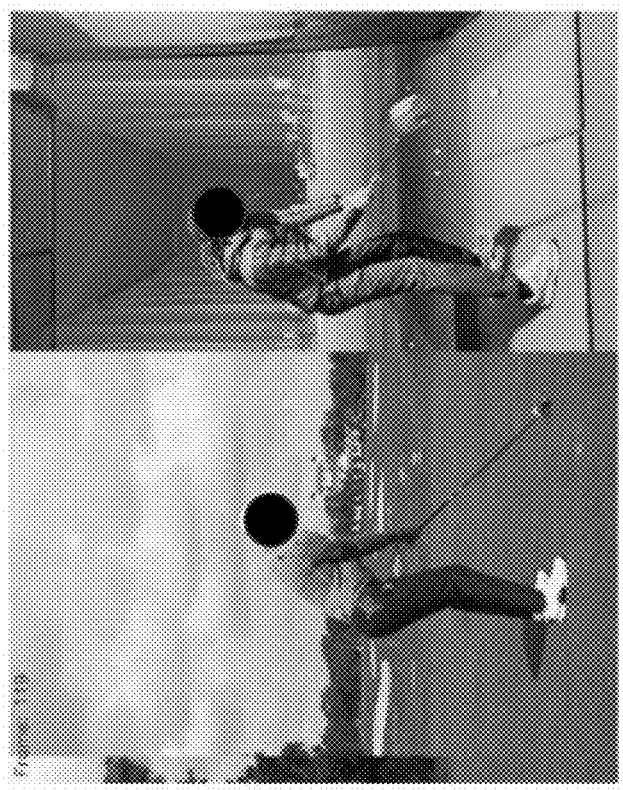
FIG. 6C depicts another frame of the synchronized video output according to certain embodiments.
Figure 6E:
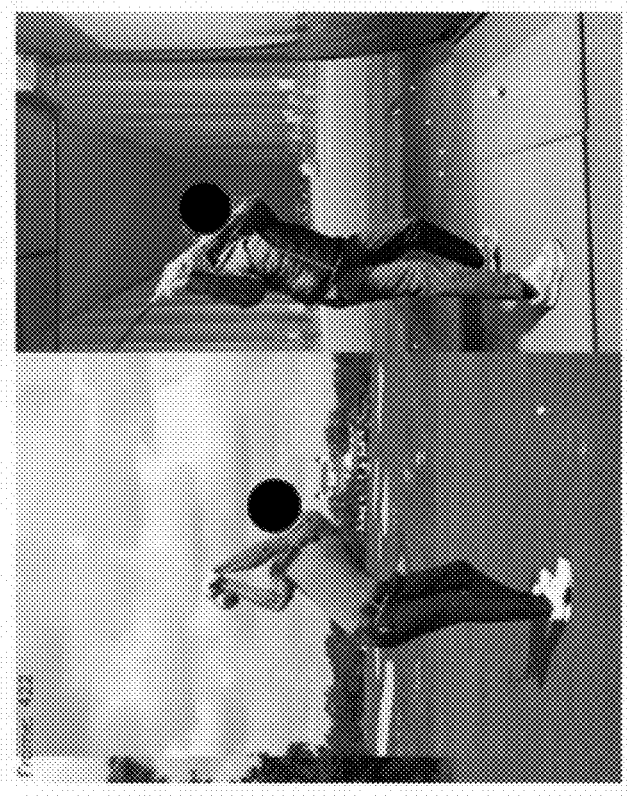
FIG. 6E depicts another frame of the synchronized video output according to certain embodiments.
Figure 6F:
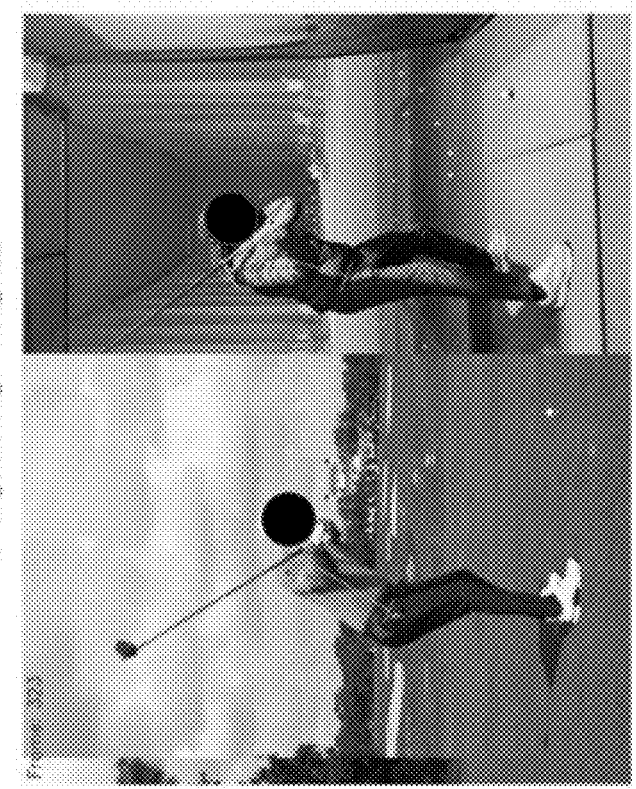
FIG. 6F depicts another frame of the synchronized video output according to certain embodiments.
Figure 6G:
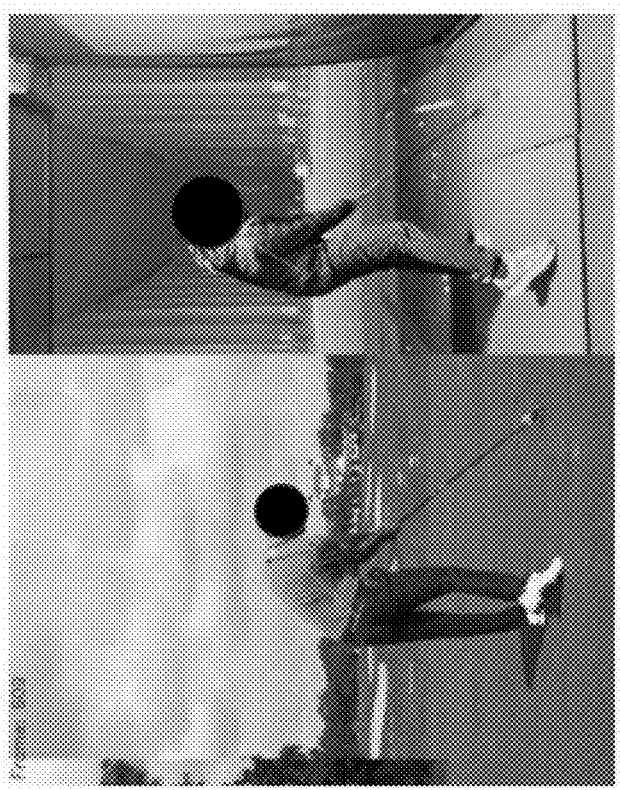
FIG. 6G depicts another frame of the synchronized video output according to certain embodiments.
Figure 6H:
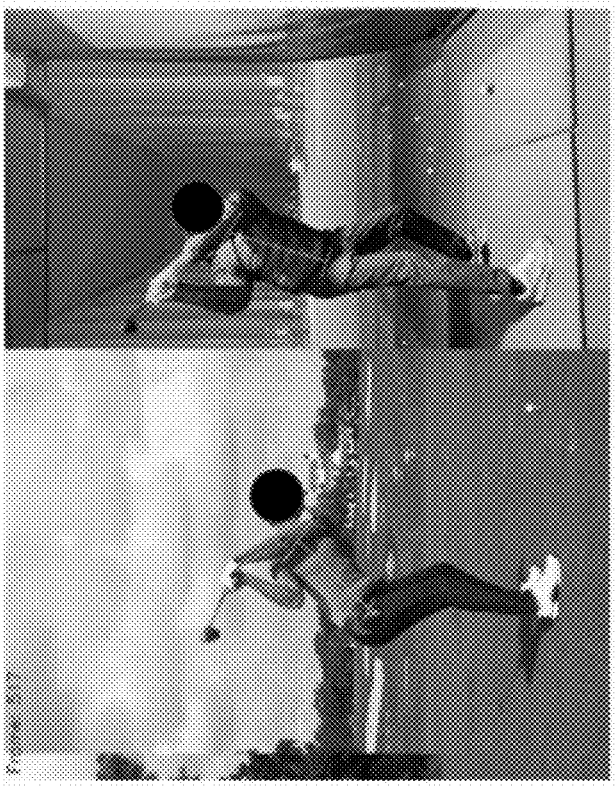
FIG. 6H depicts another frame of the synchronized video output according to certain embodiments.
Figure 6I:
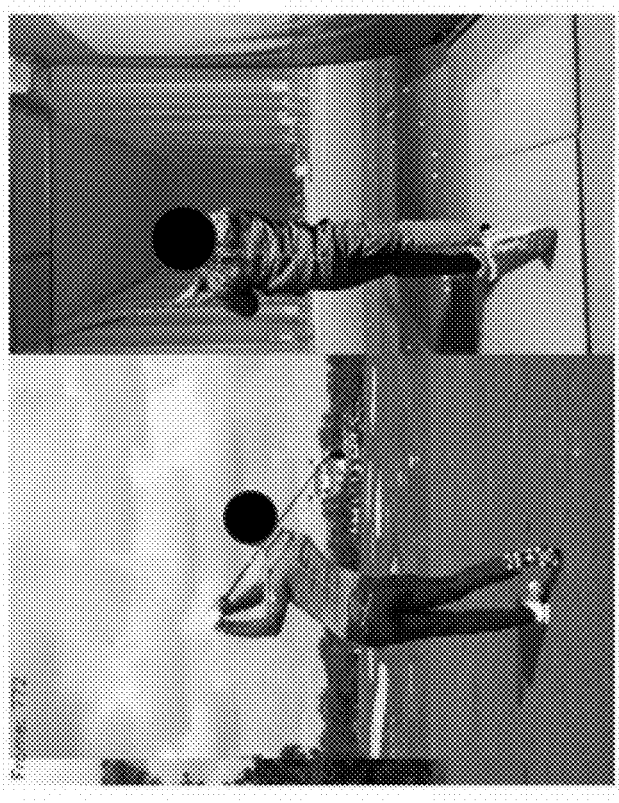
FIG. 6I depicts another frame of the synchronized video output according to certain embodiments.
Figure 6J:
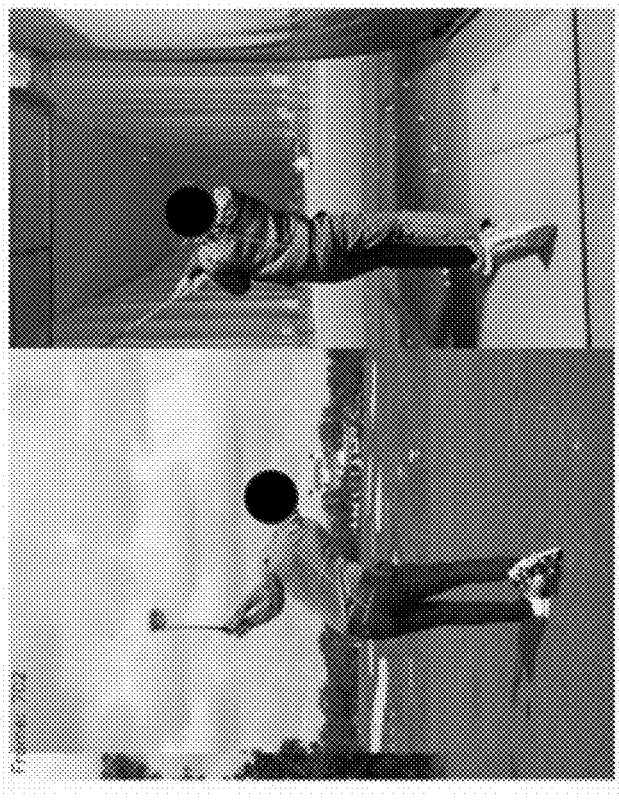
FIG. 6J depicts another frame of the synchronized video output according to certain embodiments.

FIG. 5 is a diagram illustrating an exemplary technique for compiling and querying a motion feature database 180 according to certain embodiments.

The specific contents of the motion feature database 180 described herein can vary. In some examples, the motion feature database 180 can store structured information corresponding to some or all of the video sequences 140 ($Vid_1$, $Vid_2$, $Vid_3$, . . . $Vid_n$) provided by trainee end-users 105B and/or trainer end-users 105A. Thus, the database 180 can aggregate motion features and other video sequence data for trainee-provided video sequences 140 and/or reference video sequences 140A.

Each video sequence 140 can be stored with a plurality of motion features 155 ($MF_1$, $MF_2$, $MF_3$, . . . $MF_N$). Some or all of the motion features 155 can include those that were initially extracted by the computer vision system 151 in connection with performing other functions described in this disclosure, such as those that involve motion template generation, video synchronization, comparative motion analysis, and/or trainee feedback generation. The motion features 155 stored for each video can include object feature data 155A, motion path analysis data 1551B, motion checkpoint data 155C, 3D modeling data 155D, annotation data 155E, and/or other types of features corresponding to biomechanical sport motions 145 captured in the video sequences 140.

Some or all of the motion features 155 can correspond to feature vectors, embeddings, and/or other data that was extracted by one or more of the motion analysis models 152 associated with the computer vision system 151. These feature vectors or embeddings can capture prominent characteristics of the biomechanical sport motions, such as the spatial and/or temporal dynamics of body movements, the trajectory of sporting equipment, and key positional data. By encoding this information into a compact numerical format, feature vectors facilitate efficient storage, retrieval, and analysis of complex motion patterns, enabling the system to perform detailed evaluations and comparisons.

The left portion of FIG. 5 illustrates the aggregation of motion features 155 and corresponding video sequences in the motion feature database 180. As end-users, such as trainee end-users and trainer end-users, utilize the sports training system 150 in connection with providing training services, motion features 155 may be extracted from video sequences 140 in connection with various activities. This example demonstrates motion features 155 being generated by the computer vision system 151 in connection with performing motion synchronization functions 175, trainee feedback functions 510 (e.g., which may provide end-users with targeted feedback for improving their performance of biomechanical sport motions 145), and template generation functions 520 (e.g., which can be utilized to create the motion templates 165 described herein). Motion features 155 may be extracted, generated, or derived in connection with performing many other types of functions.

Each time motion features 155 are extracted, generated, or derived for a video sequence 140, they may be stored in the motion database 180 and correlated with the specific video sequence. The motion features 155 may be stored in a structured layout to facilitate the performance of various analytic functions 550 described below.

The entries in the motion database 180 can be supplemented with various types of data and information to permit a wide range of analytics. In some examples, the motion features 155 and/or video sequence 140 also may be stored with temporal information, such as timestamps ($timeStamp) or other indicators of dates and/or time, which may be used to identify when the video sequence 140 was captured and/or when motion features 155 were generated. Additionally, or alternatively, each entry also may include a trainee identifier ($trainee), which identifies the trainee end-user 105B who is performing a biomechanical sport motion 145 in a corresponding video sequence 140, the trainee end-user 105B who provided the video sequence 140 to the sports training system 150, and/or otherwise associated with the video sequence 140. Additionally, or alternatively, each entry also may include a trainer identifier ($trainer), which identifies the trainer end-user 105A who is performing a biomechanical sport motion 145 in a corresponding video sequence 140 (e.g., in the case of reference videos 140A), the trainer end-user 105B who provided the video sequence 140 to the sports training system 150, the trainer end-user 105B who annotated or reviewed the video sequence 140, and/or otherwise associated with the video sequence 140. Additionally, or alternatively, each entry also may be supplemented with location information ($location), such as geolocation data, global positioning system (GPS) coordinates, and/or other types of location identifiers, that identify the location where a video sequence 140 was captured, a location of a trainer end-user 105A or trainee end-user 105B associated with the video sequence 140, and/or other types of location information. Additionally, or alternatively, each entry also may be supplemented with motion type information ($motionType), identifying the type of biomechanical sport motion 145 captured in the video sequence (e.g., indicating the video sequence corresponds to a golf driving swing motion, golf putting motion, or tennis swing motion). The records or entries corresponding to the video sequences 140 can include many other types of data and information as well.

An indexing function 570 can determine how the records or entries corresponding to the video sequence 140 are indexed and/or stored in the motion feature database 180. The indexing function 570 can utilize any indexing technique that enables the records or entries to be searched and/or retrieved. In some embodiments, the indexing function 570 can employ feature vector indexing techniques, which operate to index the records or entries using feature vectors corresponding to the records or entries. By indexing the records or entries with feature vectors, a vector search function 575 can enable vector searches to be rapidly performed on the records or entries. The vector search function 575 can be configured to compare search query vectors with the feature vector indexes to identify and retrieve relevant records or entries corresponding to the query.

In certain embodiments, the motion feature database 180 is configured for efficient indexing and retrieval of motion features to support real-time and large-scale analytics. To enable rapid similarity comparisons between biomechanical motion data, the motion feature database 180 and/or indexing function 570 may implement or incorporate feature similarity indexing techniques such as k-d trees, ball trees, or approximate nearest neighbor (ANN) algorithms. These structures can permit the vector search function 575 to perform fast queries on high-dimensional motion data, such as pose vectors, joint angle trajectories, or motion embeddings, by reducing the search space during comparisons.

In some embodiments, the sports training system 150 and/or motion feature database 180 may utilize vector search libraries (e.g., FAISS, ScaNN, or Annoy) to index and retrieve motion feature vectors from large-scale datasets efficiently. These libraries are particularly well-suited for dense feature representations extracted via neural networks, such as those generated from C3D or transformer-based models. By embedding each motion sequence into a feature vector space and indexing those vectors, the system can perform semantic similarity searches—for instance, finding motions that most closely resemble a user's current swing pattern or retrieving prior motions that match a particular biomechanical signature.

This indexing architecture not only supports low-latency querying, which can be crucial for real-time or near real-time feedback applications, but also enables complex analytic workflows such as clustering similar motion patterns, detecting anomalies, or tracking changes over time. Moreover, the indexed motion features can be linked with metadata such as user ID, timestamp, sport type, or camera angle, allowing for context-aware search and filtering across large motion datasets.

The sports training system 150 can execute various types of analytic functions 550 using the motion features 155 and/or other data stored in the motion feature database 180. This can include analytic functions 550 that utilize information from multiple video sequences 140, analytic functions 550 that utilize video sequences 140 associated with multiple end-users, and/or analytic functions 550 that cover extended time periods. By storing the motion features 155 and other data in a structured format, the system enables these analytic functions to be performed rapidly, as the resource-intensive feature extraction processes have already been completed. This pre-processing allows for efficient querying and analysis, facilitating evaluations and insights without the need for repeated data extraction. As a result, the system can provide timely and/or real-time feedback, track performance trends, and support long-term training objectives with minimal computational overhead.

This temporal information stored with the entries in the motion feature database 180 permits analytic functions 550 to be performed which consider specific periods of time. For example, the system can assess a trainee's progress over the past year by analyzing changes in their motion features and performance metrics. It can also determine how many times a trainee practiced a particular motion within a given timeframe, providing insights into their training frequency and consistency. Additionally, the system can evaluate the effectiveness of a trainer over a specific period by comparing the progress of multiple trainees under their guidance. Other relevant examples include identifying seasonal trends in performance, analyzing the impact of specific training interventions, and tracking recovery progress following an injury. By leveraging temporal information, the system can deliver comprehensive and contextually relevant analytics to enhance training outcomes.

This trainee identifier information ($trainee) and/or trainer identifier information ($trainer) stored with the entries in the motion feature database 180 permits analytic functions 550 to be performed which consider specific trainees and/or specific trainers, or groups of trainees and/or trainers. In some examples, the system can generate personalized performance reports for individual trainees by analyzing their unique motion data over time, highlighting areas of improvement and identifying persistent challenges. Similarly, it can compare the performance of different trainees under the same trainer to evaluate the trainer's effectiveness and identify successful coaching strategies. Additionally, the system can facilitate peer comparisons, allowing trainees to see how their performance ranks against other trainees, such as those in their cohort or skill level. For trainers, this information can be used to tailor training programs to the specific needs of each trainee, ensuring a more personalized and effective coaching experience. By utilizing these identifiers, the system can provide targeted insights and recommendations that enhance the training process for both trainees and trainers.

This location information ($location) stored with the entries in the motion feature database 180 permits analytic functions 550 to be performed which consider specific geographic regions. For example, the system can analyze performance trends across different locations to identify regional training patterns or preferences. It can also assess the impact of environmental factors, such as altitude or climate, on athletic performance by comparing data from trainees in various geographic areas. Additionally, the system can evaluate the effectiveness of training programs offered in different regions, helping organizations optimize their coaching strategies based on local conditions. Furthermore, location-based analysis can assist in identifying areas with high demand for specific sports training. By leveraging geographic information, the system can provide valuable insights that enhance training and development strategies across diverse locations.

This motion features 155 ($MF_1$, $MF_2$, $MF_3$, . . . $MF_N$) stored with the entries in the motion feature database 180 permits a wide array of analytic functions 550 to be performed. For individual trainees, the system can analyze the progression of a specific motion, such as a golf swing, by examining changes in joint angles, swing speed, and/or trajectory over time. This allows for detailed feedback on technique improvements and areas needing further development. Additionally, the system can identify patterns in a trainee's performance, such as consistent errors or strengths, and provide targeted training recommendations.

For analysis across multiple trainees, the system can compare the motion features of different individuals to identify common trends or outliers. For example, it can determine which training methods are most effective by analyzing the performance improvements of trainees who have undergone similar coaching programs. The system can also cluster trainees based on their motion characteristics, allowing coaches to tailor group training sessions to address shared challenges or leverage collective strengths. Furthermore, the system can benchmark a trainee's performance against a database of peers, providing insights into their relative standing and potential areas for competitive advantage. By utilizing the stored motion features, the system can deliver comprehensive and actionable analytics that enhance both individual and group training outcomes.

The motion feature database 180 can store the motion features 155 associated with reference video sequences 140A provided by trainer end-users 105A and/or associated with motion templates 165 created by the trainer end-users 105A. These benchmark motion features 155 can be utilized by the analytic functions 550 to conduct various types of analyses.

In some examples, the motion features 155 stored in the motion feature database 180 can be utilized by an analytic function 550 in assessing the progress of a trainee end-user in aligning their biomechanical sport motion 145 with the benchmark motion outlined in a motion template 165. By continuously updating the database with motion features extracted from the trainee's video sequences 140, the system can track changes and improvements over time. These features, which may include joint angles, motion paths, and velocities, can provide a detailed representation of the trainee's performance over time. By comparing these features collected over a given time period against the benchmark motion features embedded in the motion template 165, the system can quantify the degree of alignment and determine whether the trainee's motion is closing the gap between their current performance and the benchmark motion and/or whether the trainee's motion is diverging further from the benchmark motion over time.

In some embodiments, the motion feature database 180 can be supplemented to include motion features 155 and/or corresponding video sequences of professional athletes, and various analytic functions 550 can be performed by comparing the athlete information with the information included in the motion feature database 180. For example, a trainee can compare their motion data with that of professional athletes to identify areas where their technique diverges from elite standards. This comparison can provide insights into specific aspects of their performance that require improvement to reach a higher level of proficiency.

Additionally, the system can help a trainee determine which professional athlete performs a biomechanical sport motion most similar to their own. For instance, a golfer might use the system to answer the question, "Which professional golfer is my golf swing closest to?" By analyzing the motion features, the system can identify the professional whose swing mechanics most closely match those of the trainee, offering a personalized benchmark for improvement.

In some examples, this analysis can be performed by comparing the motion features 155 of the trainee's biomechanical sport motion 145 (e.g., golf swing) with those stored in the database for various professional athletes (e.g., professional golfers). The system can utilize distance measures, such as Euclidean distance or cosine similarity, to quantify the differences between the trainee's motion features and those of each professional. For example, in performing a golf swing comparison, the system might calculate the Euclidean distance and/or cosine distance between the joint angles, swing paths, and velocities of the trainee's swing and those of multiple professionals. The professional with the smallest distance measure could be identified as having the most similar swing mechanics to the trainee. Additionally, the system could provide a list of professional athletes ranked in order from the closest match to the furthest match.

It should be understood that numerous other types of analytic functions 550 can be performed beyond those specifically mentioned in this disclosure. These analytic functions 550 can utilize any of the structured fields, such as motion feature fields, temporal information fields, location information fields, trainee fields, trainer fields, and motion type fields, in various combinations. This flexibility allows for the execution of countless functions and analytics, and enables comprehensive insights and evaluations to be conducted for specific end-users and/or groups of end-users.

The analytics results 555 generated by the analytic functions 550 can be presented to end-users, including trainee end-users 105B and trainer end-users 105A, via their respective computing devices 110 in various formats to enhance understanding and facilitate actionable insights. For instance, comprehensive reports can be generated, summarizing key findings and performance metrics over specified time periods. Graphical representations, such as charts and graphs, can visually depict trends, comparisons, and progressions, making complex data more accessible and easier to interpret. Textual formats can provide detailed explanations and recommendations, offering context and guidance based on the analyzed data. Additionally, interactive dashboards can be utilized to allow users to explore data dynamically, enabling them to drill down into specific areas of interest. The outputs can be presented in many other formats as well.

A wide range of analytic results 555 can be derived or generated by analytic functions 550 using the motion features 155 and/or data stored in the motion feature database 180. The analytic results 555 can comprise any metrics, values, or outputs generated by the analytic functions 550 mentioned in this disclosure.

For instance, in the context of golf, a trainee or trainer end-user can query all swings at the P6 position across 100 practice sessions to analyze changes in hip rotation. This analysis can be conducted without the need to watch a single video, allowing the coach to efficiently assess the progression or regression of a player's technique over time. By focusing on specific motion features 155, such as hip rotation, a trainer end-user can provide targeted feedback to improve the player's swing mechanics.

In tennis, analytic results 555 can be used to identify inconsistencies in serve mechanics by comparing wrist angles across multiple practice sessions. By generating a consistency score, trainees and/or trainers can pinpoint areas of variability that may affect performance. This data-driven approach enables the development of personalized training regimens aimed at enhancing serve reliability and effectiveness. The ability to quantify and visualize these inconsistencies provides valuable insights that can lead to more focused and effective practice sessions.

For team sports, analytic results 555 can be utilized for analyzing player data to detect common movement inefficiencies. By identifying these inefficiencies, teams can develop targeted training programs that address specific weaknesses or areas for improvement. This holistic analysis of player movements allows trainers to implement strategies that enhance overall team performance. By leveraging the motion feature database, teams can continuously refine their training approaches, ensuring that players are developing the skills necessary to excel in competitive environments.

The examples provided above are merely illustrative, as the system is capable of generating many other types of analytic results 555. By leveraging the data stored in the motion feature database 180, the system can perform a wide array of analyses tailored to various sports, training objectives, and/or end-users. This flexibility allows coaches, trainers, and athletes to explore different aspects of performance, uncover hidden patterns, and devise customized training strategies that address unique needs and goals. The system's robust analytic capabilities enable users to derive meaningful insights across diverse sporting contexts.

Exemplary Methods and Processes

The following exemplary methods illustrate layered processes within the sports training system, including motion synchronization (method 800), template creation (method 900), and motion database management and analytics (method 1000). These modular methods may be implemented independently or in combination, depending on the use case.

FIG. 8 illustrates a flow chart for an exemplary method 800 according to certain embodiments. Method 800 is merely exemplary and is not limited to the embodiments presented herein. Method 800 can be employed in many different embodiments or examples not specifically depicted or described herein. In some embodiments, the steps of method 800 can be performed in the order presented. In other embodiments, the steps of method 800 can be performed in any suitable order. In still other embodiments, one or more of the steps of method 800 can be combined or skipped. In many embodiments, system 100, sports training system 150, and/or motion synchronization function 175 can be configured to perform method 800 and/or one or more of the steps of method 800. In these or other embodiments, one or more of the steps of method 800 can be implemented as one or more computer instructions configured to run on one or more processing devices 102 and configured to be stored at one or more non-transitory computer storage devices 101. Such non-transitory memory storage devices 101 can be part of a computer system such as system 100 and/or sports training system 150.

In step 810, access is provided to a sports training system that includes, or communicates with, a computer vision system 151 trained to analyze video sequences 140 corresponding to biomechanical sport motions 145.

In step 820, a first video sequence is received which corresponds to a reference video sequence that captures a first biomechanical sport motion.

In step 830, a first set of motion features is extracted from the first video sequence using one or more motion analysis models of the computer vision system, where the first set of motion features includes continuous motion features corresponding to the first biomechanical sport motion.

In step 840, a second video sequence is received, which corresponds to a second biomechanical sport motion.

In step 850, a second set of motion features is extracted from the second video sequence, where the second set of motion features includes continuous motion features corresponding to the second biomechanical sport motion.

In step 860, a motion synchronization function is executed to align or synchronize the first and second video sequences. This can be achieved, at least in part, by applying a dynamic time warping function that utilizes the continuous motion features to adjust any temporal misalignment between the first and second video sequences.

In step 870, a synchronized video output is generated, aligning the first biomechanical sport motion with the second biomechanical sport motion, using the output of the dynamic time warping function.

In certain embodiments, a method for synchronizing video sequences can be implemented via execution of computing instructions by one or more processing devices and configured to be stored on one or more non-transitory storage devices. The method can include: providing access to a sports training system that includes, or communicates with, a computer vision system trained to analyze video sequences corresponding to biomechanical sport motions. The method may involve receiving a first video sequence corresponding to a reference video sequence that captures a first biomechanical sport motion and extracting, using one or more motion analysis models of the computer vision system, a first set of motion features from the first video sequence, where the first set of motion features at least comprises continuous motion features corresponding to the first biomechanical sport motion. Additionally, the method can include receiving a second video sequence corresponding to a second biomechanical sport motion and extracting, using the one or more motion analysis models of the computer vision system, a second set of motion features corresponding to the second video sequence, where the second set of motion features at least comprises continuous motion features corresponding to the second biomechanical sport motion. The method may further involve executing a motion synchronization function that aligns or synchronizes the first video sequence and the second video sequence, at least in part, by applying a dynamic time warping function that utilizes the continuous motion features corresponding to the first video sequence and the second video sequence to adjust a temporal misalignment of the first video sequence and the second video sequence. Finally, the method can include generating a synchronized video output that aligns the first biomechanical sport motion included in the first video sequence with the second biomechanical sport motion included in the second video sequence, at least in part, using an output of the dynamic time warping function.

In certain embodiments, the method can include the first video sequence and the second video sequence being asynchronous video sequences with differing frame rates, differing tempos, and/or different views. The motion synchronization function may be configured to align or synchronize the asynchronous video sequences to generate the synchronized video output.

In certain embodiments, the method can include the dynamic time warping function determining a warping path that minimizes the temporal misalignment between the first video sequence and the second video sequence by utilizing the continuous motion features extracted from both the first video sequence and the second video sequence.

In certain embodiments, the method can include applying a dimensionality reduction function to the first set of motion features extracted from the first video sequence and applying a dimensionality reduction function to the second set of motion features extracted from the second video sequence. The method may further involve executing the motion synchronization function on the first set of motion features and the second set of motion features in a reduced dimension space.

In certain embodiments, the method can include the first video sequence corresponding to a reference video sequence provided by a trainer end-user to the sports training system, and the second video sequence corresponding to a trainee-provided video sequence that captures a trainee end-user's performance of the second biomechanical sport motion. The synchronized video output may be generated to provide training feedback to the trainee end-user.

In certain embodiments, the method can include extracting motion checkpoint data from the first biomechanical sport motion and the second biomechanical sport motion using the computer vision system, where the motion checkpoint data identifies key positions or moments within the first and second video sequences to facilitate synchronization or analysis.

In certain embodiments, the synchronized video output can align the first biomechanical sport motion and the second biomechanical sport motion across the key positions or moments identified in the motion checkpoint data.

In certain embodiments, the method can include annotation data being inserted into the synchronized video output by the computer vision system.

In certain embodiments, the method can include the first biomechanical sport motion and the second biomechanical sport motion each corresponding to a golf swing motion. The first set of motion features and the second set of motion features may capture information corresponding to one or more of the following: one or more golf club swing paths, one or more joint angles, and one or more golf club trajectories.

In certain embodiments, the method can include the first biomechanical sport motion and the second biomechanical sport motion each corresponding to one of the following categories: tennis swing motions, baseball swing and throw motions, soccer kick motions, basketball shooting motions, football throwing motions, martial arts motions, swimming stroke motions, track and field motions, gymnastic motions, volleyball motions, hockey shot motions, skiing and snowboarding motions, surfing motions, rowing stroke motions, weightlifting lift motions, or fencing motions.

In certain embodiments, a system for synchronizing video sequences is disclosed. The system comprises one or more processing devices and one or more non-transitory storage devices for storing instructions. Execution of the instructions by the one or more processing devices causes the one or more processing devices to perform some or all of the method steps described above and/or method steps described in other portions of this disclosure.

In certain embodiments, a computer program product for synchronizing video sequences is disclosed. The computer product produce comprises one or more non-transitory storage devices that store instructions for causing a computing device to perform some or all of the method steps described above and/or method steps described in other portions of this disclosure.

Figure 9:
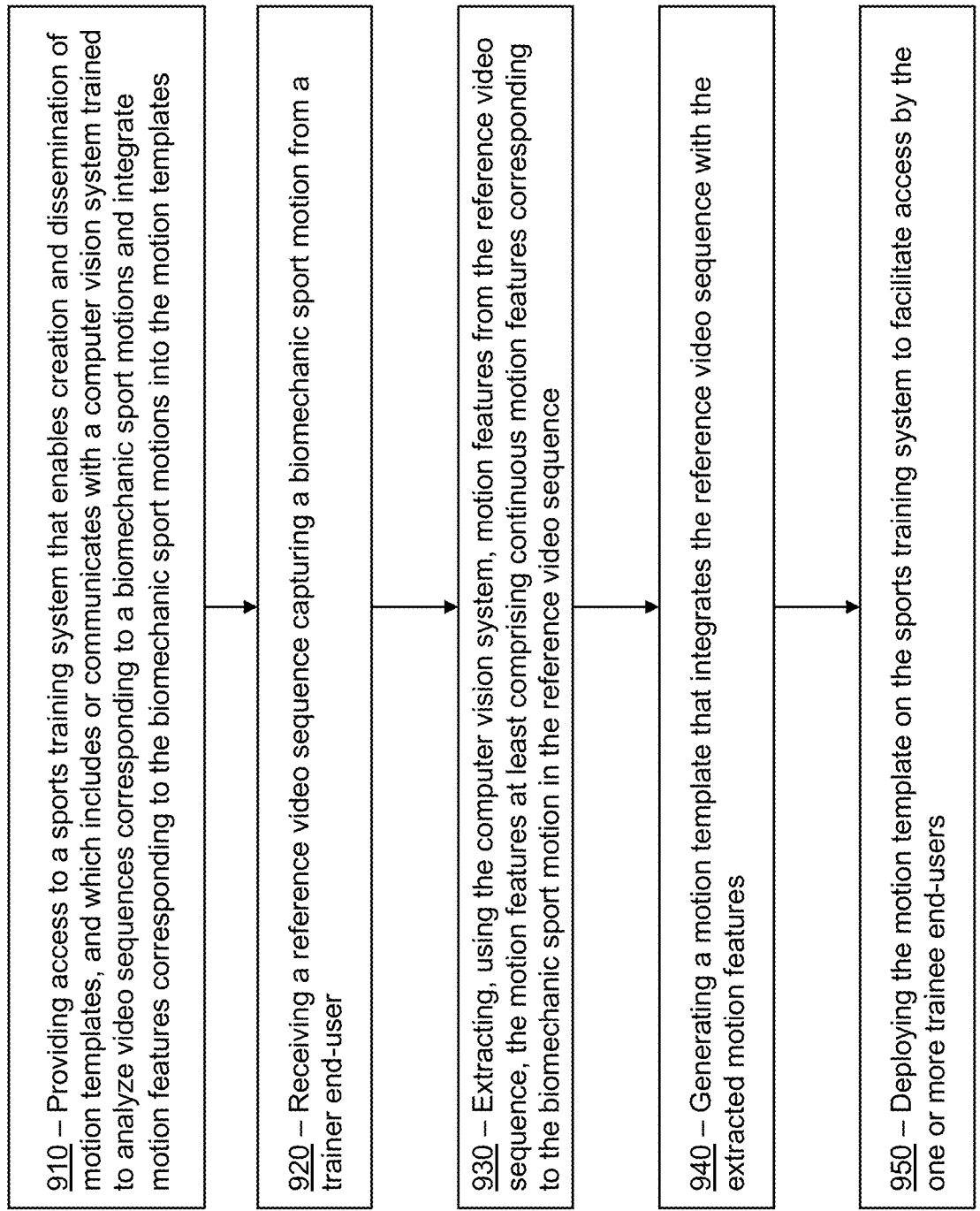
FIG. 9 is a flowchart illustrating an exemplary method for generating and/or disseminating motion templates in accordance with certain embodiments.

FIG. 9 illustrates a flow chart for an exemplary method 900 according to certain embodiments. Method 900 is merely exemplary and is not limited to the embodiments presented herein. Method 900 can be employed in many different embodiments or examples not specifically depicted or described herein. In some embodiments, the steps of method 900 can be performed in the order presented. In other embodiments, the steps of method 900 can be performed in any suitable order. In still other embodiments, one or more of the steps of method 900 can be combined or skipped. In many embodiments, system 100, sports training system 150, and/or motion template generation function can be configured to perform method 900 and/or one or more of the steps of method 900. In these or other embodiments, one or more of the steps of method 900 can be implemented as one or more computer instructions configured to run on one or more processing devices 102 and configured to be stored at one or more non-transitory computer storage devices 101. Such non-transitory memory storage devices 101 can be part of a computer system such as system 100 and/or sports training system 150.

In step 910, access is provided to a sports training system that enables the creation and dissemination of motion templates, and which includes or communicates with a computer vision system trained to analyze video sequences corresponding to biomechanical sport motions and integrate motion features corresponding to the biomechanical sport motions into the motion templates.

In step 920, a reference video sequence capturing a biomechanical sport motion is received from a trainer end-user.

In step 930, motion features are extracted from the reference video sequence using the computer vision system, with the motion features at least comprising continuous motion features corresponding to the biomechanical sport motion in the reference video sequence.

In step 940, a motion template is generated that integrates the reference video sequence with the extracted motion features.

In step 950, the motion template is deployed on the sports training system to facilitate access by one or more trainee end-users.

In certain embodiments, a method for creating and disseminating a motion template can be implemented via execution of computing instructions by one or more processing devices and may be configured to be stored on one or more non-transitory storage devices. The method may include providing access to a sports training system that enables creation and dissemination of motion templates. This sports training system can include or communicate with a computer vision system trained to analyze video sequences corresponding to biomechanical sport motions and integrate motion features corresponding to the biomechanical sport motions into the motion templates. The method may further involve receiving a reference video sequence capturing a biomechanical sport motion from a trainer end-user, extracting motion features from the reference video sequence using one or more motion analysis models of the computer vision system, where the motion features at least comprise continuous motion features corresponding to the biomechanical sport motion in the reference video sequence. Additionally, the method can include generating a motion template that integrates the reference video sequence with the extracted motion features, where the motion template serves as a benchmark for training or instructing one or more trainee end-users, and deploying the motion template on the sports training system to facilitate access by the one or more trainee end-users.

In certain embodiments, the method may include motion features that at least include object feature data comprising positional and movement information of objects within the video sequence. This can include one or more objects corresponding to a body part of an individual performing the biomechanical sport motion and one or more objects corresponding to sporting equipment utilized in performing the biomechanical sport motion. Additionally, motion path analysis data may be included, comprising trajectory information, angles, speed, and/or form of the biomechanical sport motion across the frames of the video sequence.

In certain embodiments, the method may further include motion features that at least include skeletal mapping data, which maps the individual's motion to a computer-generated skeletal structure.

In certain embodiments, the method may include motion features that at least include motion checkpoint data that identifies reference positions or moments within the biomechanical sport motion to facilitate synchronization or analysis. Additionally, annotation data may be included, comprising visual or textual markers that highlight aspects of the biomechanical sport motion to provide guidance or feedback for training purposes.

In certain embodiments, the method may include motion features that at least include 3D modeling data, which comprises a three-dimensional (3D) digital representation of the biomechanical sport motion to enhance visualization and analysis of the motion dynamics. The 3D digital representation may be extracted from a monocular view corresponding to the reference video sequence.

In certain embodiments, the method may further comprise providing a trainee end-user with access to the motion template, receiving a second video sequence from the trainee end-user capturing performance of a second biomechanical sport motion, and executing a motion synchronization function to align the biomechanical sport motion captured in the reference video sequence integrated with the motion template with the second biomechanical sport motion captured in the second video sequence. The motion synchronization process may utilize the motion features stored with the motion template to facilitate alignment of the biomechanical sport motion and the second biomechanical sport motion.

In certain embodiments, the method may include one or more feedback mechanisms corresponding to the motion template, which are configured to provide automated feedback to a trainee end-user based on a comparison of the biomechanical sport motion captured in the motion template and a second biomechanical sport motion captured in a video sequence provided by the trainee end-user.

In certain embodiments, the feedback mechanism may include one or more deviation tolerance settings, each defining at least one customizable threshold for acceptable variations in the execution of the biomechanical sport motion. Feedback can be generated in response to determining that the trainee end-user's performance of the second biomechanical sport motion deviates beyond the at least one threshold. The motion features extracted by the computer vision system may be utilized to determine whether the trainee end-user's performance of the second biomechanical sport motion deviates beyond the at least one threshold.

In certain embodiments, the biomechanical sport motion captured in the reference video sequence and integrated into the motion template may correspond to a golf swing motion, and the motion features can include data capturing one or more of the following: a golf club swing path, one or more joint angles, and a golf club trajectory.

In certain embodiments, the biomechanical sport motion and motion template may correspond to one of the following: tennis swing motions, baseball swing and throw motions, soccer kick motions, basketball shooting motions, football throwing motions, martial arts motions, swimming stroke motions, track and field motions, gymnastic motions, volleyball motions, hockey shot motions, skiing and snowboarding motions, surfing motions, rowing stroke motions, weightlifting lift motions, or fencing motions.

In certain embodiments, the sports training system may provide the trainer end-user with template definition functions that permit the trainer end-user to customize the motion template and supplement the reference video sequence incorporated into the motion template with annotation data.

In certain embodiments, a system for creating and disseminating a motion template is disclosed. The system comprises one or more processing devices and one or more non-transitory storage devices for storing instructions. Execution of the instructions by the one or more processing devices causes the one or more processing devices to perform some or all of the method steps described above and/or method steps described in other portions of this disclosure.

In certain embodiments, a computer program product is disclosed for creating and disseminating a motion template. The computer product produce comprises one or more non-transitory storage devices that store instructions for causing a computing device to perform some or all of the method steps described above and/or method steps described in other portions of this disclosure.

Figure 10:
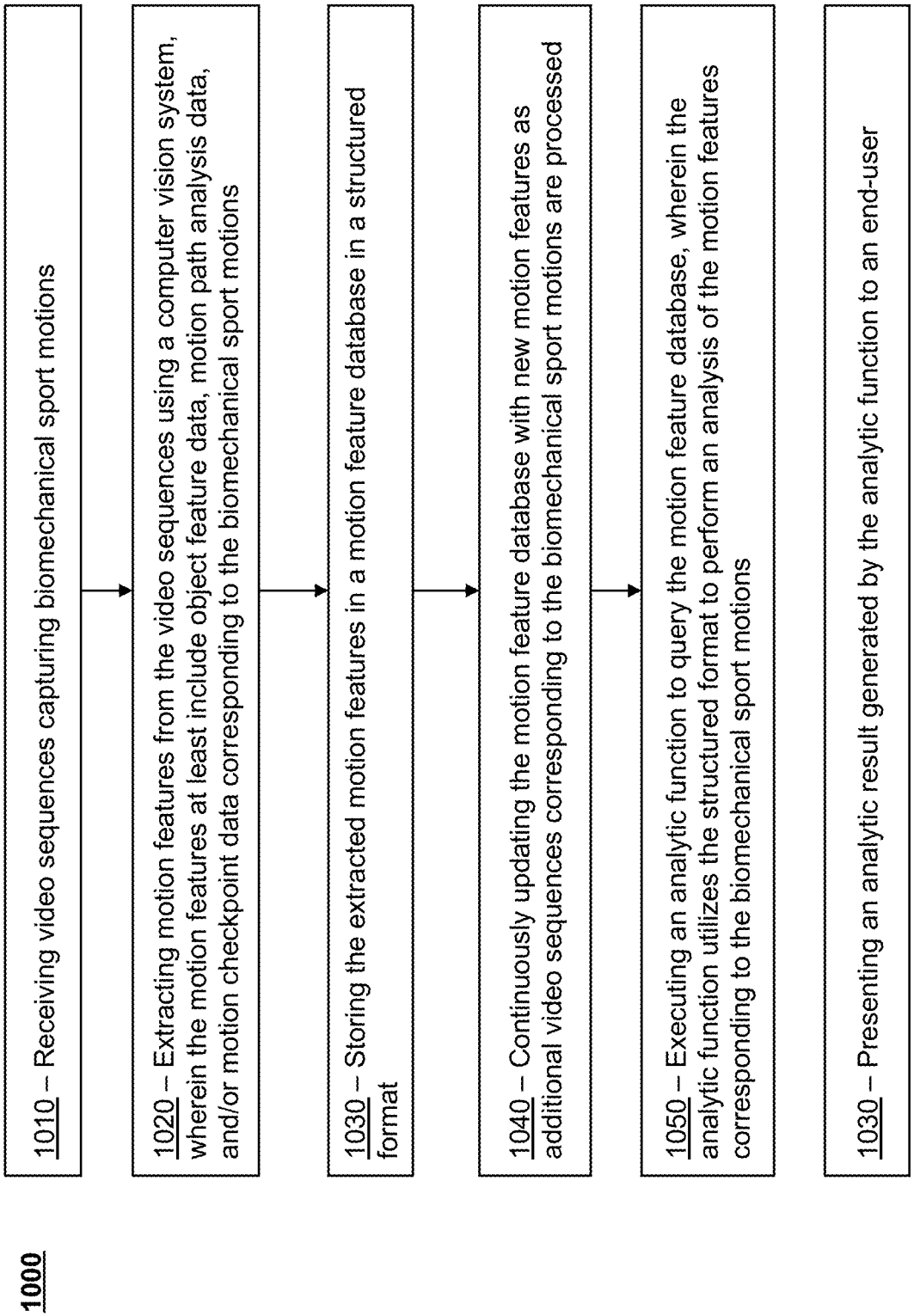
FIG. 10 is a flowchart illustrating an exemplary method for generating and/or utilizing a motion feature database in accordance with certain embodiments.

FIG. 10 illustrates a flow chart for an exemplary method 1000 according to certain embodiments. Method 1000 is merely exemplary and is not limited to the embodiments presented herein. Method 1000 can be employed in many different embodiments or examples not specifically depicted or described herein. In some embodiments, the steps of method 1000 can be performed in the order presented. In other embodiments, the steps of method 1000 can be performed in any suitable order. In still other embodiments, one or more of the steps of method 1000 can be combined or skipped. In many embodiments, system 100, sports training system 150, and/or components related to the motion feature database 180 can be configured to perform method 1000 and/or one or more of the steps of method 1000. In these or other embodiments, one or more of the steps of method 1000 can be implemented as one or more computer instructions configured to run on one or more processing devices 102 and configured to be stored at one or more non-transitory computer storage devices 101. Such non-transitory memory storage devices 101 can be part of a computer system such as system 100 and/or sports training system 150.

In step 1010, video sequences capturing biomechanical sport motions are received.

In step 1020, motion features are extracted from the video sequences using a computer vision system, where the motion features include object feature data, motion path analysis data, and/or motion checkpoint data corresponding to the biomechanical sport motions.

In step 1030, the extracted motion features are stored in a motion feature database in a structured format. In this structured format, the database may organize the motion features into labeled fields and/or records to facilitate efficient storage, retrieval, and/or analysis.

In step 1040, the motion feature database is continuously updated with new motion features as additional video sequences corresponding to the biomechanical sport motions are processed.

In step 1050, an analytic function is executed to query the motion feature database, utilizing the structured format to perform an analysis of the motion features corresponding to the biomechanical sport motions.

In step 1060, an analytic result generated by the analytic function is presented to an end-user.

In certain embodiments, a database management method can be implemented via execution of computing instructions by one or more processing devices and may be configured to be stored on one or more non-transitory storage devices. The method may include receiving video sequences capturing biomechanical sport motions and extracting motion features from these video sequences using a computer vision system. The motion features can include object feature data, motion path analysis data, and/or motion checkpoint data corresponding to the biomechanical sport motions. The motion features can be uniquely tagged by timestamp, userid, template ID, camera details, joints, objects (e.g., corresponding to a ball, club, racquet, etc.), and/or other data for robust indexing. The method may further involve storing the extracted motion features in a motion feature database in a structured format, continuously updating the motion feature database with new motion features as additional video sequences corresponding to the biomechanical sport motions are processed, executing an analytic function to query the motion feature database, where the analytic function utilizes the structured format to perform an analysis of the motion features corresponding to the biomechanical sport motions, and presenting an analytic result generated by the analytic function to an end-user.

In certain embodiments, the structured format may include fields corresponding to the extracted motion features and fields corresponding to temporal information, location information, and a trainee identifier.

In certain embodiments, the analytic function may consider motion features extracted from a plurality of video sequences to perform the analysis.

In certain embodiments, the analytic function may consider motion features extracted from a plurality of video sequences corresponding to biomechanical sport motions performed by a single trainee end-user to provide an evaluation specific to the trainee. The analytic result can include at least one of the following: an assessment of the trainee end-user's performance improvement or decline over multiple biomechanical sport motions, an assessment of the trainee end-user's performance over a specific time period, or an assessment identifying areas of improvement based on a pattern detected in the plurality of video sequences.

In certain embodiments, the analytic function may perform a trainer-specific analysis by considering video sequences from multiple trainee end-users who have utilized the trainer's services or one or more motion templates created by the trainer.

In certain embodiments, the analytic function may compare a first set of motion features extracted from a trainee end-user over a specified time period with a second set of motion features from a motion template to assess whether the trainee's performance of a biomechanical sport motion is increasingly aligning with a benchmark biomechanical sport motion in the motion template or diverging further over time.

In certain embodiments, the analytic function may compare the motion features of a trainee end-user's biomechanical sport motion to those of a professional athlete.

In certain embodiments, the motion feature database may be populated with the motion features extracted during performance of one or more functions corresponding to synchronizing videos, providing feedback to trainee end-users, or generating motion templates. The motion features in the motion feature database can subsequently be accessed by the analytic function to perform a separate analysis.

In certain embodiments, the biomechanical sport motions may correspond to golf swing motions, and the motion feature database can store motion features corresponding to golf club swing paths, joint angles, hip rotation, shoulder alignments, swing tempos, and/or club head speeds.

In certain embodiments, the motion features stored in the motion feature database may correspond to one of the following: golf swings, tennis swing motions, baseball swing and throw motions, soccer kick motions, basketball shooting motions, football throwing motions, martial arts motions, swimming stroke motions, track and field motions, gymnastic motions, volleyball motions, hockey shot motions, skiing and snowboarding motions, surfing motions, rowing stroke motions, weightlifting lift motions, or fencing motions.

In certain embodiments, a database management system is disclosed. The system comprises one or more processing devices and one or more non-transitory storage devices for storing instructions. Execution of the instructions by the one or more processing devices causes the one or more processing devices to perform some or all of the method steps described above and/or method steps described in other portions of this disclosure.

In certain embodiments, a computer program product is disclosed for managing a database. The computer program product comprises one or more non-transitory storage devices that store instructions for causing a computing device to perform some or all of the method steps described above and/or method steps described in other portions of this disclosure.

Other Exemplary Components, Features, and/or Functions

This section describes exemplary components, features, and/or functions that optionally can be integrated with the sports training system 150 according to certain embodiments.

As mentioned above, the systems, methods, and techniques described throughout this disclosure can be applied to support a wide range of sports and/or sports motions.

FIG. 7 is a block diagram illustrating exemplary types or categories of biomechanical sport motions 145 that can be analyzed by the sports training system 150 using the techniques set forth in this disclosure.

Golf swing motions 145A: This can include driving swing motions, iron swing motions, putting motions, and/or other types of golf-related motions.

Tennis swing motions 145B: This can include tennis serve motions, backhand swing motions, forehand swing motions, and/or other types of tennis motions.

Baseball swing and throw motions 145C: This can include baseball bat swing motions, pitching motions, and/or other types of baseball throwing motions.

Soccer kick motions 145D: This can include various types of soccer kicks, such as penalty kicks, free kicks, and/or goal kicks.

Martial arts motions 145E: This can include offensive and defensive motions, such as punches, kicks, blocks, and/or grappling techniques.

Football throwing motions 145F: This can include quarterback throwing motions, long snapper motions, and/or other types of football passing motions. Other types of football-related motions also can be processed for various types of offensive and/or defensive maneuvers.

Swimming stroke motions 145G: This can include freestyle, backstroke, breaststroke, butterfly, and/or other types of swimming strokes.

Track and field motions 145H: This can include running, jumping, hurdling, and/or throwing motions associated with track and field events.

Gymnastic motions 145I: This can include floor exercise motions, vaulting motions, balance beam motions, and/or other types of gymnastic routines.

Volleyball motions 145J: This can include serving motions, spiking motions, blocking motions, setting motions, and/or other types of volleyball actions.

Hockey shot motions 145K: This can include slap shots, wrist shots, backhand shots, and/or other types of hockey shooting motions.

Skiing and snowboard motions 145L: This can include downhill skiing motions, slalom motions, snowboarding tricks, and/or other types of skiing and snowboarding maneuvers.

Surfing motions 145M: This can include paddling motions, pop-up motions, carving motions, and/or other types of surfing techniques.

Rowing stroke motions 145N: This can include the catch, drive, finish, and/or recovery phases of rowing strokes.

Weightlifting lift motions 145O: This can include benchpressing, curling, snatch, clean and jerk, deadlift, and/or other types of weightlifting lifts.

Fencing motions 145P: This can include lunge motions, parry motions, riposte motions, and/or other types of fencing techniques.

Dance motions 145Q: This can include motions for various types of dance styles (e.g., ballet, salsa, hip-hop, contemporary, tap, ballroom, flamenco, swing, folk, breakdancing, modern dance, etc.). In some examples, the dance motions 145Q can include ballet pirouettes, salsa spins, tap dance shuffles, and many other types of motions for various dance styles.

Yoga motions 145R: This can include motions for various poses (e.g., such as downward dog, warrior, tree pose, cobra, sun salutation sequences, etc.).

Physical training motions 145S: This can include various motions used for physical training (e.g., squats, lunges, push-ups, burpees, planks, jumping jacks, etc.).

Many other types of biomechanical sport motions 145 can be analyzed by the sports training system 150 in addition to those listed above.

FIG. 2 of the disclosure highlights exemplary motion features 155 that can be extracted and/or derived from video sequences from videos corresponding to trainee end-users and trainer end-users. The exemplary motion features 155 illustrated include object feature data 155A, motion path analysis data 155B, motion checkpoint data 155C, 3D modeling data 155D, and annotation data 155E. However, many additional types of motion features 155 also may be extracted or derived.

Additionally, the manner in which the motion features 155 are extracted or derived can vary. For example, as explained above, the 3D modeling data 155D can include 3D models and/or digital representations of biomechanical sport motions corresponding to biomechanical sport motions 145 captured in the videos 140. Various techniques can be utilized to generate the 3D modeling data 155D, including techniques that rely on monocular views and/or techniques that leverage multi-angle views.

In certain embodiments, the generation of accurate 3D motion models can be facilitated using standard video footage captured from multiple angles. This approach eliminates the need for expensive, synchronized camera setups, making 3D motion analysis accessible to a broader audience while maintaining high accuracy. By using unsynchronized videos taken with mobile phones, this technique democratizes access to 3D analysis tools, which were previously limited to high-end setups.

The use of multi-view techniques offers several benefits. One such feature is cross-view feedback, which allows for the analysis of motion from multiple perspectives, such as top-down and side-on views. This approach can provide a complete understanding of movement patterns, enabling more detailed and accurate assessments. Additionally, template-based 3D feedback allows 3D models to serve as reference points for motion comparison. Trainee end-users can align their movements with a virtual model, facilitating improved technique and performance through visual comparison.

The generation of 3D models from multi-angle videos offers transformative possibilities across various domains, such as sports and rehabilitation. For example, in golf swing analysis, 3D models created from down-the-line and face-on views enable the detection of subtle errors in shoulder rotation and hip sway. By providing a comprehensive view of the golfer's motion, these models allow for precise identification of areas needing improvement, facilitating targeted coaching and practice strategies. The ability to visualize and analyze these intricate details in three dimensions enhances the golfer's understanding of their swing mechanics, leading to more effective adjustments and performance enhancements.

In martial arts, capturing and analyzing complex kicking sequences through 3D modeling provides valuable insights into balance, posture, and rotation. These models allow practitioners to evaluate their techniques with a level of detail that is not possible with traditional video analysis. By reconstructing the motion in three dimensions, martial artists can identify inefficiencies and optimize their movements for better performance and reduced injury risk.

Similarly, in rehabilitation therapy, 3D models of walking patterns are instrumental in assessing and improving gait mechanics. These models provide therapists with a detailed view of a patient's movement, enabling them to tailor interventions that address specific gait abnormalities. By visualizing the patient's progress over time, therapists can make data-driven decisions to enhance recovery outcomes.

In certain embodiments, the sports training system 150 can apply 3D modeling techniques to provide trainee and trainer end-users with tools for performance enhancement. In one example, the system may provide real-time monocular video feedback, which allows single-angle videos to be compared against pre-generated 3D models. This capability can provide immediate feedback to users, enabling them to make on-the-spot adjustments to their technique. By visualizing their movements in relation to an ideal 3D model, trainee end-users can quickly identify discrepancies and correct them, leading to more efficient training sessions and faster skill acquisition.

In certain embodiments, the sports training system 150 also can be configured with functionalities to provide virtual coaching experiences by utilizing 3D models and motion templates in virtual environments. This feature enables remote training sessions, where athletes can receive guidance and feedback from coaches without being physically present. By interacting with 3D models in a virtual space, athletes can gain a deeper understanding of their movements and how to improve them. This virtual coaching capability expands access to high-quality training resources, allowing athletes from all over the world to benefit from expert coaching and advanced motion analysis tools.

In addition to video analysis, the sports training system 150 can integrate data from wearable sensors to enhance the accuracy of motion analysis. These wearable sensors or devices may be attached to sports equipment (e.g., golf clubs, tennis rackets, etc.) and/or directly to trainee and/or trainer end-users. In some examples, the wearable sensors or devices can include gyroscopes, accelerometers, magnetometers, and/or other motion-tracking components that capture detailed data on an athlete's movements, providing insights into aspects such as orientation, speed, and force exerted during various activities.

By combining motion data from wearables with video-based analysis technologies, the system may provide a more detailed and precise assessment of an athlete's performance. This integration allows for the capture of nuanced motion details that might be missed by video alone, such as subtle shifts in balance or force exertion. The result is a richer dataset that can be used to fine-tune training regimens and improve overall athletic performance.

In certain embodiments, the sports training system 150 can be configured to generate AI-driven corrective plans, which may include personalized training programs developed based on recurring data patterns and identified weaknesses detected by the analytic functions 550. By analyzing the data collected from video and/or wearable sensors, the analytic functions 550 can identify areas where a trainee consistently struggles and generate targeted exercises to address these issues. This personalized approach can enable athletes to receive training that is specifically tailored to their needs, maximizing the effectiveness of their practice time. Additionally, in certain embodiments, the sports system can be configured to be a closed-loop system, which may include feedback systems, real-time correction and model retraining.

In certain embodiments, the sports training system 150 can leverage computer vision and AI technologies to provide real-time feedback to trainee end-users to enhance their training experience and performance. In some examples, this real-time feedback can be provided directly through an end-user application 115 installed on the trainee's computing device 110, which may be capturing a live video of the trainee during practice or performance of biomechanical sport motions 145. This AI-driven real-time feedback function permits users to receive instant correction cues based on detected deviations from optimal motion patterns. This immediate feedback during motion significantly improves learning efficiency and helps prevent ingrained errors. Key benefits include instantaneous correction, where AI detects deviations and alerts users immediately, and threshold-based feedback, which allows customization of acceptable deviation thresholds for different skills or experience levels.

In some examples, the real-time feedback can deliver voice and/or visual alerts, providing real-time annotations or auditory feedback to guide trainees toward corrective actions. This capability also can be useful for preventing injuries by detecting and correcting potentially harmful motions in real-time. For example, in golf, the system can alert a golfer when their wrist angle exceeds a predefined threshold during the downswing, ensuring proper technique and reducing the risk of injury. Similarly, in weightlifting, the system can warn athletes of improper knee tracking during a squat, helping them avoid injury and maintain correct form.

In certain embodiments, the sports training system 150 can be integrated with various types of social features to facilitate collaborative learning or training, creating a connected ecosystem for athletes, trainers, coaches, and other individuals. This ecosystem introduces community-driven learning, where athletes can access shared motion templates 165 and user-generated feedback, enhancing their training experience through collective knowledge. The system can facilitate peer comparisons, allowing users to compare their motion data and/or videos 140 with that of their peers to identify unique strengths and weaknesses, fostering a supportive and competitive environment.

In certain embodiments, the sports training system 150 also can enhance coach-student interactions by facilitating asynchronous coaching through built-in messaging, video annotations, and/or data sharing functions. These asynchronous coaching functions allow for continuous learning and feedback, even outside of scheduled training sessions. For example, in golf swing review, students can share their swing videos with peers for collaborative feedback, gaining diverse perspectives on their technique. Additionally, coaches can host live Q&A (question and answer) sessions, providing real-time analysis and answering questions about specific templates, further enriching the learning experience. By integrating these social features, the sports training system 150 not only enhances individual performance but also builds a vibrant community of learners and coaches.

In certain embodiments, the sports training system 150 also can be integrated with functions that enhance training by classifying and/or identifying motion styles or biomechanical patterns. AI-based classification models and/or machine-learning algorithms to classify and identify motion styles or biomechanical patterns, thereby personalizing training by suggesting tailored corrections based on user-specific patterns. This capability includes motion style matching, which identifies which professional athlete's style a user most closely resembles, providing a relatable benchmark for improvement. The system can also develop adaptive training programs that suggest corrections based on factors such as body type, previous injury history, and skill level, ensuring that each user receives a customized training experience.

Additionally, the system's biomechanical pattern detection capabilities can be utilized to flag recurring patterns for long-term correction and adjustment, helping users make sustainable improvements in their technique. For example, in golf, the system can classify a golfer's swing as high-hand or low-hand and adjust training recommendations accordingly to optimize performance. In tennis, the system can detect whether a player prefers an open or closed stance and provide appropriate corrections to enhance their game. By leveraging these features, the sports training system 150 can offer a highly personalized and effective training regimen that adapts to the unique needs and characteristics of each athlete.

While many techniques described herein are presented in the context of sports training, these technologies represent significant advancements in video processing technologies more broadly and are not confined to the analysis of sports-related videos. The innovations in motion synchronization, feature extraction, and template-based analysis can be applied across various domains where precise alignment, comparison, and/or analysis of video content is desired. These technologies enhance the ability to process and interpret video data efficiently, offering improvements that extend beyond the domain of sports training.

For instance, the motion synchronization function can be applied to synchronize any type of video, not just those capturing biomechanical sport motions. This capability may be particularly useful in fields such as film production or video editing, where aligning scenes shot at different times or from different angles is useful for continuity. It can also be applied in security and surveillance, where synchronizing footage from multiple cameras can provide a comprehensive view of an event. By enabling precise alignment of video sequences, the motion synchronization function enhances the ability to analyze and interpret video content in a wide range of applications.

Additional use cases include virtual reality motion alignment, where the system synchronizes a user's physical movements to a digital avatar in real-time to support immersive applications such as virtual coaching, remote fitness training, and/or e-sports integration. Similarly, the system may be employed in remote sports officiating or judging scenarios, such as gymnastics, diving, or figure skating, where synchronized video analysis and motion comparison techniques can aid judges in evaluating performance consistency, form accuracy, and rule compliance across multiple perspectives and participants.

The motion feature database can also be applied to analyze visual content for any type of video, not just those capturing biomechanical sport motions. For example, in the field of medical imaging, the database can be used to store and analyze features extracted from diagnostic videos, such as endoscopies or ultrasounds. By structuring and aggregating these features, healthcare professionals can efficiently track changes over time, compare patient data against established benchmarks, and identify patterns that may indicate the progression of a condition. This capability allows for more accurate diagnoses and personalized treatment plans, demonstrating the versatility of the motion feature database in enhancing video analysis across diverse fields.

As evidenced by the disclosure herein, the inventive techniques set forth in this disclosure are rooted in computer technologies that overcome existing problems in known video processing systems, including problems dealing with synchronizing motion in videos, accessing visual information embedded into video sequences, and facilitating realtime or rapid feedback to end-users based on an analysis of visual content. The techniques described in this disclosure provide technical solutions for overcoming the limitations associated with known techniques, including solutions that incorporate the motion synchronization, motion template, and/or motion feature database technologies described herein. This technology-based solution marks an improvement over existing capabilities and functionalities related to computer vision technologies by improving the accuracy of video alignment, storing visual information in structured formats that facilitate analysis, and/or integrating motion feature data directly into templates to streamline comparisons.

Furthermore, in a number of embodiments, the techniques described herein can solve a technical problem that arises only within the realm of computer networks, because computer vision, deep learning, and/or machine learning technologies do not exist outside the realm of computer networks.

In many embodiments, the techniques described herein can be used continuously at a scale that cannot be reasonably performed using manual techniques or the human mind. For example, in sports training, the system can automatically process and analyze thousands or even millions of video sequences to train motion analysis models. This type of AI-based training enables the models to facilitate feature extraction, object detection, and/or other computer vision functions described herein with high accuracy and efficiency. By leveraging such large datasets, the system can provide real-time feedback to athletes, identifying subtle deviations in their technique and offering corrective guidance. This capability allows for a level of precision and scalability in training that would be impossible to achieve through manual analysis alone, empowering athletes to refine their skills more effectively.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

It should be recognized that any features and/or functionalities described for an embodiment in this application can be incorporated into any other embodiment mentioned in this disclosure. Moreover, the embodiments described in this disclosure can be combined in various ways. Additionally, while the description herein may describe certain embodiments, features, or components as being implemented in software or hardware, it should be recognized that any embodiment, feature, or component that is described in the present application may be implemented in hardware, software, or a combination of the two.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components is for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

The invention claimed is:

1. A method implemented via execution of computing instructions by one or more processing devices and configured to be stored on one or more non-transitory storage devices, the method comprising:
   providing access to a sports training system that includes, or communicates with, a computer vision system trained to analyze video sequences corresponding to biomechanical sport motions;
   receiving a first video sequence corresponding to a reference video sequence that captures a first biomechanical sport motion;
   extracting, using one or more motion analysis models of the computer vision system, a first set of motion features from the first video sequence, wherein extracting the first set of motion features; includes extracting first discrete object motion data corresponding to one or more motion-relevant objects included in the first video sequence and utilizing a neural ordinary differential equation (ODE) model to construct a first continuous motion representation for the first biomechanical sport motion by interpolating the first discrete object motion data;

receiving a second video sequence corresponding to a second biomechanical sport motion;

extracting, using the one or more motion analysis models of the computer vision system, a second set of motion features corresponding to the second video sequence, wherein extracting the second set of motion features includes extracting second discrete object motion data corresponding to one or more motion-relevant objects included in the second video sequence and utilizing the neural ODE model to construct a second continuous motion representation for the second biomechanical sport motion by interpolating the second discrete object motion data;

executing a motion synchronization function that aligns or synchronizes the first video sequence and the second video sequence, at least in part, by applying a dynamic time warping function that utilizes the first continuous motion representation and the second continuous motion representation constructed by the neural ODE model to adjust a temporal misalignment of the first video sequence and the second video sequence; and generating a synchronized video output that aligns the first biomechanical sport motion included in the first video sequence with the second biomechanical sport motion included in the second video sequence, at least in part, using an output of the dynamic time warping function, wherein the synchronized video output is configured for use in training feedback, performance comparison, or biomechanical correction.

2. The method of claim 1, wherein:
the first video sequence and the second video sequence are asynchronous video sequences having differing frame rates, differing tempos, and/or differing views; and
the motion synchronization function aligns or synchronizes the asynchronous video sequences to generate the synchronized video output.

3. The method of claim 1, wherein the dynamic time warping function determines a warping path that minimizes the temporal misalignment between the first video sequence and the second video sequence utilizing the continuous motion features extracted from both the first video sequence and the second video sequence.

4. The method of claim 1, further comprising:
applying a dimensionality reduction function to the first continuous motion representation derived from the first video sequence using the neural ODE model;
applying a dimensionality reduction function to the second continuous motion representation derived from the second video sequence using the neural ODE model; and
executing the dynamic time warping function in a reduced dimension space using the first continuous motion representation and the second continuous motion representation.

5. The method of claim 1, wherein:
the first video sequence corresponds to a reference video sequence provided by a trainer end-user to the sports training system;
the second video sequence corresponds to a trainee-provided video sequence that captures a trainee end-user's performance of the second biomechanical sport motion; and the synchronized video output comprises modified versions of the first video sequence and second video sequence, which have been adjusted to reduce or eliminate the temporal misalignment.

6. The method of claim 1, further comprising:
extracting motion checkpoint data from the first biomechanical sport motion and the second biomechanical sport motion using the computer vision system, wherein the motion checkpoint data identifies frames corresponding to specific motion positions within the first video sequence and the second video sequence to facilitate synchronization or analysis;
wherein the neural ODE model constructs the first continuous motion representation and the second continuous motion representation by applying a differential motion function and interpolating the motion checkpoint data extracted from the first video sequence and the second video sequence.

7. The method of claim 6, wherein the synchronized video output aligns the first biomechanical sport motion and the second biomechanical sport motion across the specific motion positions identified in the motion checkpoint data.

8. The method of claim 1, wherein annotation data is inserted into the synchronized video output by the computer vision system.

9. The method of claim 1, wherein:
the first biomechanical sport motion and the second biomechanical sport motion each correspond to a golf swing motion; and
the first set of motion features and the second set of motion features capture information corresponding to one or more of the following: one or more golf club swing paths, one or more joint angles, and one or more golf club trajectories.

10. The method of claim 1, wherein the first biomechanical sport motion and the second biomechanical sport motion each correspond to one of the following categories: tennis swing motions, baseball swing and throw motions, soccer kick motions, basketball shooting motions, football throwing motions, martial arts motions, swimming stroke motions, track and field motions, gymnastic motions, volleyball motions, hockey shot motions, skiing or snowboarding motions, surfing motions, rowing stroke motions, weightlifting lift motions, fencing motions, dance motions, yoga motions, or physical training motions.

11. The method of claim 1, wherein the method further comprises:
while a trainee end-user is capturing performance of one or more biometric sport motions in one or more video sequences, generating one or more annotations for insertion into the one or more video sequences; and
inserting the one or more annotations in real-time or near real-time into the one or more video sequences to provide feedback to the trainee end-user while the one or more biometric sport motions are being performed.

12. The method of claim 1, wherein the first set of motion features from the first video sequence and the second set of motion features from the second video sequence are stored in a motion feature database using feature vector indexes that are searchable using a vector search function.

13. The method of claim 1, wherein:
the sports training system includes a template management system that enables trainer end-users to create motion templates that integrate reference videos;
the motion templates created by the trainer end-users can be viewed by trainee end-users via the sports training system; and the trainee end-users are permitted to select and purchase motion templates from the trainer end-users.

14. The method of claim 1, wherein the one or more motion analysis models comprise a pose estimation model configured to extract skeletal joint positions from the first video sequence and the second video sequence.

15. The method of claim 1, wherein the one or more motion analysis models are implemented using a deep learning architecture trained on labeled biomechanical sport motion data.

16. The method of claim 15, wherein the deep learning architecture comprises a convolutional neural network (CNN), a recurrent neural network (RNN), a transformer-based model, or a combination thereof.

17. The method of claim 1, wherein the the first continuous motion representation is derived from discrete pose trajectory vectors extracted across a defined sequence of frames in the first video sequence and the second continuous motion representation is derived from discrete pose trajectory vectors extracted across a defined sequence of frames in the second video sequence.

18. The method of claim 1, wherein:
the neural ODE model is trained to approximate a differential motion function that represents dynamics governing movements of object motion features extracted from videos sequences and interpolates positions corresponding to the object motion features;
the neural ODE model constructs the first continuous motion representation by fitting a continuous motion function to the first discrete object motion data extracted from the first video sequence; and
the neural ODE model constructs the second continuous motion representation by fitting a continuous motion function to the second discrete object motion data extracted from the second video sequence.

19. A system comprising one or more processing devices and one or more non-transitory storage devices for storing instructions, wherein execution of the instructions by the one or more processing devices causes the one or more processing devices to perform functions comprising:
providing access to a sports training system that includes, or communicates with, a computer vision system trained to analyze video sequences corresponding to biomechanical sport motions;
receiving a first video sequence corresponding to a reference video sequence that captures a first biomechanical sport motion;
extracting, using one or more motion analysis models of the computer vision system, a first set of motion features from the first video sequence, wherein extracting the first set of motion features includes extracting first discrete object motion data corresponding to one or more motion-relevant objects included in the first video sequence and utilizing a neural ordinary differential equation (ODE) model to construct a first continuous motion representation for the first biomechanical sport motion by interpolating the first discrete object motion data;
receiving a second video sequence corresponding to a second biomechanical sport motion;
extracting, using the one or more motion analysis models of the computer vision system, a second set of motion features corresponding to the second video sequence, wherein extracting the second set of motion features includes extracting second discrete object motion data corresponding to one or more motion-relevant objects included in the second video sequence and utilizing the neural ODE model to construct a second continuous motion representation for the second biomechanical sport motion by interpolating the second discrete object motion data;
executing a motion synchronization function that aligns or synchronizes the first video sequence and the second video sequence, at least in part, by applying a dynamic time warping function that utilizes the first continuous motion representation and the second continuous motion representation constructed by the neural ODE model to adjust a temporal misalignment of the first video sequence and the second video sequence; and
generating a synchronized video output that aligns the first biomechanical sport motion included in the first video sequence with the second biomechanical sport motion included in the second video sequence, at least in part, using an output of the dynamic time warping function, wherein the synchronized video output is configured for use in training feedback, performance comparison, or biomechanical correction.

20. A method implemented via execution of computing instructions by one or more processing devices and configured to be stored on one or more non-transitory storage devices, the method comprising:
providing access to a sports training system that includes, or communicates with, a computer vision system trained to analyze video sequences corresponding to biomechanical sport motions;
receiving a first video sequence corresponding to a reference video sequence that captures a first biomechanical sport motion;
extracting, using the computer vision system, a first set of motion features from the first video sequence, wherein extracting the first set of motion features includes extracting first discrete object motion data corresponding to one or more motion-relevant objects included in the first video sequence and utilizing a neural ordinary differential equation (ODE) model to construct a first continuous motion representation for the first biomechanical sport motion by interpolating the first discrete object motion data;
receiving a second video sequence corresponding to a second biomechanical sport motion;
extracting, using the computer vision system, a second set of motion features corresponding to the second video sequence, wherein extracting the second set of motion features includes extracting second discrete object motion data corresponding to one or more motion-relevant objects included in the second video sequence and utilizing the neural ODE model to construct a second continuous motion representation for the second biomechanical sport motion by interpolating the second discrete object motion data;
executing a motion synchronization function that aligns or synchronizes the first video sequence and the second video sequence, at least in part, by applying a dynamic time warping function on the first continuous motion representation and the second continuous motion representation constructed by the neural ODE model; and
generating a synchronized video output that aligns the first biomechanical sport motion included in the first video sequence with the second biomechanical sport motion included in the second video sequence, at least in part, using an output of the dynamic time warping function.

* * * * *